United States Patent
Gillingham et al.

(10) Patent No.: US 7,090,711 B2
(45) Date of Patent: Aug. 15, 2006

(54) MULTISTAGE AIR CLEANER INCLUDING PULSE CLEANING SYSTEM

(75) Inventors: Gary R. Gillingham, Prior Lake, MN (US); Stan M. Koehler, Eden Prairie, MN (US); William J. Krisko, Bloomington, MN (US); Thomas G. Miller, Eagan, MN (US); Winston E. Olson, Apple Valley, MN (US); Fred H. Wahlquist, Bloomington, MN (US); Ervin P. Fuchs, Farmington, MN (US); Eugene D. Wilson, Prior Lake, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 11/092,513

(22) Filed: Mar. 29, 2005

(65) Prior Publication Data

US 2005/0166559 A1 Aug. 4, 2005

Related U.S. Application Data

(60) Continuation of application No. 10/756,578, filed on Jan. 12, 2004, now Pat. No. 6,872,237, which is a division of application No. 09/980,270, filed as application No. PCT/US00/15436 on Jun. 2, 2000, now Pat. No. 6,676,721, which is a continuation of application No. 09/325,697, filed on Jun. 3, 1999, now abandoned, which is a continuation of application No. 09/452,311, filed on Dec. 1, 1999, now abandoned.

(51) Int. Cl.
  *B01D 46/00* (2006.01)

(52) U.S. Cl. .......................... 55/481; 55/483; 55/502; 55/504

(58) Field of Classification Search ................ 55/302, 55/341.1, 356, 357, 385.3, 483, 492, 494, 55/495, 497, 502, 504, 506, 507, 481; 95/280
See application file for complete search history.

(56) References Cited

U.S. PATENT DOCUMENTS

| | | | | |
|---|---|---|---|---|
| 710,624 | A | * 10/1902 | Sly | ............................. 55/300 |
| 2,044,221 | A | 6/1936 | Myers et al. | |
| 2,107,653 | A | * 2/1938 | Strobell | ........................ 96/378 |
| 2,329,356 | A | * 9/1943 | Moore | ......................... 210/447 |
| 2,853,153 | A | 9/1958 | Sexton | |

(Continued)

OTHER PUBLICATIONS

Declaration of Fred Wahlquist, with 4 page appendix, describing filter assembly assembled in or about 1995.

*Primary Examiner*—Robert A. Hopkins
(74) *Attorney, Agent, or Firm*—Merchant & Gould PC

(57) ABSTRACT

A V-pack filter includes a frame construction having a first frame structure and a second frame structure. The V-pack filter also includes first and second panel sections mounted in extension between the first and second frame structures. The first panel section has first and second ends. The second panel section has third and fourth ends. The first and third ends have a first distance therebetween while the second and fourth ends have a second distance therebetween. The second distance is generally greater than the first distance. The first and second panel sections and the second frame structure define an air flow aperture. A seal arrangement circumscribes the air flow aperture and projects outwardly from the second frame structure. The first frame structure defines a first receiver indent. Assemblies and methods are also included.

19 Claims, 50 Drawing Sheets

U.S. PATENT DOCUMENTS

| | | | |
|---|---|---|---|
| 2,966,959 A | 1/1961 | Neumann | |
| 3,383,841 A | 5/1968 | Olson et al. | |
| 3,402,531 A | 9/1968 | Farr | |
| 3,423,908 A * | 1/1969 | Hart | 55/481 |
| 3,434,269 A | 3/1969 | Hyatt | |
| 3,507,100 A * | 4/1970 | Neumann | 55/502 |
| 3,576,095 A | 4/1971 | Rivers | |
| 3,593,503 A | 7/1971 | Andrews | |
| 3,816,984 A * | 6/1974 | Neumann | 55/502 |
| 4,002,443 A * | 1/1977 | Lorenz | 55/357 |
| 4,124,361 A * | 11/1978 | Revell | 55/493 |
| 4,217,122 A * | 8/1980 | Shuler | 55/480 |
| 4,233,044 A * | 11/1980 | Allan | 55/355 |
| 4,247,315 A | 1/1981 | Neümann | |
| 4,251,246 A * | 2/1981 | Andreychek | 55/481 |
| 4,266,956 A * | 5/1981 | Revell | 55/478 |
| 4,290,792 A * | 9/1981 | Eckstein et al. | 55/480 |
| 4,298,474 A | 11/1981 | Sillers, Jr. | |
| 4,306,896 A * | 12/1981 | O'Dell | 55/341.1 |
| 4,322,231 A * | 3/1982 | Hilzendeger et al. | 55/357 |
| 4,331,459 A | 5/1982 | Copley | |
| 4,334,900 A | 6/1982 | Neumann | |
| 4,364,251 A | 12/1982 | Nishihara et al. | |
| 4,407,664 A * | 10/1983 | Sillers, Jr. | 55/357 |
| 4,498,914 A | 2/1985 | Erickson | |
| 4,504,293 A | 3/1985 | Gillingham et al. | |
| 4,560,396 A | 12/1985 | O'Dell | |
| 4,650,506 A | 3/1987 | Barris et al. | |
| 4,765,810 A | 8/1988 | Wetzel | |
| 4,822,386 A | 4/1989 | Duchensneau | |
| 4,871,380 A * | 10/1989 | Meyers | 55/483 |
| 5,042,999 A | 8/1991 | Ernst et al. | |
| 5,207,811 A | 5/1993 | Buonpastore | |
| 5,223,011 A | 6/1993 | Hanni | |
| 5,512,074 A | 4/1996 | Hanni et al. | |
| 5,575,826 A | 11/1996 | Gillingham et al. | |
| 5,622,537 A | 4/1997 | Kahlbaugh et al. | |
| 5,656,049 A * | 8/1997 | Diachuk | 55/350.1 |
| 5,669,947 A * | 9/1997 | Diachuk | 55/342 |
| 5,672,399 A | 9/1997 | Kahlbaugh et al. | |
| 5,693,109 A | 12/1997 | Coulonvaux et al. | |
| 5,755,842 A * | 5/1998 | Patel et al. | 55/330 |
| 5,797,973 A | 8/1998 | Dudrey et al. | |
| 5,897,676 A | 4/1999 | Engel et al. | |
| 6,235,195 B1 * | 5/2001 | Tokar | 210/238 |
| D455,826 S | 4/2002 | Gillingham et al. | |
| 6,485,538 B1 | 11/2002 | Toyoshima | |
| 6,676,721 B1 | 1/2004 | Gillingham et al. | |
| 6,872,237 B1 | 3/2005 | Gillingham et al. | |
| 6,908,494 B1 | 6/2005 | Gillingham et al. | |

* cited by examiner

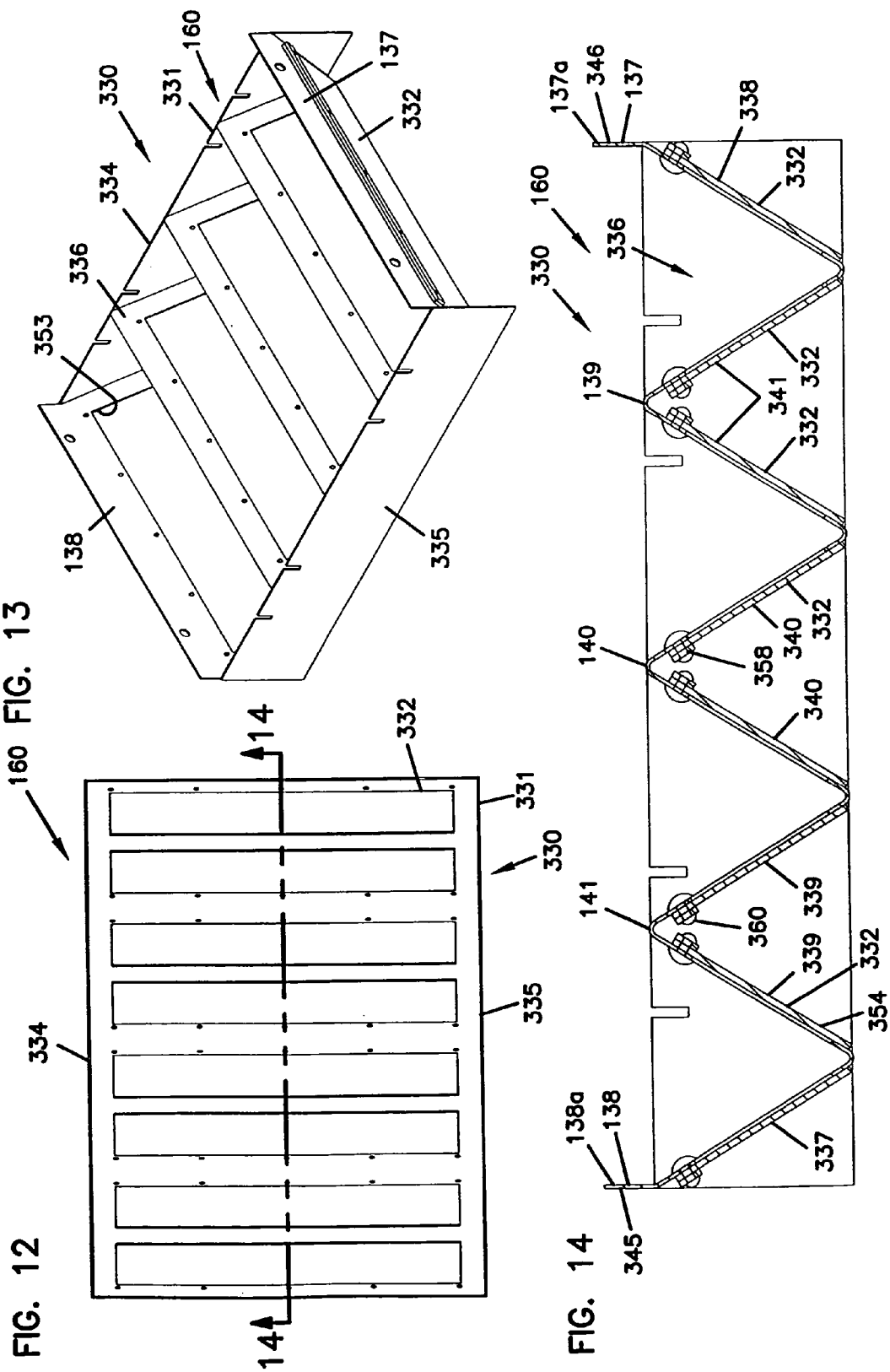

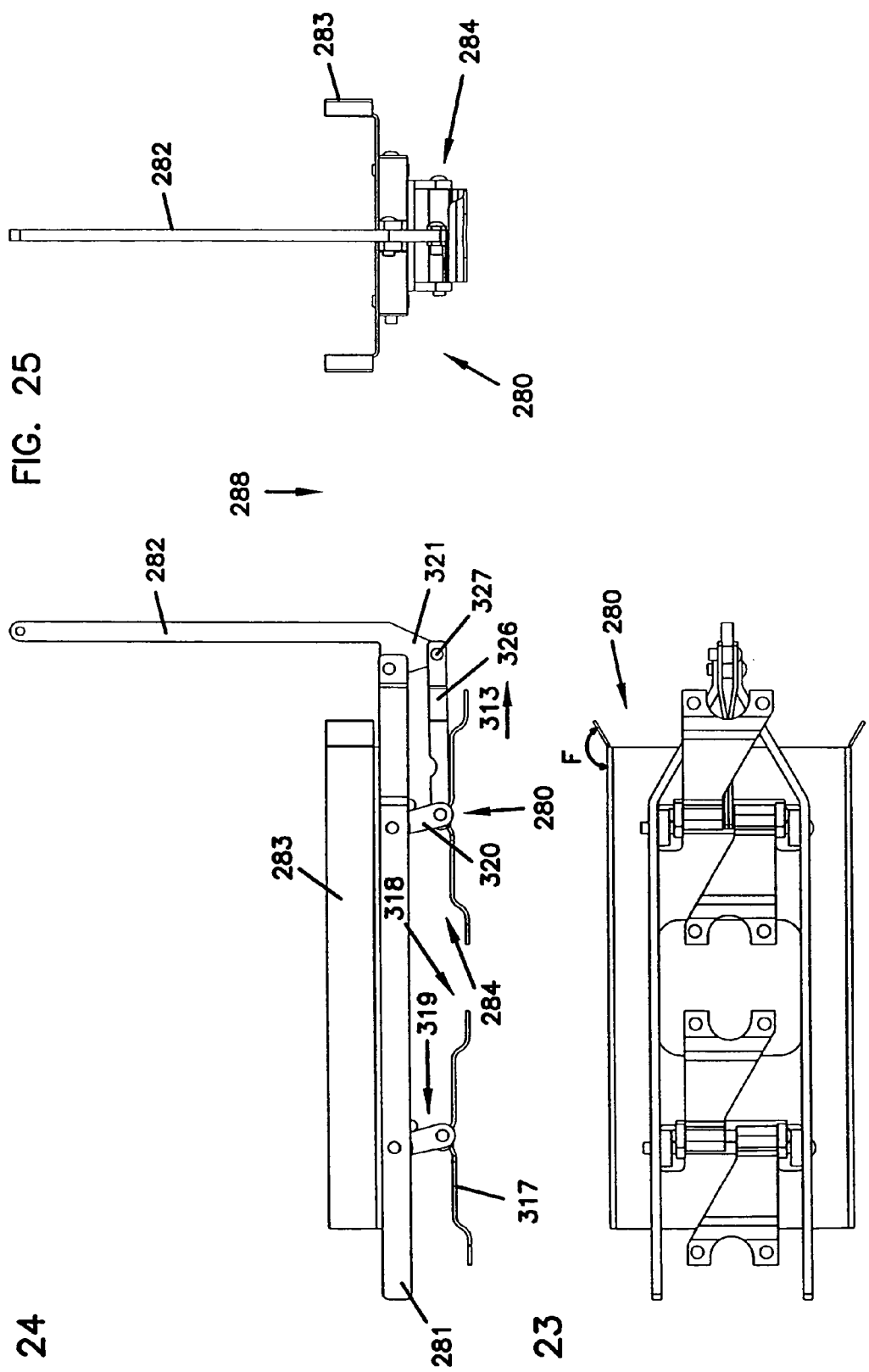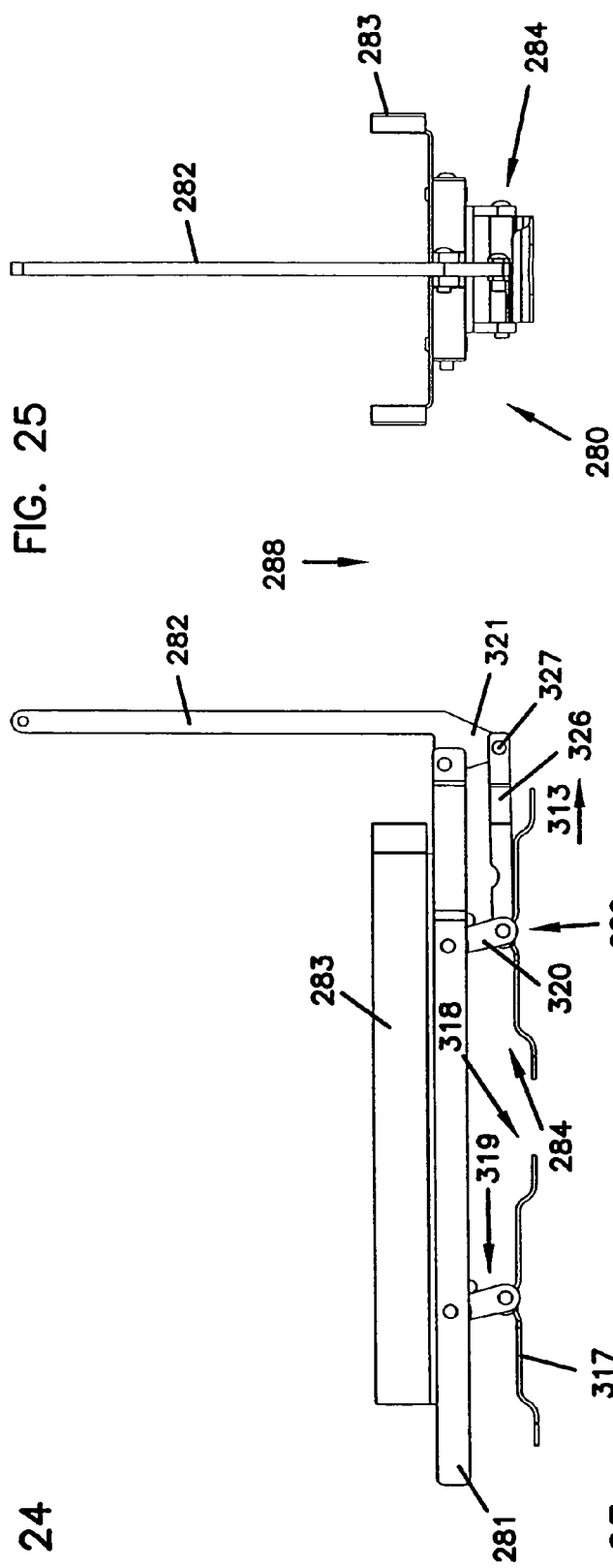

*Fig. 33*

| FIG.33A | FIG.33B |
| FIG.33C | FIG.33D |
| FIG.33E | FIG.33F |
| FIG.33G | FIG.33H |

*Fig. 32*

| FIG.32A |
| FIG.32B |

MULTISTAGE AIR CLEANER INCLUDING PULSE CLEANING SYSTEM

This application is a continuation application of application Ser. No. 10/756,578, filed Jan. 12, 2004, now U.S. Pat. No. 6,872,237, which is a divisional application of application Ser. No. 09/980,270, filed Apr. 12, 2002, now U.S. Pat. No. 6,676,721, which is a 371 of International application serial no. PCT/US00/15436, filed Jun. 2, 2000, which is a continuation of U.S. applications Ser. No. 09/325,697 filed Jun. 3, 1999, now abandoned, and Ser. No. 09/452,311 filed Dec. 1, 1999, now abandoned.

FIELD OF THE INVENTION

The present disclosure relates to air cleaners and particularly concerns air cleaners for cleaning combustion air directed to the engine air intake of large vehicles and equipment. The disclosure concerns preferred designs of air cleaners for such use, and methods of assembly and use.

BACKGROUND OF THE INVENTION

In general, combustion air for engines needs to be filtered to prevent particulates, otherwise carried in the intake air stream, from reaching sensitive engine components. As a result, nearly every engine system involving combustion air includes an air cleaner assembly of some type positioned in the intake air stream.

Many air cleaner assemblies generally comprise a housing through which the air is directed during filtration or cleaning. In some systems, a removable and replaceable filter element, or a combination of such filter elements, is provided within the housing. In use, the air is directed through the filter element(s) as it moves through the housing. In time, the filter element(s) becomes occluded or loaded with a concomitant increase in restriction across the air cleaner. At an appropriate service point, the filter element(s) is removed and is either refurbished (cleaned) or replaced.

Certain very large and powerful equipment types generate unique problems with respect to air cleaner operation. Consider large earth movers, haul trucks, and other very large types of construction and mining equipment that have 500–2,000 horsepower (hp) (37.3–149.2 KW) engines.

Such equipment operates for extended periods in extremely dusty environments. Such equipment also has very large volume demands for combustion air. This means very large amounts of particle-laden air on an almost continuous basis is passing through the air cleaner system. Indeed, the typical environments of use, for example construction sites and mining sites, are sites characterized by relatively large amounts of air borne particulates of a variety of sizes and population distribution. Special heavy-duty multistage filtration units have been designed for use with such equipment. One such design has been available from Donaldson Company, Inc. of Minneapolis, Minn. under the designation SRG Donaclone™. Such products are designed for an air flow of up to approximately 1,300–4,500 cubic feet per minute (cfm) (81,000–281,000 pounds water per minute (pwm)) and are available in single or dual unit designs. In general, such arrangements are multistaged. In a first stage, a precleaner is provided for removal of up to 95% of the dirt in the air stream before it reaches the filters. Such precleaners generally operate by directing the inlet air flow through a plurality of cyclonic tubes with dust separation occurring as a result of the cyclonic air flow. Cyclonic precleaners are described, for example, in U.S. Pat. No. 5,693,109, incorporated herein by reference.

In the second stage, the air from the precleaner is directed into and through an air filter system, typically a filter system provided by two elements: an outer primary filter element and an internal secondary or safety element. The housings are generally configured so that, periodically, the primary filter (and if desired the secondary filter) can be removed and be refurbished or replaced.

SUMMARY

I. Summary of U.S. patent application Ser. No. 09/325,697

In one aspect of U.S. patent application Ser. No. 09/325,697, an example embodiment involves a filter assembly. The filter assembly includes a housing that defines first and second chambers, a first stage air cleaner, a second stage air cleaner, and a pulse jet cleaning arrangement. The first stage air cleaner is positioned in the first chamber and includes a first filter element through which air to be filtered is directed during use. The second stage air cleaner is positioned in the second chamber and includes at least one removable and replaceable filter element through which air is directed during use. The pulse jet cleaning arrangement is constructed and arranged to selectively direct a pulse jet of air, in a reverse direction, through said first filter element.

In another aspect of U.S. Ser. No. 09/325,697, an apparatus includes a first V-pack filter and a lift mechanism. The first V-pack filter has a first, lower end and a second, upper end. The second, upper end includes an air flow exit aperture; a first seal arrangement, or gasket, circumscribing the air flow exit aperture and projecting outwardly from said second, upper end; and a hard stop arrangement projecting outwardly from said second, upper end. The lift mechanism includes a base structure, a movable seat secured to the base structure, and a pivotally mounted control arm. The movable seat has a first, raised orientation and a second, lowered orientation. The pivotally mounted control arm raises the movable seat to the first raised orientation and lowers the movable seat to the second, lowered orientation. The first V-pack filter and the lift mechanism are constructed and arranged such that when the lift mechanism is positioned in the first, raised orientation, the first V-pack filter is pressed against a portion of a housing in a locked position with the first seal arrangement pressed to form a seal and the hard stop limiting an extent of movement of the V-pack toward the housing. When the lift mechanism is in the second, lowered orientation, the first V-pack filter is released from the locked position.

In another aspect of U.S. Ser. No. 09/325,697, a method of operating an engine air intake filter assembly is discussed. The filter assembly includes a first chamber to house a first stage air cleaner, a second chamber to house a second stage air cleaner, and a pulse jet cleaning arrangement constructed and arranged to selectively direct pulses of air through the first stage air cleaner. The method includes measuring a pressure drop across the first stage air cleaner during engine operation; measuring an engine load during the engine operation; and activating a pulse valve of the pulse jet cleaning arrangement to direct a pulse of air, in a reverse direction, through the first stage air cleaner in response to the engine load being below a predetermined engine load and the pressure drop exceeding a predetermined pressure drop.

II. Summary of the Interlocking Arrangement

In one aspect of this discussion, an example embodiment involves an apparatus. The apparatus includes a retention mechanism, a V-pack filter, and an interlocking arrangement. The retention mechanism includes a base structure and a movable seat. The movable seat is secured to the base structure and has a first, locked orientation and a second, unlocked orientation. The V-pack filter includes a frame construction having first and second frame structures. The V-pack filter also includes first and second panel sections mounted in extension between the first and second frame structures. The first panel section has first and second ends. The second panel section has third and fourth ends. The first and third ends have a first distance therebetween. The second and fourth ends have a second distance therebetween. The second distance is generally greater than the first distance thus causing a V-shape. The first and second panel sections and the second frame structure define an air flow aperture. The V-pack filter also includes a sealing arrangement that circumscribes the air flow aperture and projects outwardly from the second frame structure.

The apparatus has a first, operable orientation wherein the V-pack filter is operably mounted in the apparatus. The apparatus also has a second, unload orientation wherein the V-pack filter is in a loosened positioned for separation from the apparatus. The interlocking arrangement includes first and second interlocking devices. The V-pack filter includes the first interlocking device. The second interlocking device is orientated in the apparatus and is mounted on a member separate from the V-pack filter. The interlocking arrangement is constructed and arranged such that when the retention system is in the first, locked orientation and the apparatus is oriented in the first, operable orientation, the first and second interlocking devices engage, typically by a male/female fit.

In another aspect of this discussion, an example embodiment involves a V-pack filter. The V-pack filter includes structure analogous to that above.

In another aspect of this discussion, an example embodiment involves a method of locking a V-pack filter in an operable position around an aperture.

III. Summary of the Logic Control System

In one aspect of this discussion, an example embodiment includes a method of operating an engine air intake filter assembly having a pulse jet cleaning arrangement constructed and arranged to selectively direct pulses of air through an air filter arrangement. The method includes measuring a pressure drop across the filter arrangement; measuring an engine load during an engine operation; and activating a pulse valve of the pulse jet cleaning arrangement to direct a pulse of air, in a reverse direction, through the air filter arrangement in response to the engine load being below a predetermined engine load and the pressure drop exceeding a predetermined pressure drop.

In another aspect of this discussion, an example embodiment includes a system for operating an engine air intake filter assembly having a pulse jet cleaning arrangement constructed and arranged to selectively direct pulses of air through an air filter arrangement. The system includes a pressure drop component, an engine load component, and a pulse firing component. The pressure drop component receives a measured pressure drop across the air filter arrangement. The engine load component receives a measured engine load during an engine operation. The pulse firing component activates a pulse valve of the pulse jet cleaning arrangement to direct a pulse of air, in a reverse direction, through the air filter arrangement in response to the engine load being below a predetermined engine load and the pressure drop exceeding a predetermined pressure drop.

Another aspect of this discussion includes a computer program product readable by a computing system and encoding instructions for a computer process for operating an engine air intake filter assembly having a pulse jet cleaning arrangement constructed and arranged to selectively direct pulses of air through an air filter arrangement. The computer process includes the method as previously discussed.

BRIEF DESCRIPTION OF THE DRAWINGS

FIG. 12 is a schematic, top plan view of the bottom portion of the assembly shown in FIG. 10;

FIG. 13 is a schematic, top perspective view of the bottom portion of the assembly shown in FIG. 12;

FIG. 14 is a schematic, side elevational view of the bottom portion of the assembly shown in FIG. 12;

FIG. 23 is a schematic, top plan view of the retention system of FIG. 22;

FIG. 24 is a schematic, side elevational view of the retention system of FIG. 22;

FIG. 25 is a schematic, front elevational view of the retention system of FIG. 22;

DETAILED DESCRIPTION

I. Disclosure of U.S. patent application Ser. No. 09/325,697

A. Environment of Use; System Demand

The arrangements depicted in drawings 1–35 and described in U.S. patent application Ser. No. 09/325,697, and the principles defined in association with them, were specifically designed for advantageous application in certain types of equipment and work environments. While the principles could be applied in a variety of alternate applications, the unique arrangements described are particularly advantageous for the identified systems of use.

According to U.S. Ser. No. 09/325,697, typical systems in which equipment of the type defined therein will be useful are engine applications concerning large engines, typically 500 to 2,000 hp (37.3–149.2 KW). Such engines are generally defined by air flow demands on the order of about 1,300 to 4,500 cfm (81,000 to 281,000 pwm).

According to U.S. Ser. No. 09/325,697, in general, it is desirable that such equipment be able to operate with no more than about 25 inches (63.5 cm) of water restriction across the air cleaner system. With conventional air filter technology this could mean that, due to air filter occlusion, the air filters would generally need to be changed with a frequency of about 250 hours. Longer periods of time between air filter changing and refurbishment without operation above the limiting restriction of about 25 inches (63.5 cm) of water have been sought by manufacturers and users of such equipment.

B. A Typical Improved System According to U.S. Ser. No. 09/325,697

In FIGS. 1–35, an air cleaner system utilizing principles according to that described in U.S. Ser. No. 09/325,697 is depicted.

Figure 1:
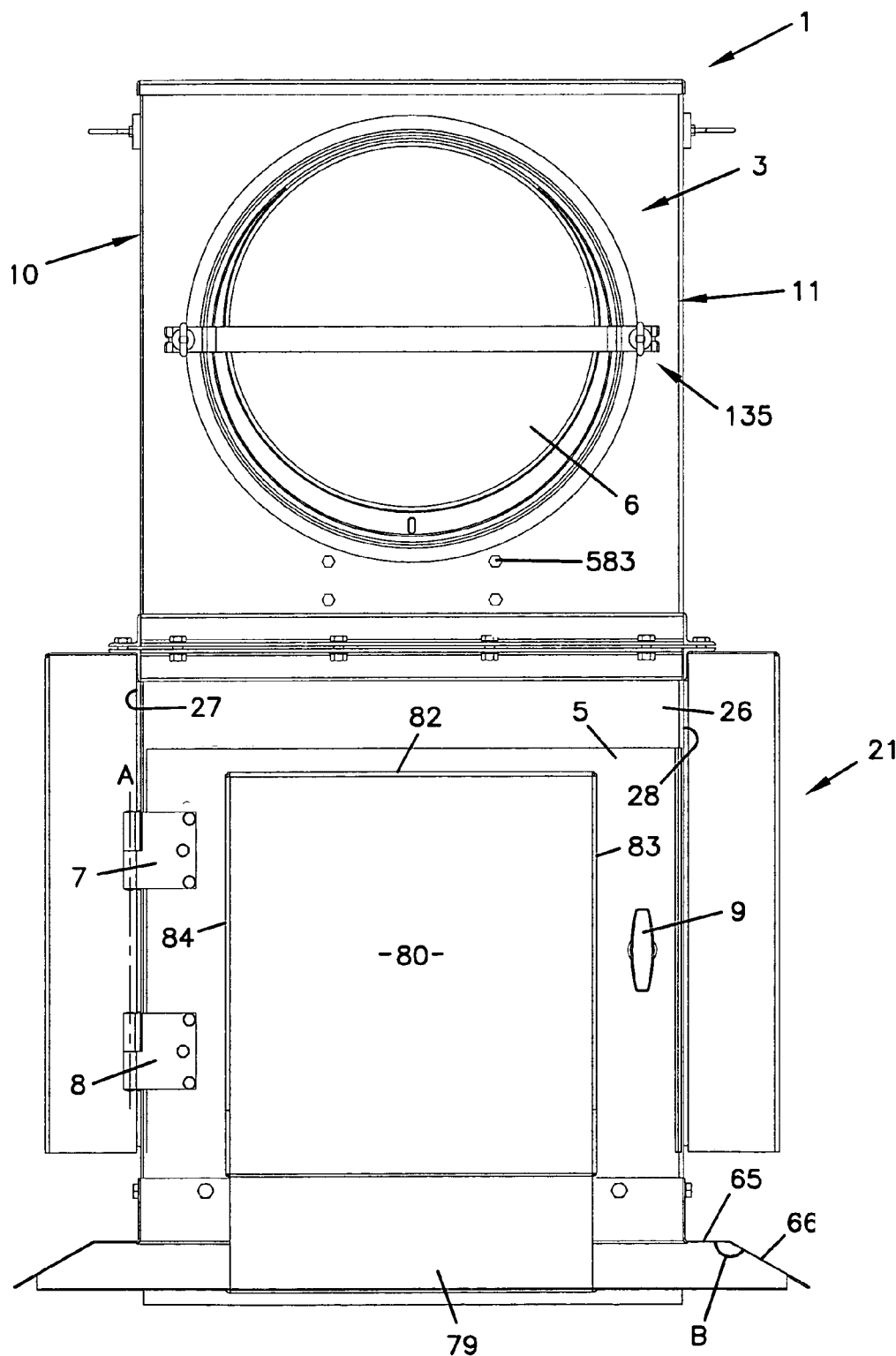
FIG. 1 is a schematic front elevational view of an assembly according to the present invention.

Referring to FIG. 1, reference No. 1 generally designates an air cleaner arrangement or assembly utilizing principles according to U.S. Ser. No. 09/325,697. As will be apparent from the description of U.S. Ser. No. 09/325,697, alternate embodiments, arrangements, and applications are sensible.

In U.S. Ser. No. 09/325,697, the assembly 1, FIG. 1, is depicted in front elevational view. By "front" in this context, reference is meant to a side 3 of the assembly 1 on which one or more access hatches or covers are provided for normal servicing. For the particular air cleaner assembly 1 depicted in U.S. Ser. No. 09/325,697, mounted on the front side 3 are first and second access doors, hatches, or covers 5 and 6. The first cover 5 opens to allow service access to a first stage air cleaner assembly; and the second access cover 6 is oriented to allow service access to a second stage air cleaner assembly.

The first cover 5 is pivotally secured to the assembly 1 by first and second hinges 7, 8. Preferably, the first and second hinges 7, 8 are conventional hinges and are typically bolted or riveted to the assembly 1 and the first cover 5. The first and second hinges 7, 8 allow the first cover 5 to swing outwardly away from the assembly 1 about a fixed axis A defined by the hinges 7, 8. The first cover 5 also includes a latching device 9. Preferably, the latching device 9 is a conventional latching device. By the term "conventional," it is meant any known device that is capable of securing the first cover 5 to the assembly 1. The latching device 9 prevents the first cover 5 from swinging outwardly away from the assembly 1.

Although not required for all applications of the technology described in U.S. Ser. No. 09/325,697, in the particular embodiment shown, the access doors or covers 5 and 6 are positioned on the same side, i.e. the front side 3 of the assembly 1. This will be a particularly convenient design for vehicle and equipment manufacturers, since for overall equipment design, the manufacturer need only provide the wide space of access to the air cleaner assembly 1 for removal and servicing of elements on the front side 3 of the assembly 1.

The particular assembly 1 depicted in FIGS. 1–5 of U.S. Ser. No. 09/325,697 is somewhat rectangular in horizontal cross-section. Thus, it has four sides of which the front side 3 has already been designated. The other sides comprise sides 10, 11, and 12, identified in general in FIG. 1 (front elevation), FIG. 2 (side elevation), and FIG. 3 (top plan). The side 12 would typically be referenced as the back, or rear, side; i.e., the rear side 12 facing opposite the front side 3 of the assembly 1.

Figure 4:
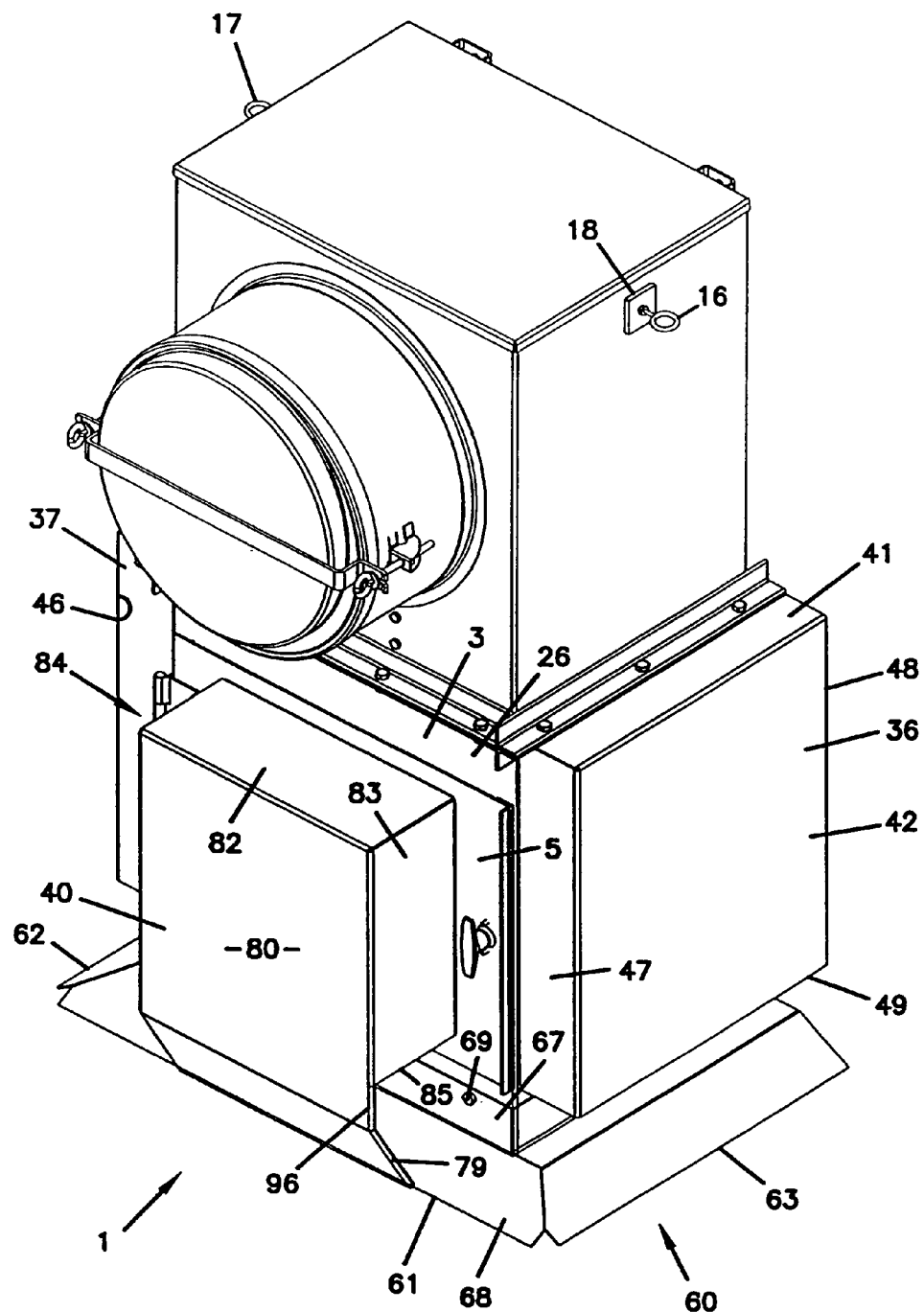
FIG. 4 is a schematic, front perspective view of the assembly shown in FIG. 1.

Referring to FIG. 4, first and second lifting rings 16, 17 are provided. The first and second lifting rings 16, 17 are attached to first and second plates 18, 19, FIG. 7. The first and second plates are secured as part of the assembly 1 by, for example, welding. The lifting rings 16, 17 are arranged and configured to allow a lifting device, such as a crane, to lift the assembly 1 for mounting on a vehicle, such as a heavy haul truck.

Figure 6:
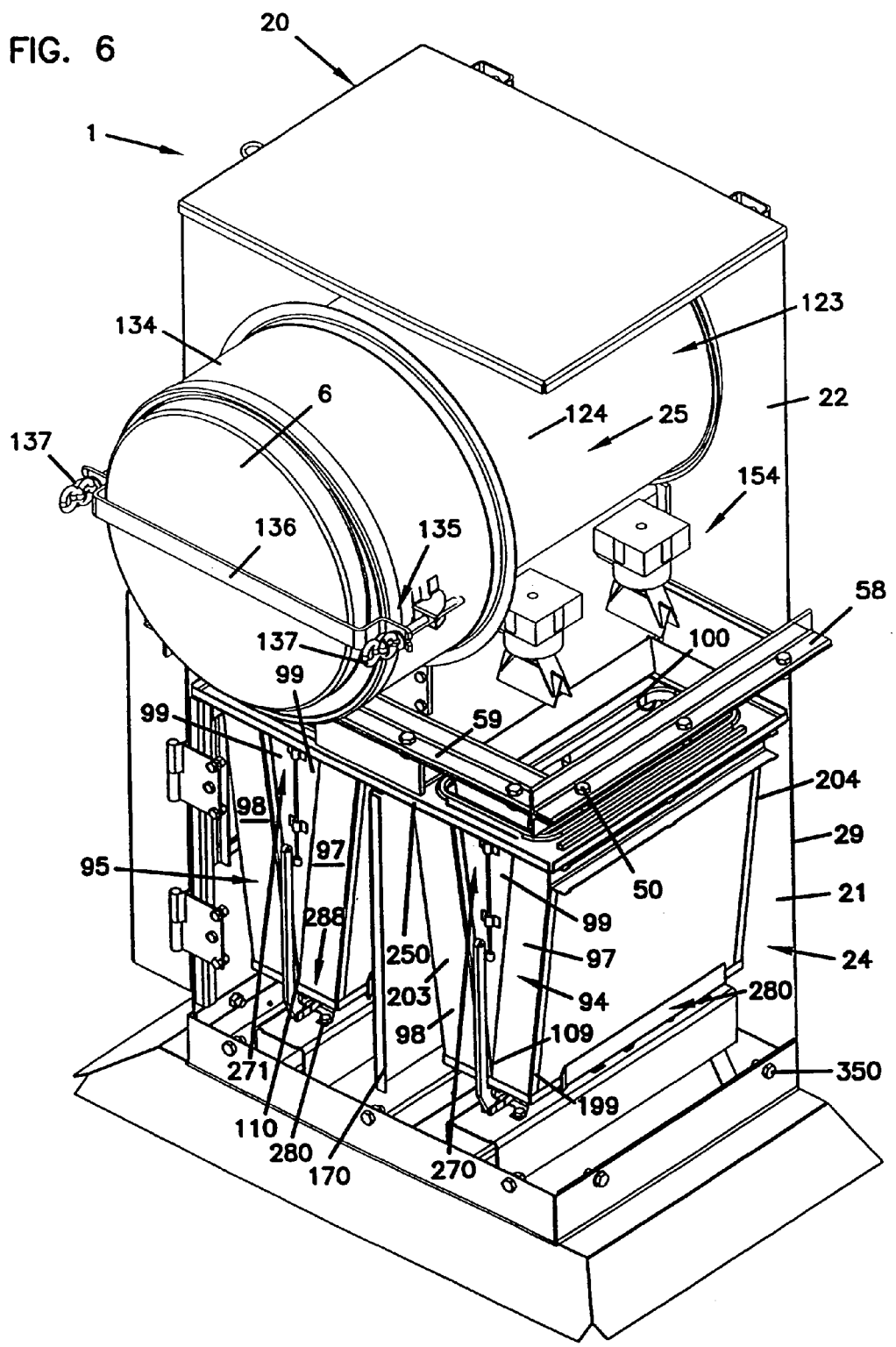
FIG. 6 is a schematic, front perspective view analogous to FIG. 4, with portions broken away to show internal detail.

Attention is now directed to FIG. 6, a perspective view of the air cleaner assembly 1, similar to FIG. 4 but with portions broken away to show internal detail. From reference to FIG. 6, general operation of the overall air cleaner assembly 1 will be readily understood.

According to U.S. Ser. No. 09/325,697, in general, the air cleaner assembly 1 includes an outer housing 20 divided into first and second chambers 21 and 22. A first stage air cleaner arrangement 24 is positioned in chamber 21, and a second stage air cleaner 25 is positioned in the second chamber 22. For the particular embodiment shown, the chambers 21 and 22 are positioned in a vertical stack with chamber 22 positioned generally above chamber 21 for normal use. In the particular embodiment illustrated, the first and second chambers 21, 22 are manufactured separately from each other and are secured together.

Figure 16:
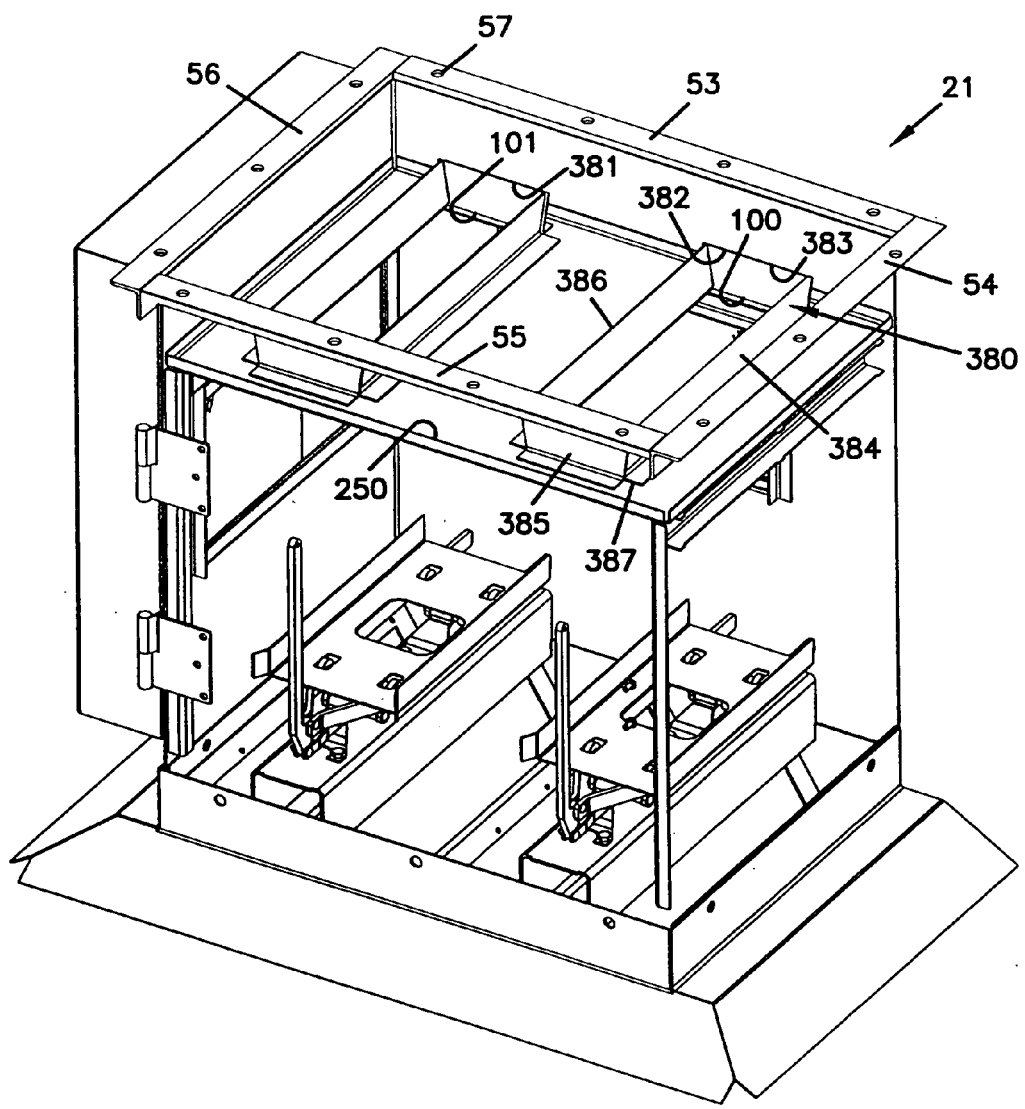
FIG. 16 is a schematic, perspective view of the first chamber of the assembly of FIG. 1, with portions broken away to show internal detail.

Attention is directed to FIG. 16. FIG. 16 is a schematic, perspective view of the first chamber 21 of the assembly 1 (FIG. 6) with portions broken away to show internal detail. According to U.S. Ser. No. 09/325,697, the first chamber 21 is constructed with first, second, third, and fourth flanges 53–56. Preferably, each of the flanges 53–56 includes a plurality of bolt holes 57. Referring back to FIG. 6, analogously, the second chamber 22 is also constructed with first (not shown), second 58, third 59, and fourth (not shown) flanges including a plurality of bolt holes (not shown). The flanges 58, 59 of the second chamber 22 are arranged and configured to mate with the flanges 53–56 (FIG. 16) of the first chamber 21 and the bolt holes 57 of the first chamber 21 are arranged and configured to align with the bolt holes of the second chamber 22, such that a plurality of bolts 50 positioned through the plurality of bolt holes 57 secure the first chamber 21 to the second chamber 22.

Figure 2:
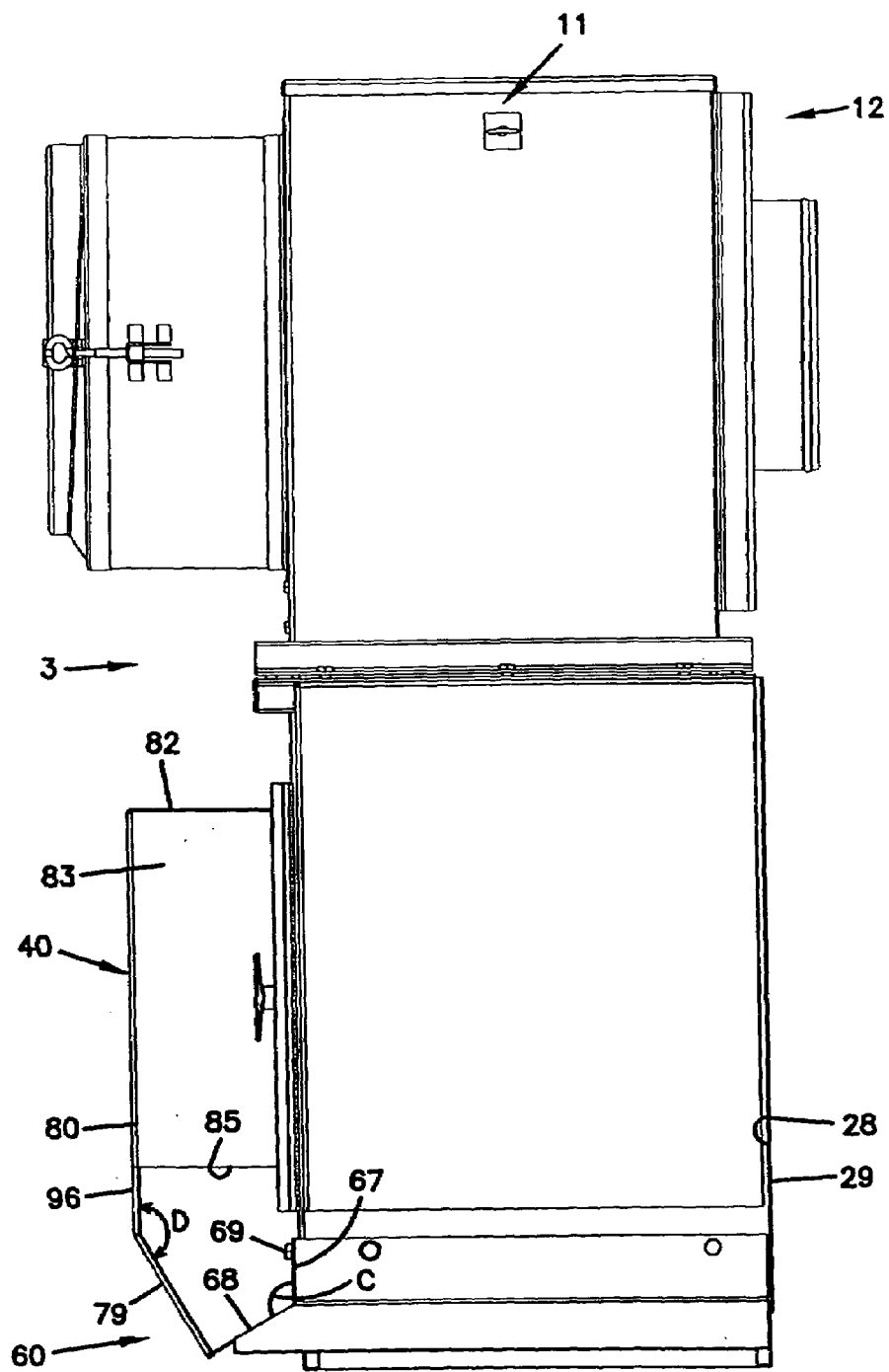
FIG. 2 is a schematic, right side elevational view of the assembly shown in FIG. 1.
Figure 3:
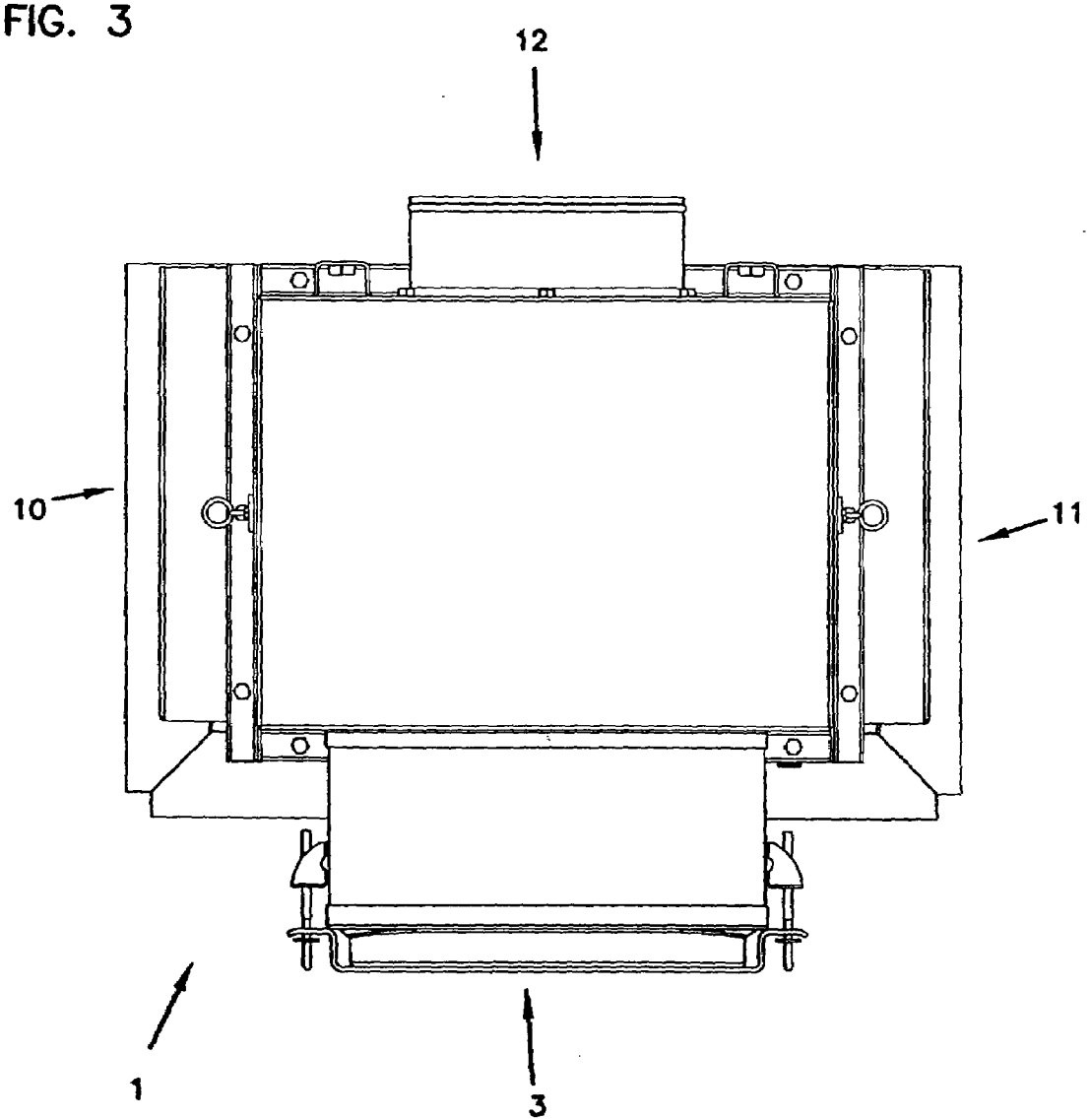
FIG. 3 is a schematic, top plan view of the assembly shown in FIG. 1.
Figure 5:
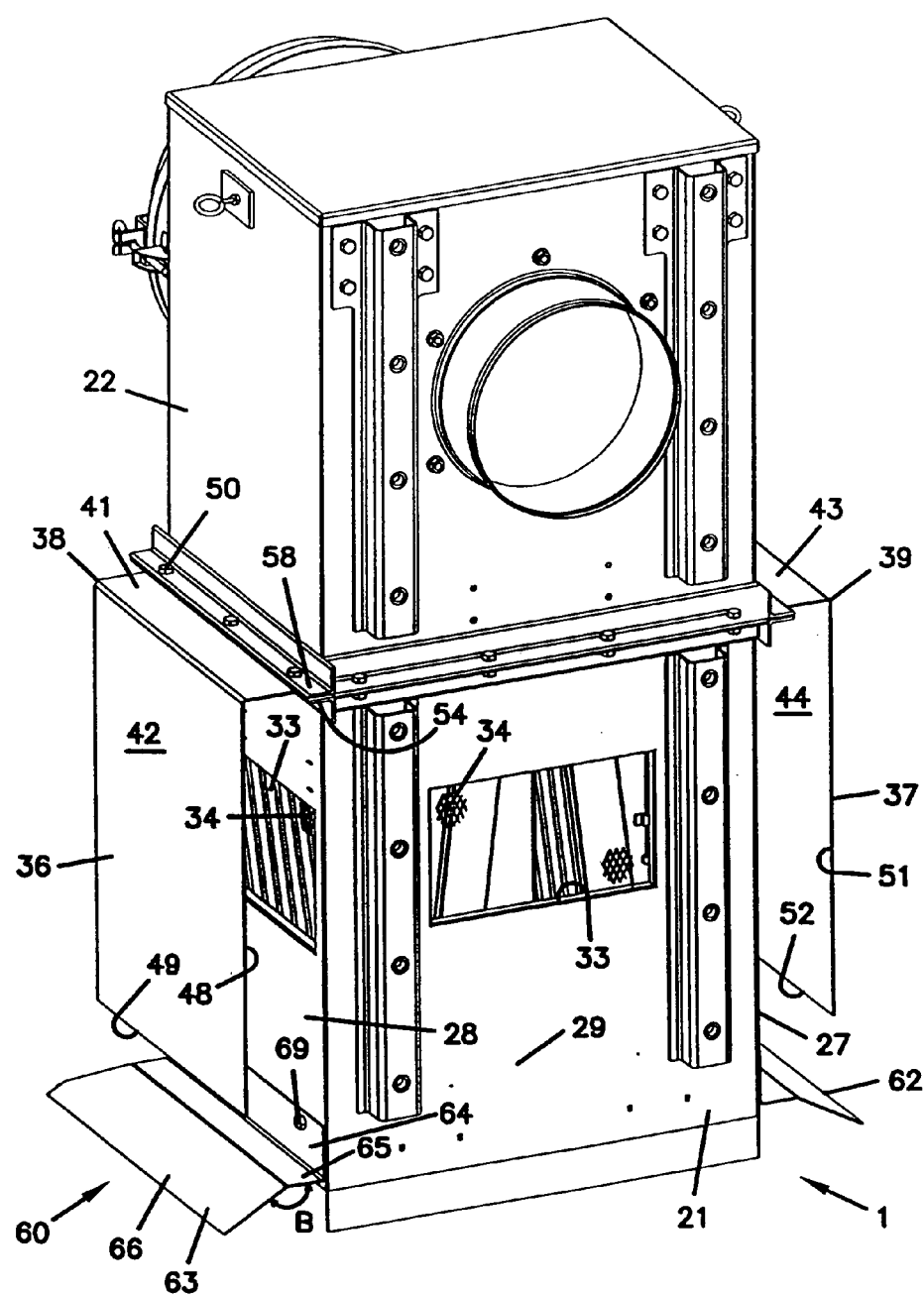
FIG. 5 is a schematic, rear perspective view of the assembly shown in FIG. 1.

According to U.S. Ser. No. 09/325,697, in general, the first or lower chamber 21, FIGS. 1 and 2, is defined by first, second, third, and fourth side walls 26 (front), 27 (side), 28 (side), and 29 (back). Attention is directed to FIG. 5. Each of the side walls 26–29 (FIGS. 1,2, and 5) has defined therein an open aperture, air inlet, or window 33 through which air to be filtered by the air cleaner assembly 1 can pass into the assembly 1 for cleaning. Each of the air inlets 33 is, in preferred embodiments, covered by a protective screen 34. The air inlet 33 and the screen 34 in the rear panel 29 are viewable in FIG. 5, as are the air inlet 33 and screen 34 in panel 28.

Still referring to FIG. 5 and U.S. Ser. No. 09/325,697, note that mounted on side wall 28 is a first weather cover 36. Still referring to FIG. 5, note also a second weather cover 37 mounted on or extending from the side wall 27. Weather covers, such as first and second weather covers 36 and 37, protect corresponding air inlets 33 positioned thereunder from entrance by undesirable levels of rain, snow, and the like.

Referring to FIG. 4, it is noted that the assembly 1 also includes a third weather cover 40 on the front side 3. In the embodiment shown, the third weather cover 40 is mounted on the first access cover 5. The first access cover 5 includes an air inlet 33 therein, covered by a screen 34. In general these are viewable in FIG. 15.

Referring to FIG. 5 and U.S. Ser. No. 09/325,697, the weather covers 36, 37 preferably comprise a single piece of material, such as metal, bent at first and second angles 38, 39, respectively. Preferably, the first and second angles 38, 39 are approximately ninety degrees. The first angle 38 separates the first weather cover 36 into first and second sections 41, 42. Likewise, the second angle 39 separates the second weather cover 37 into first and second sections 43, 44. In the particular embodiment depicted, the first sections 41, 43 are attached as part of the assembly 1. Preferably, the first section 41 of the first weather cover 36 is attached as part of the assembly 1 by placing the first section 41 of the first weather cover 36 under the flanges 54, 58 of the first and second chambers 21, 22, respectively, and securing the cover 36 in place by, for example, welding. Likewise, the second section 43 of the second weather cover 37 is attached as part of the assembly 1.

Referring to FIG. 4, the first weather cover 36 also includes a third section 47. Preferably, the third section 47 is attached to the first and second sections 41, 42 of the weather cover 36. For example, the third section 47 may be welded to the first and second sections 41, 42. Likewise, the second weather cover 37 also includes a third section 46 analogous to the third section 47 of the first weather cover 36.

Referring back to FIG. 5, in the preferred embodiment depicted in U.S. Ser. No. 09/325,697, the first sections 41, 43 of the weather covers 36, 37, respectively, extend generally perpendicular to the side walls 28, 27, respectively, of the assembly 1. The first sections 41, 43 prevent undesirable levels of weather elements, such as rain, from entering the air inlets 33 from the top, or parallel directions. In the preferred embodiment of U.S. Ser. No. 09/325,697, the second sections 42, 44 of the weather covers 36, 37, respectively, extend generally parallel to the side walls 28, 27, respectively, or orthogonal to the ground. The first and second sections 42, 44 prevent undesirable levels of weather elements from entering the air inlets 33 from the side, or perpendicular directions. Alternatively, the second sections 42, 44 are oriented spaced from, but covering, the air inlets 33 in the walls 28, 27, respectively. Referring back to FIG. 4, the third sections 46, 47 prevent the weather elements from entering the air inlets 33 from the front. Referring back to FIG. 5, the first weather cover 36 is open along a rear edge 48 and along a bottom edge 49. These are directions from which falling or wind blown elements are less likely to be able to enter the covered air inlet 33 in the side 28 of the assembly 1, and therefore, these areas are accessible for air to enter the assembly 1. Likewise, the second weather cover 37 is open along a rear edge 51 and along a bottom edge 52.

It is noted that the assembly 1 does not include, mounted thereon, a weather cover over the air inlet 33 in the rear wall 29. It is anticipated by U.S. Ser. No. 09/325,697 that in typical systems, the assembly 1 will be mounted on the vehicle such that the rear wall 29 does not need a weather cover, because the vehicle itself prevents the elements from entering the air inlet 33.

Referring to FIGS. 4 and 5, according to U.S. Ser. No. 09/325,697, the assembly 1 includes a bottom skirt or splash guard 60. The bottom splash guard 60 includes first, second, and third segments 61, 62, and 63 mounted to extend outwardly from bottom portions of walls 26, 27, and 28, FIG. 1, respectively. The splash guard or skirt 60 inhibits undesirable levels of water from being splashed up into the air inlet 33 from the underside of the assembly 1.

Referring to FIG. 5, the third splash guard section 63, and analogously the second section 62, includes a mounting strip 64 by which the splash guard 60 is mounted on the wall 28; a base extension 65; and an angled splash extension 66. Preferably, the angled splash extension 66 projects over an angle B, FIG. 5, relative to base section 65 of 110 to 160°, preferably about 135°. Preferably, the base section 65 is mounted on the assembly 1 by a plurality of bolts 69. Of course, other means of attachment may be used, such as welding.

Referring to FIG. 4, the first or front extension 61 of the splash guard 60 includes a mounting strip 67 and a downwardly extending section 68, preferably having an angle C with respect to the mounting strip 67, FIG. 2. Preferably the angle C is between 110 to 160°, and most preferably is about 135°. Preferably, the mounting strip 67 is mounted to the assembly 1 by a plurality of bolts 69. Of course, other means of attachment may be used, such as welding.

It is also noted that the front weather cover 40, FIG. 4, includes a downwardly and rearwardly extending splash guard extension 79 that extends from a region 96 mounted on surface panel 80 generally toward skirt section 68, preferably at an angle D with respect to region 96, FIG. 2. Preferably, the angle D is between 110 to 160°, and most preferably is about 135°. The splash guard extension 79 prevents undesirable levels of water from being splashed up underneath the cover 40. The cover 40 also includes a top panel 82 and opposite side panels 83, 84 (FIG. 4). It is open, however, underneath edge 85 to allow air to enter the assembly 1.

Referring back to FIG. 5, as indicated in U.S. Ser. No. 09/325,697, air to be filtered by the air cleaner assembly 1 passes into the air cleaner assembly 1 through the air inlets 33. In the preferred embodiment shown, the air inlets 33 allow for direct transfer of the air into the first chamber 21 (FIG. 6). By the term "direct," or variants thereof in this context, reference is meant to air flow from the exterior environment that does not first pass into the second chamber 22. Referring back to FIG. 6, within the first chamber 21, the air is passed through the first stage air cleaner 24. For the particular arrangement shown in FIG. 6 and described in U.S. Ser. No. 09/325,697, the first stage air cleaner 24 includes two V-shaped air filter constructions 94, 95, sometimes referred to therein as V-packs. Detail concerning the preferred construction of the V-shaped filter constructions 94, 95 is provided in U.S. Ser. No. 09/325,697. In general, the V-shaped filter constructions 94, 95 are preferably identical in construction, and each includes first and second opposite filter panels 97 and 98. The panels 97 and 98, for each V-shaped filter 94, 95, are mounted in a frame 199 to define an internal, V-shaped, interior chamber or clean air plenum 99. The air is filtered as it passes from the region exterior to the V-shaped filters 94, 95 to the clean air plenum 99. After this filtering in the first stage 24, the air then passes through passageways 100, 101, FIG. 16, into the upper chamber 22.

For the particular arrangement shown in FIG. 6 and described in U.S. Ser. No. 09/325,697, the V-packs or V-shaped air filter constructions 94, 95 are vertically oriented. By the term "vertically oriented," it is meant that in the normal installation on vehicles or equipment standing on level ground the orientation of the V-shaped filter elements 94, 95 will be such that vertices 109, 110, respectively, of the V's are directed downward. It is, of course, possible to use alternate constructions in association with the techniques described herein, although the vertically oriented configuration shown in FIG. 6 is preferred.

Alternate orientations would include an "inverted orientation," which would be one in which the vertices 109, 110 of the V's are directed upward; and, laterally oriented ones, in which the vertices 109, 110 of the V's are directed sideways. There would, in general, be two types of laterally oriented arrangements: one in which the elements 94, 95 are standing on one of the ends 203, 204; and ones in which the ends 203, 204 extend orthogonally to the ground. Of course, alternate configurations of the overall assembly 1 would be needed for alternate orientations of the V-packs 94, 95. Although alternate orientations and configurations are possible, the "vertical" orientation for the V-shaped filters 94, 95 will be preferred, for reasons of: air flow, pulse cleaning, assembly, and servicing. The preferred V-packs 94, 95 are characterized below in connection with FIGS. 1–21 of U.S. Ser. No. 09/325,697.

Figures 26, 27:
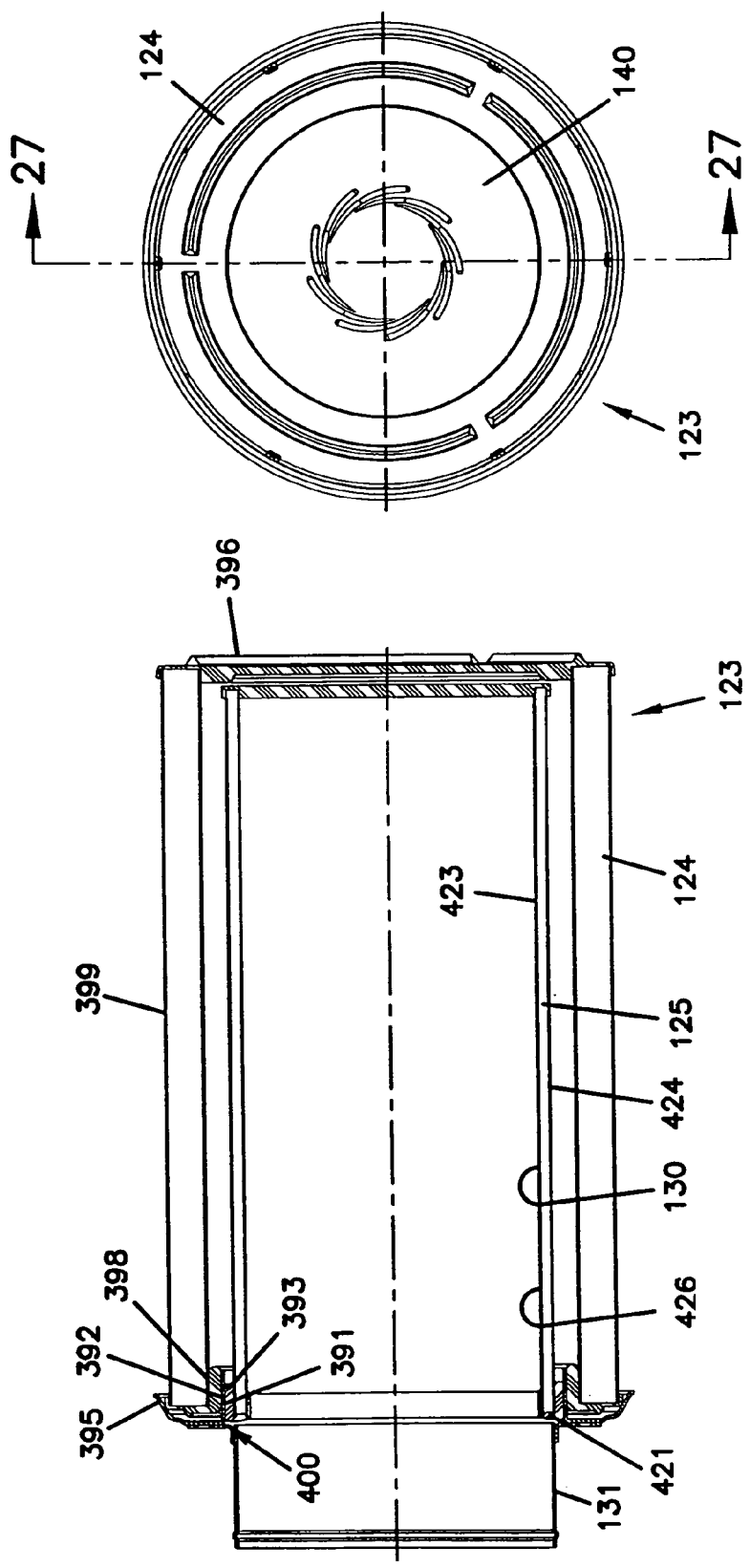
FIG. 26 is a schematic, end elevational view of portions of the second chamber of the assembly of FIG. 6.
FIG. 27 is a schematic, cross-sectional view taken along line 27—27 of FIG. 26.

The upper chamber 22 includes, positioned therein, the second stage filter system 25. For the arrangement shown, the second stage filter system 25 comprises a cylindrical filter construction 123. Attention is directed to FIGS. 26 and 27. FIG. 26 is a schematic, end elevational view of portions of the cylindrical filter construction 123. FIG. 27 is a schematic, cross-sectional view taken along line 27—27 of FIG. 26. For the particular arrangement shown, the cylindrical construction 123 includes a primary element 124, shown in perspective view in FIG. 17, and a secondary or safety element 125, shown in perspective view in FIG. 18. During operation, the air is passed through the primary element 124 and the safety element 125 into a central clean air plenum 130. The filtered air then passes outwardly through outlet tube 131 to the engine air intake duct (not shown).

Periodically, it may be desirable to remove the primary element 124, and in some instances the safety element 125, for inspection and in some instances refurbishing or replacement. Referring back to FIG. 6 of U.S. Ser. No. 09/325,697, the second cover 6 provides access for this. The second cover 6 is mounted on a cylindrical extension 134 and is secured in place by a clamp arrangement 135. When the clamp arrangement 135, which comprises a strap 136 secured by bolts 137, is loosened, access through the tube or extension 134 is provided to an end 140, FIG. 26, of the primary element 124. The primary element 124 can thus be grasped and be removed from its mounting on the outlet tube 131, FIG. 27, exposing the safety element 125, FIG. 27, that can also be removed if desired.

Details concerning the preferred construction and mounting of the primary element 124 and the safety element 125 are provided below and in the '697 application, in connection with FIGS. 15, 17, 18, 26, and 27.

Figure 7:
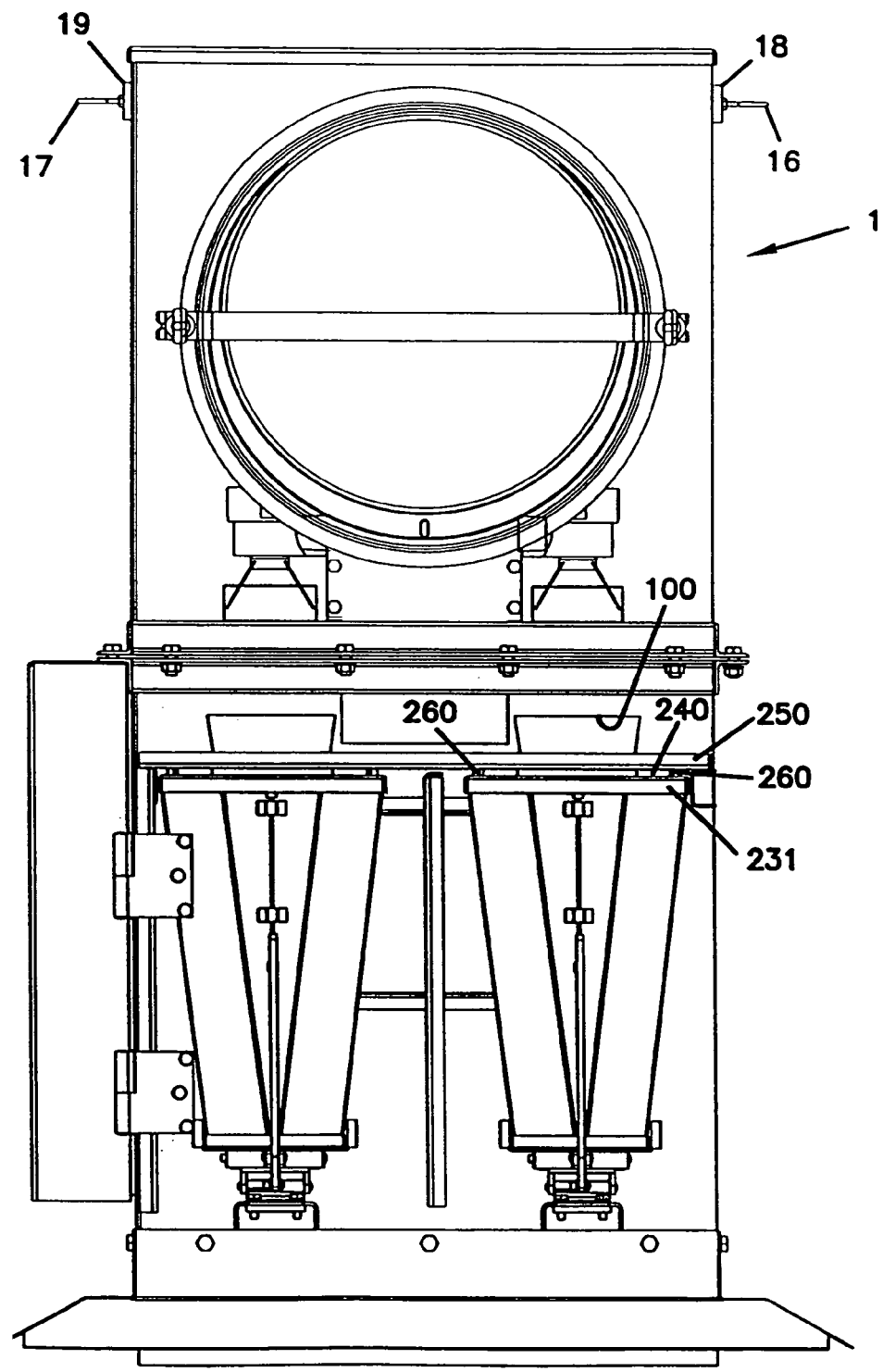
FIG. 7 is a schematic, front elevational view of the assembly as depicted in FIG. 6.
Figure 8:
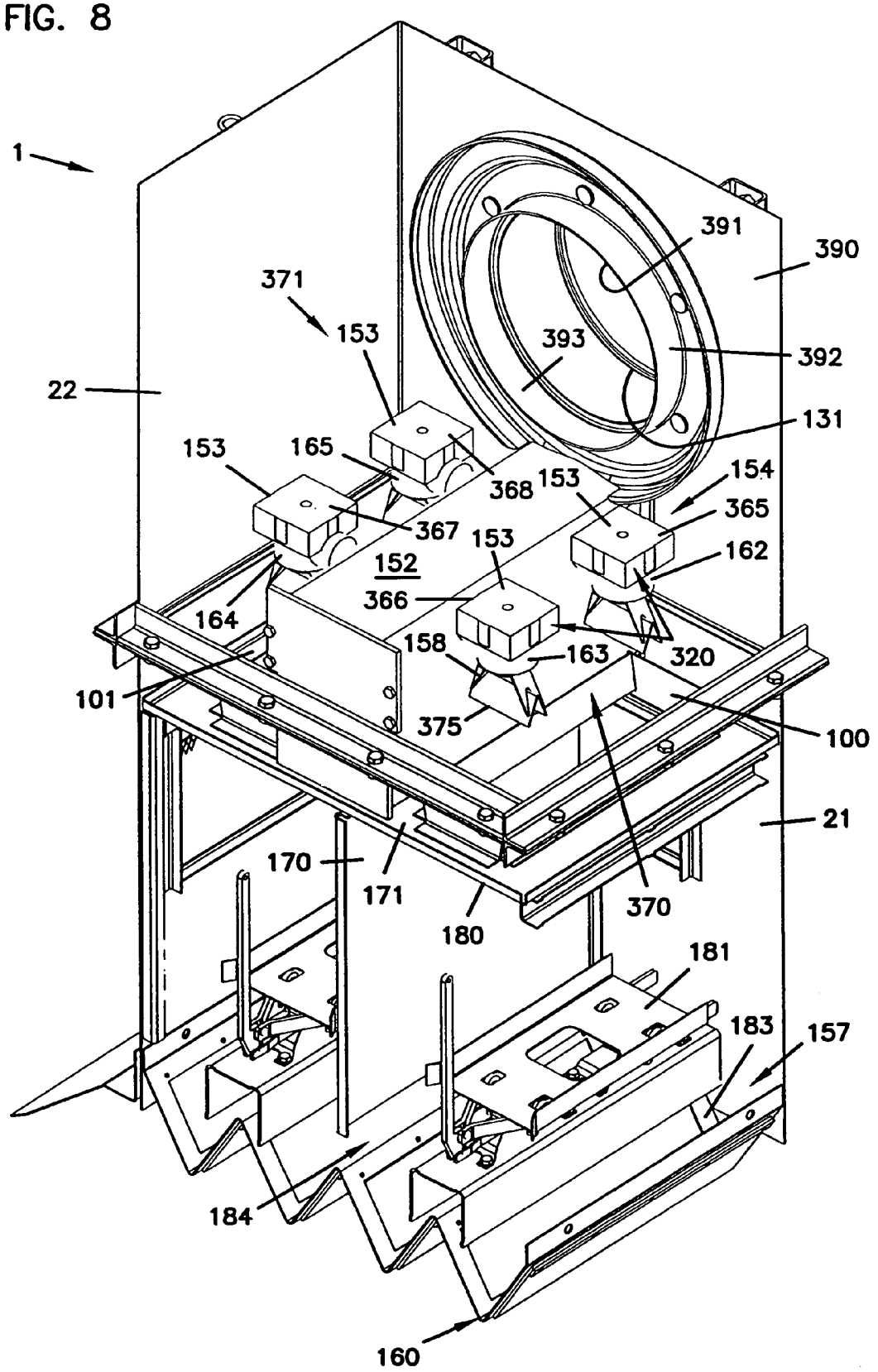
FIG. 8 is a schematic, internal prospective view of portions of the assembly of FIG. 1.

Attention is directed to FIGS. 7 and 8 of U.S. Ser. No. 09/325,697. FIG. 7 is a front elevational view showing the assembly 1 with portions of the top, the right side 11, FIG. 1, and the front side 3, FIG. 1, removed to show certain internal parts. In FIG. 8, the assembly 1 is shown without the V-shaped constructions 94, 95, the primary element 124, and the safety element 125. FIG. 8 is analogous to FIG. 7, but with additional portions removed to show more internal detail and represents a perspective view.

Again referring to FIG. 6 and according to U.S. Ser. No. 09/325,697, the first stage air cleaner 24 includes a reverse pulse cleaning arrangement 154. Periodically, preferably in accord with a selected program schedule as described hereinbelow, the reverse pulse cleaning system 154 is operated to direct reverse jets of air through the V-shaped constructions 94, 95 in the first stage 24. This will serve to knock dust cake off the outer or upstream surfaces of the panels 97 and 98 of the V-shaped constructions 94, 95. Referring to FIG. 8, the dislodged dust will, under gravity influence, pass toward a bottom region 157 of the first chamber 21 and outwardly through a dust exhaust valve arrangement 160. A preferred construction of the dust exhaust valve arrangement 160, as shown in FIGS. 8, and 12–14, is discussed the '697 application.

Referring to FIG. 8 of U.S. Ser. No. 09/325,697, in order to generate and direct the cleaning jets of air, the pulse cleaning system 154 includes four pulse jet nozzles 162, 163, 164, 165; two associated with each V-pack 94, 95 (FIG.

6). Specific preferred constructions of the pulse jet nozzles 162–165 are discussed in greater detail below and in the '697 application.

Referring to FIGS. 6 and 8 of U.S. Ser. No. 09/325,697, a central baffle 170 is positioned in the first chamber 21, between the two V-packs 94, 95. The central baffle 170 depends downwardly from a tube sheet 171, generally at least 50% or more, preferably at least 70%, and most preferably at least 90% of the distance between a top 180 of the first chamber 21, and a lowest level 181 of extension of the V-packs 94, 95, when the V-packs 94, 95 are positioned for filtering. Preferably, the baffle 170 extends below this lower level 181. The baffle 170 helps prevent dust that has been blown off the V-packs 94, 95 by the air from the pulse jet nozzles 162–165 from being transferred to the next adjacent V-pack 94, 95. Rather, due to the baffle 170, the dust is more likely to pass downwardly to the bottom 183 of the first chamber 21.

The term "bottom end 183," when used in connection with the characterization of the first chamber 21, refers to a region 184. It will be understood from further descriptions that the region 184 is the location at which equipment that supports the V-packs 94, 95 is positioned within the assembly 1. The portion of the housing 20 that includes the dust exhaust valve arrangement 160 generally depends downwardly from the bottom end 183.

C. The V-Pack Filters of U.S. Ser. No. 09/325,697

Figure 19:
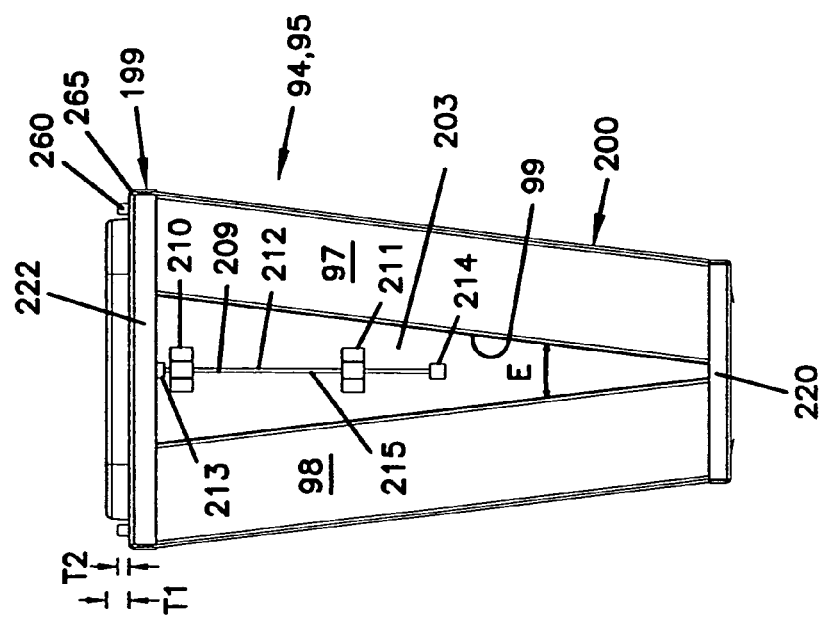
FIG. 19 is a schematic, end elevational view of one of the V-packs of FIG. 6.
Figure 20:
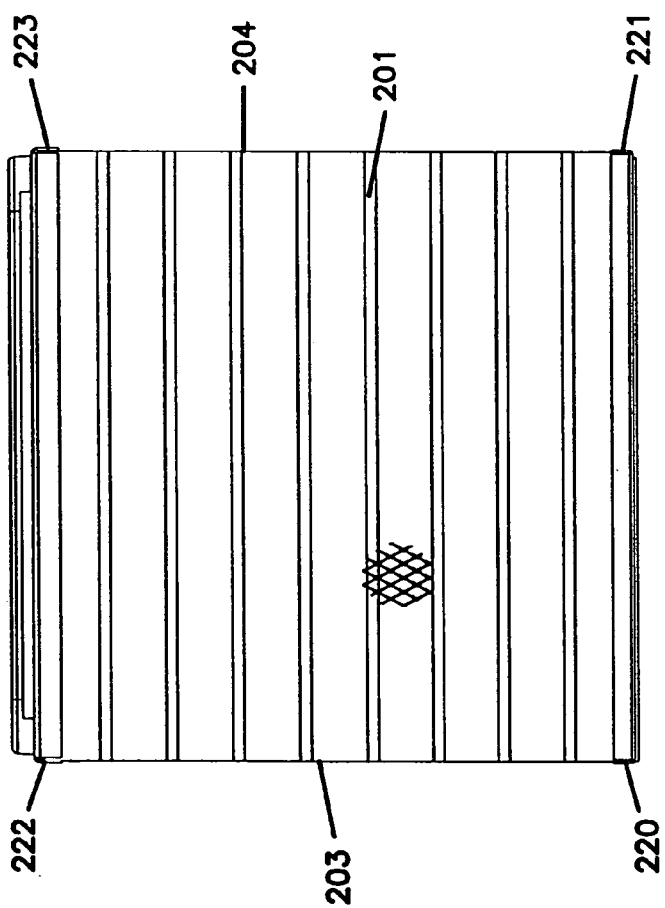
FIG. 20 is a schematic, side elevational view of one of the V-packs of FIG. 6.
Figure 21:
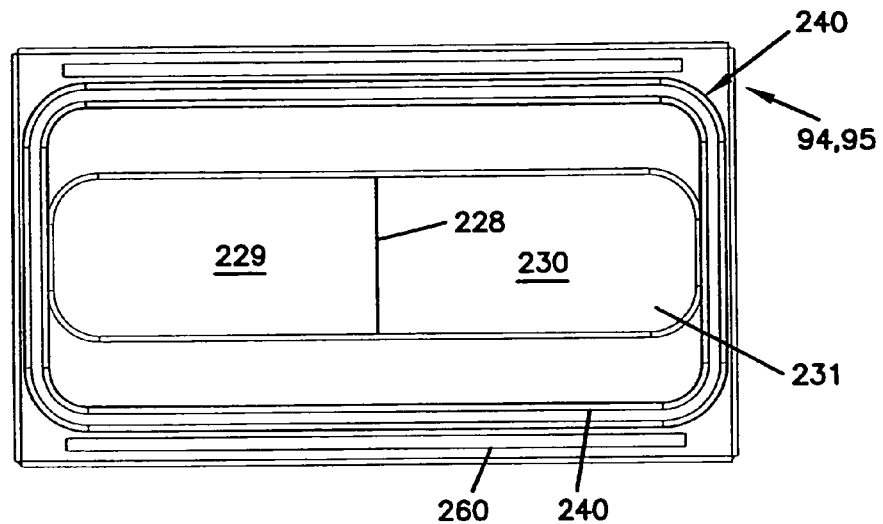
FIG. 21 is a schematic, top plan view of one of the V-packs of FIG. 6.

Attention is directed to FIGS. 19–21 of U.S. Ser. No. 09/325,697. In FIG. 19, one of the V-packs 94, 95 is depicted. Each V-pack 94, 95 comprises a pair of panels 97, 98. The panels 97, 98 each comprise an outer frame 199 with media 200 positioned therein. For the preferred arrangements of U.S. Ser. No. 09/325,697, the media 200 is pleated and oriented such that when the V-pack 94, 95 is positioned in the vertical orientation of FIG. 6, the pleats 201 extend horizontally. In general, the media 200 is potted within the frame 199 by an adhesive material such as PVC plastisol (i.e., a polyvinylchloride). Commercially available potting plastisols can be used.

According to U.S. Ser. No. 09/325,697, a variety of materials can be utilized for the media 200. In general, what is required is an appropriate media to achieve a preferred level of efficiency for the V-packs 94, 95. The media chosen for the V-packs 94, 95 is a matter of choice; a variety of conventional medias can be used. For a high-level of cleaning from pulse cycles, a robust media is preferred to help prevent particles from penetrating into the fibers of the media when loading. That is, it is preferred that the media be of a type such that particles will be captured on the outer surface of the media. Usable materials include cellulose or synthetic fiber media.

On the upstream side, a deposit or layer of polymeric fiber material, or "fine fiber," generally having a fiber diameter of 5 microns or less, can be used, in some applications. The amount of fine fiber deposited is a matter of design choice for a given application. In general, the more fine fiber that is used, the larger the restriction. Conversely, the less fine fiber that is used, the higher the occurrence of penetration of the particles during loading. That is, the fine fiber facilitates surface loading and pulse jet cleaning.

One media comprising a fine fiber deposited onto a paper or cellulose material is practiced by Donaldson Company, Inc., the assignee of the present application, in products generally identified under the trademark EON™. These media are manufactured by a trade secret process of Donaldson's. Such media would be useable in arrangements according to the present invention. However, the technique of fine fiber application is not critical to the principles disclosed, and a variety of conventional, well-known, processes could be used.

According to U.S. Ser. No. 09/325,697, each of the V-packs 94, 95 includes first and second opposite end panels 203, 204. The end panels 203, 204 close ends of the clean air plenum 99 when the V-packs 94, 95 are sealed for use. For convenience, one of the panels 203 is shown having a wire handle 209 positioned thereon, FIG. 19. The wire handle 209 is secured in extension between brackets 210, 211. The wire handle 209 comprises an extension of wire 212 having end stops 213, 214 thereon. When a central portion 215 of the flexible wire 212 is pulled, the handle 209 will bow outwardly until the end stops 213, 214 engage the brackets 210, 211. A flexible, collapsible, handle construction 209 is convenient for mounting and dismounting the V-packs 94, 95 and also for carrying the V-packs 94, 95.

Of course, alternate handle designs may be used. For example, a pivotally mounted rigid handle may in some instances be substituted for the type of handle configuration depicted in the figures. In general, preferred handle constructions will be ones that have a flat, enclosed configuration that can be readily opened to be grasped.

Again according to U.S. Ser. No. 09/325,697, in each V-pack 94, 95, the pair of panels 97, 98 is oriented in a V-shape, as shown in FIG. 19. Along one longitudinal edge 220, 221 of each panel 97, 98, the panels 97, 98 are oriented either adjacent one another or closely spaced, whereas along opposite side edges 222, 223, the panels of 97, 98 are spread apart from one another. That is, preferably the panels 97, 98 form a V-shape, most preferably having a filter angle E, FIG. 19, between the panels 97, 98, of at least about 5°, preferably within the range of 10 to 25°, most preferably about 13 to 17°.

Referring to FIG. 21 of U.S. Ser. No. 09/325,697, each V-pack 94, 95 preferably includes a central spacer 228 separating the V-pack 94, 95 into separate regions 229, 230. In use, a separate one of the nozzles 162–165, FIG. 8, is directed into each region 229, 230. The central spacer 228 directs the air from each nozzle 162–165 to an associated region 229, 230 of the V-pack filters 94, 95 to provide directed air sufficient to clean the exterior portions of the panels 97, 98.

The air flow exit end 231 of each V-pack 94, 95 includes a seal arrangement, i.e. a gasket, 240 thereon having a first projection thickness T1. When each V-pack 94, 95 is operatively positioned within the air cleaner assembly 1, the seal arrangement 240 is pressed between an end 231 of the V-pack 94, 95 and the tube sheet 250, as shown in FIG. 7. In general, the seal arrangement 240 is sized to be sealingly positioned around the aperture 100 in the tube sheet 250, FIG. 7.

The preferred V-packs 94, 95 of U.S. Ser. No. 09/325,697 also include a hard stop arrangement 260 thereon have a second projection thickness T2 less than the first thickness T1. Preferably the hard stop arrangement 260 is configured to extend the second thickness T2 of at least about 0.1 inches (2.5 typically about 0.2 inches (5.1 mm) to 0.3 inches (7.6 mm), above (or outwardly from) a top surface 265 of the V-pack frame 199. Also, preferably the seal arrangement 240 is selected such that, prior to being pressed, the seal arrangement 240 extends at least about 0.1 inches (2.5 mm) to 0.3 inches (7.6 mm) beyond the hard stop arrangement 260. In other words, the thickness T1 of the seal arrangement 240 is at least about 0.1 inches (2.5 mm) to 0.3 inches (7.6 mm) greater than the thickness T2 of the hard stop arrangement 260. The hard stop arrangement 260 provides for a hard contact against the tube sheet 250, FIG. 7, as the V-packs 94, 95 are moved into position. For the preferred V-pack 94, 95, FIG. 19, the hard stop arrangement 260 comprises a metal such as steel. Most preferably, the seal arrangement material is polyurethane, having a thickness of at least 0.40 inches in extension outwardly from the surface 265 of the V-pack frame 199.

D. The V-Pack Retention System of U.S. Ser. No. 09/325,697

According to U.S. Ser. No. 09/325,697, when the V-packs 94, 95 are operatively positioned, FIG. 6, each V-pack 94, 95 is under a force of compression, in the direction of arrows 270, 271, respectively, toward the tube sheet 250. To maintain sealing around the seal arrangements 240, retention systems 280 provide a force of compression.

Referring to FIGS. 22–25 of U.S. Ser. No. 09/325,697, the retention systems 280 each include a base structure 281, a control arm 282, a moveable seat 283, and an adjustable lift link arrangement 284.

In operation, when the control arm 282 is in the raised position, the seat 283 is raised upwardly in the direction of arrows 270, 271, FIG. 6, causing a pressuring of the V-packs 94, 95 against the tube sheet 250. When the control arm 282 is lowered, under hand operation, in the direction of arrow 288 the seat 283 is dropped, releasing the sealing pressure. The seat 283 is configured so that when the control arm 282 is dropped, a V-pack 94, 95 can be slid into and out of the seat 283.

Figure 10:
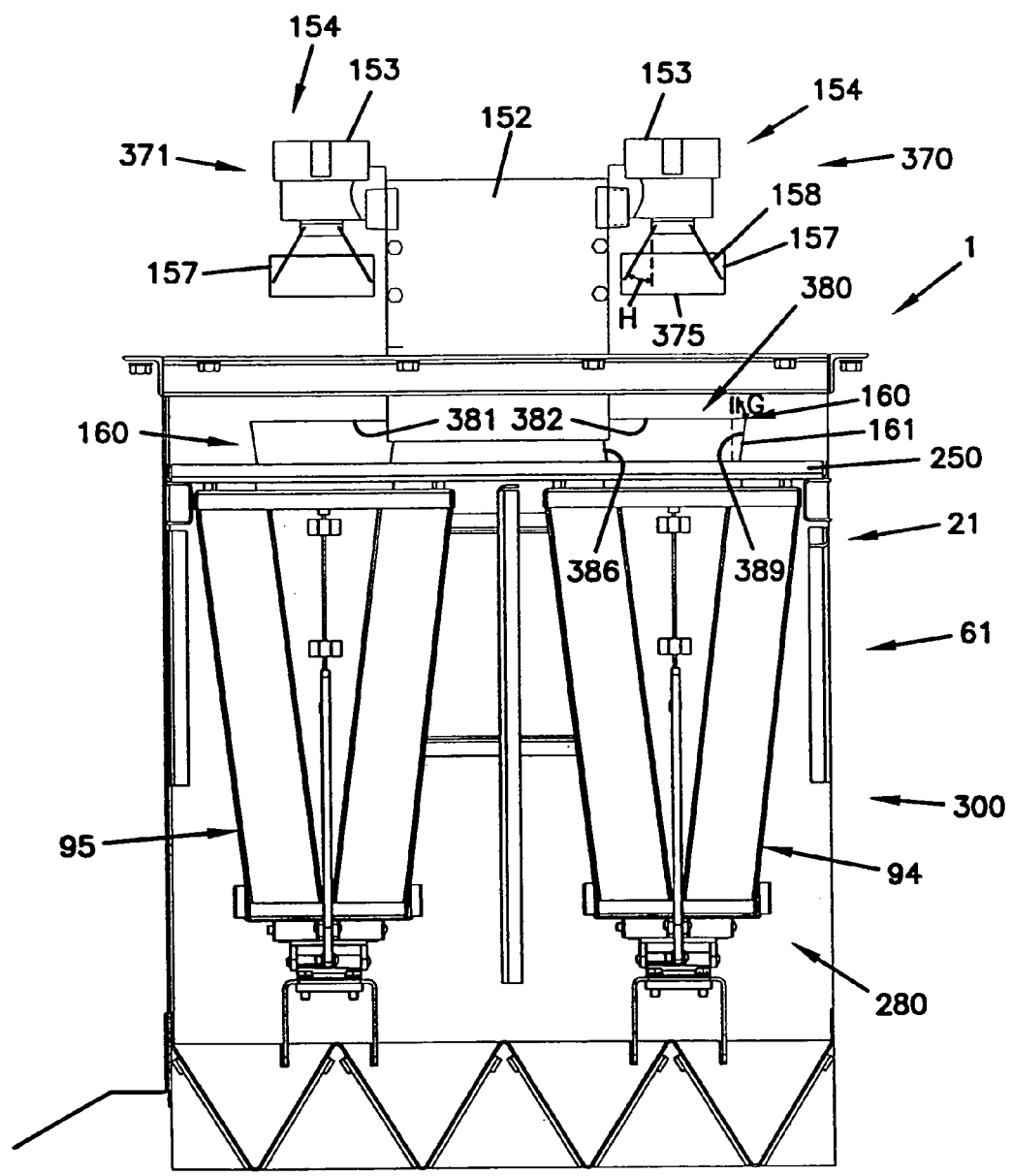
FIG. 10 is a schematic, enlarged, front elevational view of portions of the internal assembly of FIG. 1.
Figure 11:
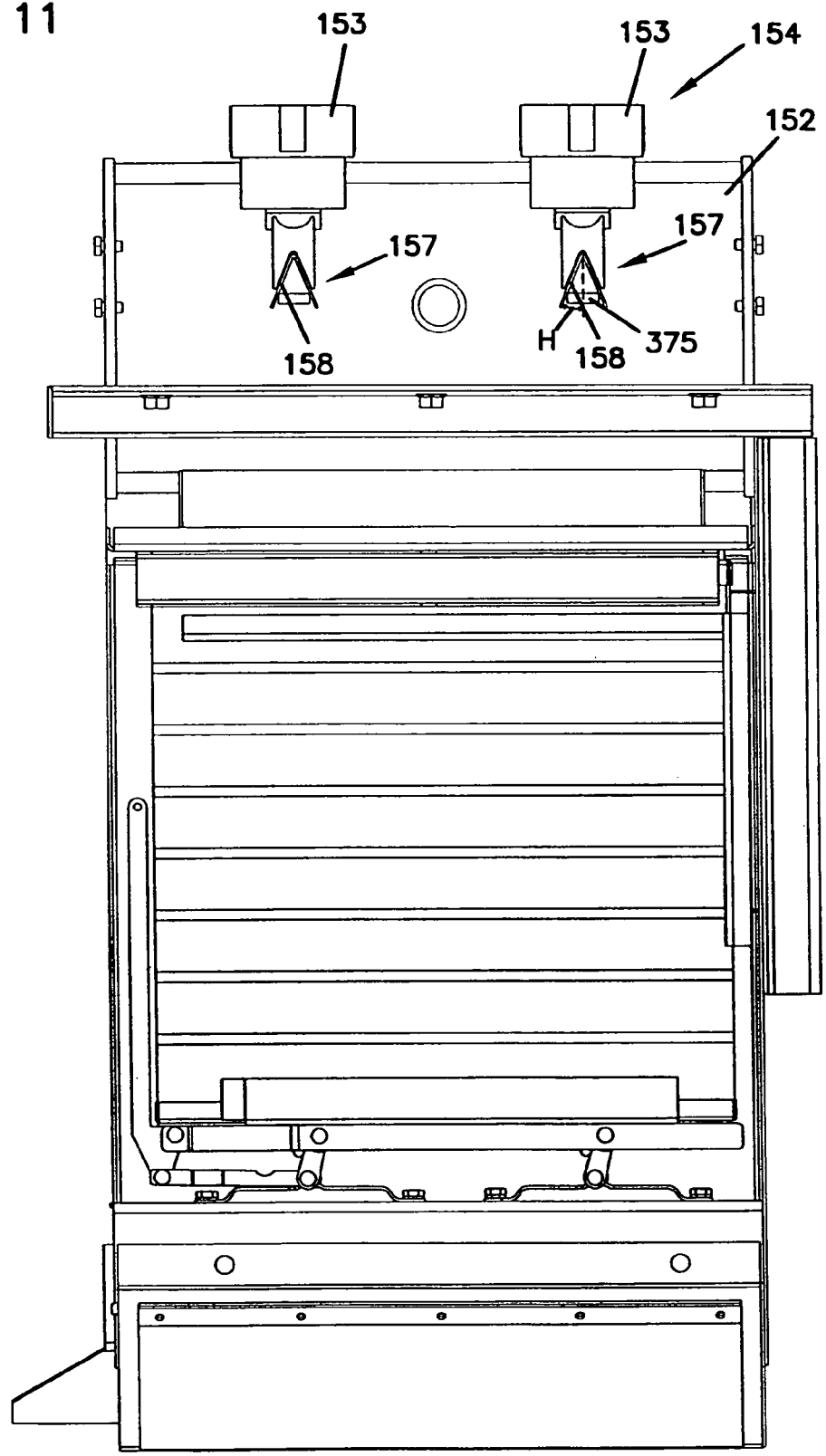
FIG. 11 is a schematic, enlarged, side elevational view of portions of the internal assembly of FIG. 1.
Figure 15:
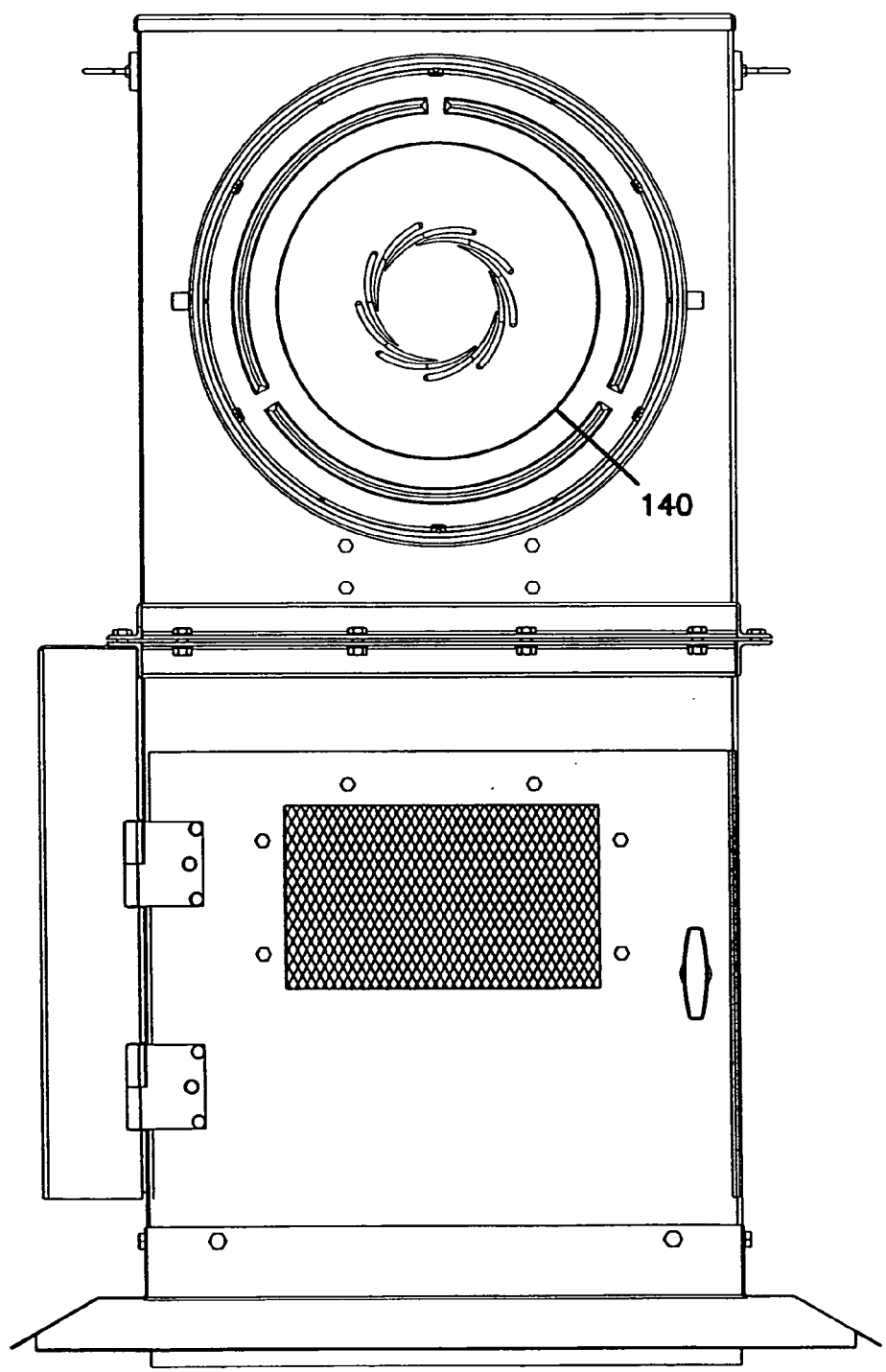
FIG. 15 is a schematic, front elevational view of the assembly of FIG. 1 with portions of the assembly removed.

Attention is directed to FIG. 10 of U.S. Ser. No. 09/325, 697. In FIG. 10 an enlarged, front elevational depiction of the lower chamber 21 is depicted. In FIG. 10, the chamber 21 is shown with the front door removed for viewing internal constructions and components. Also, in FIG. 10, the chamber 21 is depicted with the V-packs 94, 95 present. Further, in FIG. 10, the retention system 280 is depicted in the raised or lifted configuration. FIG. 11 is a side view of FIG. 10, taken from the direction of arrow 300.

In FIGS. 22–25 of U.S. Ser. No. 09/325,697, the base structure 281, control arm 282, and seat 283 of the retention system 280, are more readily viewed, especially the details of the seat 283. The seat 283 comprises a bottom panel 301 with opposite spaced side flanges 302 and 303. The bottom 301 includes a front edge 304, toward which a V-pack 94, 95, FIG. 6, is moved, during loading. Projecting outwardly from the front edge 304, each of the side flanges 302, 303 includes an outwardly directed guide flange 305, 306, respectively. The guide flanges 305, 306 preferably project at an angle F, FIG. 23, of about 120 to 1700, relative to the plane of the associated side flange 302, 303. Preferably the angle F is within the range of about 135 to 155°. Each guide flange 305, 306 is preferably about 0.25 inches (6.4 mm) to 2 inches (51 mm) long. The guide flanges 302, 303 help the centering of the V-pack 94, 95, as it is being slid into position.

The base bottom panel 301 includes four rectangularly spaced apertures 309 and a central large aperture 310. The four rectangularly positioned apertures 309 circumscribe rotatable wheels 312. The wheels 312 are rotatably mounted on the retention system 280 and raise and lower with the seat 283, when the control arm 282 is raised and lowered, maintaining the same relative vertical position between the wheels 312 and the bottom plate 301. The wheels 312 project above the bottom plate 301 at least about 0.03 inches (0.8 mm) and preferably about 0.06 inches (1.5 mm) to 0.15 inches (3.8 mm), so that the V-packs 94, 95 can be rolled into place on the base 301 in a convenient manner.

Figure 22:
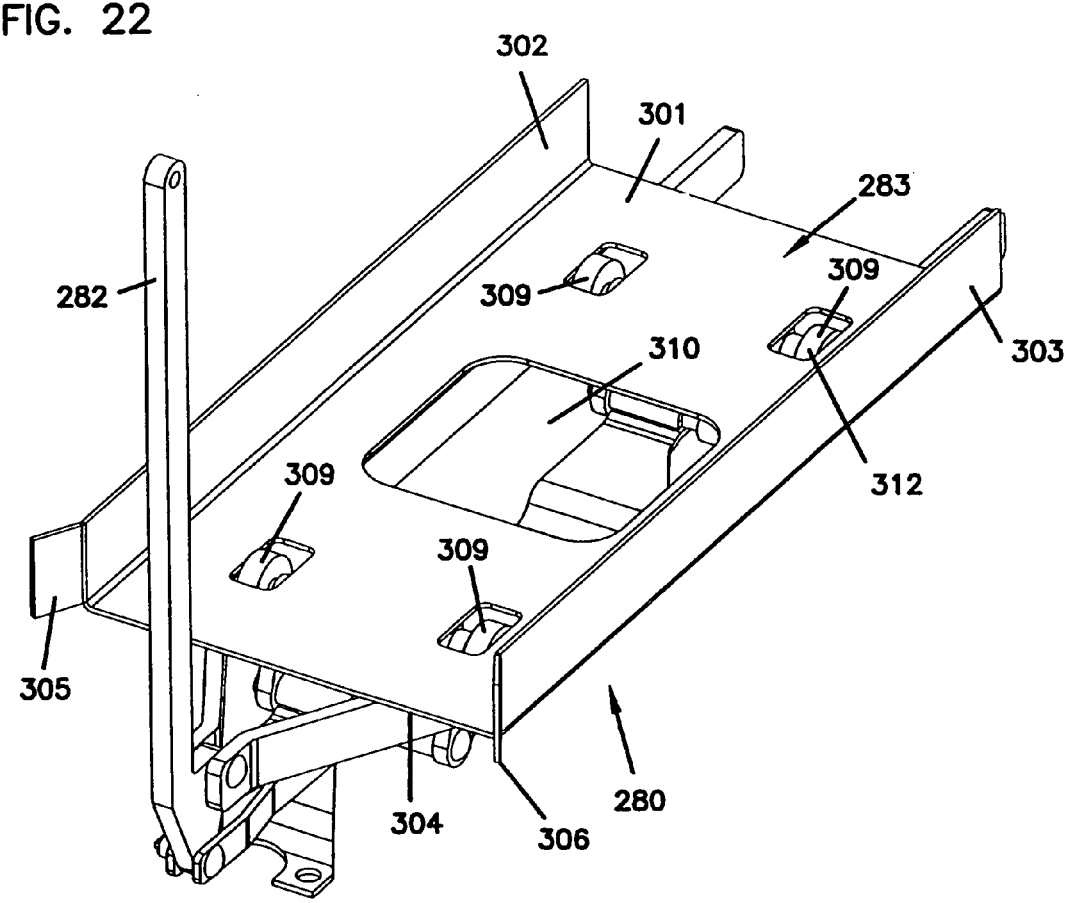
FIG. 22 is a schematic, perspective view of a retention system of the assembly of FIG. 6.

Referring to FIG. 24 of U.S. Ser. No. 09/325,697, the retention system 280 comprises a link arrangement 284 including a plurality of links 317. Preferably the links 317 form a parallelogram linkage system 318, so that during actuation by movement of the control arm 282, the plate 301 and the wheels 312, FIG. 22, are lifted or lowered without being tilted out of their selected plane of mounting. Also, preferably the links 317, and thus the parallelogram linkage system 318, are configured to operate slightly "over center" so that when the control arm 282 is raised, the retention system 280 will tend to retain the raised, locked position. Cushioning to allow the slight "over center" action, is allowed by a springing action in the links 317.

More specifically, the links 317 are pivotally mounted to a frame 320 that is itself pivotally mounted to a lower end 321 of the control arm 282. When the arm 282 is lowered, by movement in the direction of arrow 288, the base structure 281 is pivoted forward (in the direction of arrow 313) and downwardly (in the direction of arrow 288), the downward motion being caused because the control arm 282 is not only pivotally mounted on the framework 320, but also to a link 326 and a pivot 327. The base structure 281, then, under the control of the links 317, will slide forward and downward. This would move any V-pack 94, 95, FIG. 6, mounted on the seat 283 similarly forward and downward, i.e. out of sealing contact with the tube sheet 250, FIG. 10, for convenient handling of the V-packs 94, 95.

E. The Dust Ejector Valve Arrangement of U.S. Ser. No. 09/325,697

The arrangement shown in FIGS. 9, and 12–14 of U.S. Ser. No. 09/325,697, includes an elongated dust ejector valve arrangement 160 for removal of the dust from the air cleaner assembly 1, FIG. 6. The dust ejector valve arrangement 160 is mounted as part of the bottom 183 of the assembly 1 of FIG. 8. The elongated ejector valve arrangement 160 is depicted in the views shown in FIGS. 9, 12, 13 and 14.

Referring to FIGS. 12 and 13 and according to U.S. Ser. No. 09/325,697, the ejector valve arrangement 160 comprises an assembly 330 including a frame 331 having a plurality of ejector flaps 332 mounted thereon. The frame 331 includes front and back extensions 334 and 335. The assembly 330 includes, extending between front and back, opposite extensions 334 and 335, a plurality of angled central panels or extensions 336. Referring to FIG. 14, the central extensions 336 include opposite end extensions 337 and 338, and three pairs of central extensions 339, 340, and 341.

The end extensions 337 and 338 each include a mounting strip thereon 345 and 346 respectively, by which the assembly 330 can be mounted to the side walls 27, 28, respectively, FIG. 1, to depend downwardly from the bottom 183 of assembly 1 of FIG. 8. The mounting can be, for example, by means of bolts, 350, FIG. 6, or by similar constructions.

The extensions 337 and 338, as well as central pairs 339, 340 and 341, each include a slanted portion defining or having an aperture or a window 353, FIG. 13, therein. Mounted on an underneath side 354 of each window 353, is a flexible flap 332, FIG. 14. Each flap 332 is secured along an upper edge 358, FIG. 14, and is pressed against the window 353. In general, the flexible material of the flaps 332 will preferably be rubber.

Figure 9:
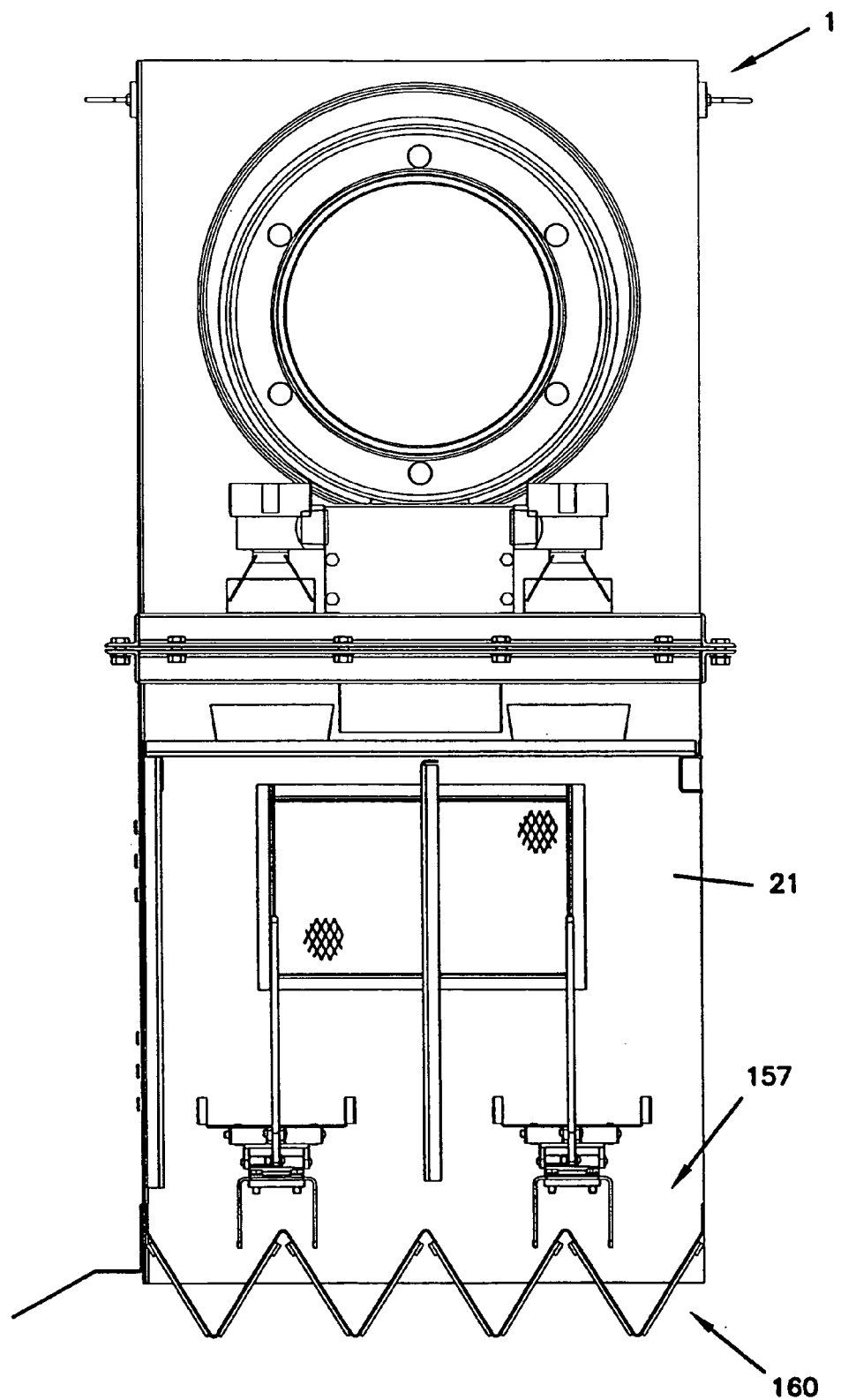
FIG. 9 is a schematic, front elevational view of the assembly as depicted in FIG. 8.

In typical use, as air moves through the first chamber 21, FIG. 9, a slight reduction in pressure within the first chamber 21 relative to ambient occurs. This will tend to draw or pull the flexible flaps 332 closed, over the windows 353 and against the sides 354. On the other hand, as a reverse pulse is directed through chamber 21, during a pulse jet operation as described herein, pressure within the first chamber 21 momentarily increases, biasing one or more of the flaps 332 away from the windows 353 (in a hinged motion along hinge lines 360), and allowing dust to be ejected from within the first chamber 21, downwardly and out of the bottom 183 of the assembly 1 of FIG. 8.

F. The Pulse Cleaning System of U.S. Ser. No. 09/325,697

Attention is directed to FIGS. 10 and 11, from which a more detailed understanding of the pulse jet cleaning system will be understood according to U.S. Ser. No. 09/325,697. In general, the pulse jet cleaning system uses pulses of air to clean the V-packs 94, 95. FIG. 10 is a fragmentary, schematic, front elevational view of the lower chamber 21 and the reverse pulse cleaner arrangement 154 with portions removed for viewing internal constructions and components. FIG. 11 is analogous to FIG. 10, taken generally from the view point of arrow 300, FIG. 10. Attention is also directed to FIG. 8, in which the portions of the assembly 1 depicted in FIGS. 10 and 11, can be viewed in perspective.

Referring to FIGS. 8, 10, and 11, the pulse cleaner arrangement 154 comprises a central tank 152, shown generically in FIGS. 8, 10, and 11 and described more particularly with reference to FIGS. 28–31, having a plurality of pulse jet valves 365, 366, 367, 368 mounted thereon, each valve having an associated one of nozzles 162–165, respectively, thereon. The particular arrangement 154 depicted in FIG. 8 includes four valves, although other arrangements are possible. The valves 365–368 can be viewed as divided into two pairs; a first pair 370 associated with the first one of the V-packs 94, FIG. 10, and a second pair 371 associated with the second one of the V-packs 95, FIG. 10.

Mounted at the air outlet of each valve 365–368 is a nozzle 162–165 including a splitter 157, which comprises a first angled member 375 and a second angled member 158 that cause the air stream released by the valve to be spread or dispersed, as it enters the V-pack 94 or 95.

In general, according to U.S. Ser. No. 09/325,697, a preferred splitter angle, or angle H, with respect to normal, for the first and second angled members 375, 158 will be within the range of 2 to 45°, typically about 7 to 30°. In general, the splitters 157 for each pair (370 and 371 respectively) are positioned such that their center lines or vertices are spaced apart about 5 to 10 inches (13–25 cm), typically about 6 to 9 inches (15–23 cm).

In general, according to U.S. Ser. No. 09/325,697, the reverse pulse system 154 can be operated using the air compressor provided by the vehicle manufacturer in the vehicle in which the assembly 1 is mounted. That compressor can be used to charge the charge tank, or storage tank, indicated at 152. Periodically, preferably using a logic control system as described hereinbelow, the valves 365–368 can be operated to allow a pulse jet to pass through the splitters 157 and into the V-packs 94, 95. Preferred sequencing and timing for the pulse jets are described below. In general, the pulse jet of air is directed in a reverse direction, backwards, or as a back flush through the V-packs 94, 95. By the term "in a reverse direction," it is meant that the pulse jet of air is directed opposite to normal air flow (i.e., filtering air flow) during filtering of ambient air. Such a direction of air flow will tend to flush dust or other particles collected on the V-packs 94, 95 there from.

The pulse jet system 154 may, in general, except for the particular preferred geometric configurations described and shown herein, be similar to the arrangements described in U.S. Pat. Nos. 4,364,251, 4,331,459, and 5,575,826 incorporated herein by reference.

Referring to FIGS. 10 and 16, to facilitate appropriate directing of the pulse jet into the V-pack arrangement, the assembly 1 includes, positioned between the nozzles 162–165, FIG. 8, and the V-packs 94, 95, a preferred rim arrangement 380. For the assembly 1 shown in FIGS. 6 and 10, which comprises two V-packs 94, 95 aligned parallel to one another, the rim arrangement 380 comprises first and second rims 381 and 382. For the particular assembly 1 shown, the rims 381, 382 are generally the same, one associated with each V-pack 94, 95.

In general according to U.S. Ser. No. 09/325,697, the second rim 382 comprises first, second, third, and fourth extensions 383, 384, 385, and 386 that project or extend from the tube sheet 250, FIG. 16. Preferably, each extension 383–386 includes a base flange 387 for attachment to the tube sheet 250 around the aperture 100. The base flanges 387 may be attached, for example, by welding to the tube sheet 250. Preferably, the second rim 382 is arranged and configured to surround the aperture 100.

In the particular embodiment illustrated in FIGS. 10 and 16 of U.S. Ser. No. 09/325,697, the second and fourth extensions 384, 386 extend from the tube sheet 250 at an angle G with respect to a perpendicular, or normal, line to the tube sheet 250. Preferably, the angle G is at least 2°, and typically is between 4° and 10°, most preferably is about 8°. Angling the second and fourth extensions 384, 386, enhances the capture of the pulse jet air flow from the pulse jet valves 365, 366, FIG. 8, by increasing the overall size of the aperture 100 and by extending the opening of the aperture 100 closer to the pulse jet valves 365, 366. Angling the second and fourth extensions 384, 386 also reduces the pressure loss due to separation of the air flow in the direction of arrow 270, FIG. 6, by providing a more gradual expansion of the air flow as it passes from the first chamber 21 to the second chamber 22 through the first aperture 100. Furthermore, the rims 381, 382 provide structural rigidity to the tube sheet 250.

The first rim 381 has structure analogous to the second rim 382.

G. The Second Stage Air Cleaner of U.S. Ser. No. 09/325,697

Referring to FIG. 6, in general, according to U.S. Ser. No. 09/325,697, the second stage air cleaner 25 positioned in chamber 22 is constructed as follows. Referring to FIG. 8, projecting into the interior of chamber 22 from interior rear wall 390 is a circular mounting flange or tube 391. The outer surface 392 of the tube 391 is a surface against which the primary element 124, FIG. 17, seals, during assembly (see FIG. 27). The inner surface 393 of the tube 391 is the surface against which the safety element 125, FIG. 18, seals, during assembly (see FIG. 27).

Figure 17:
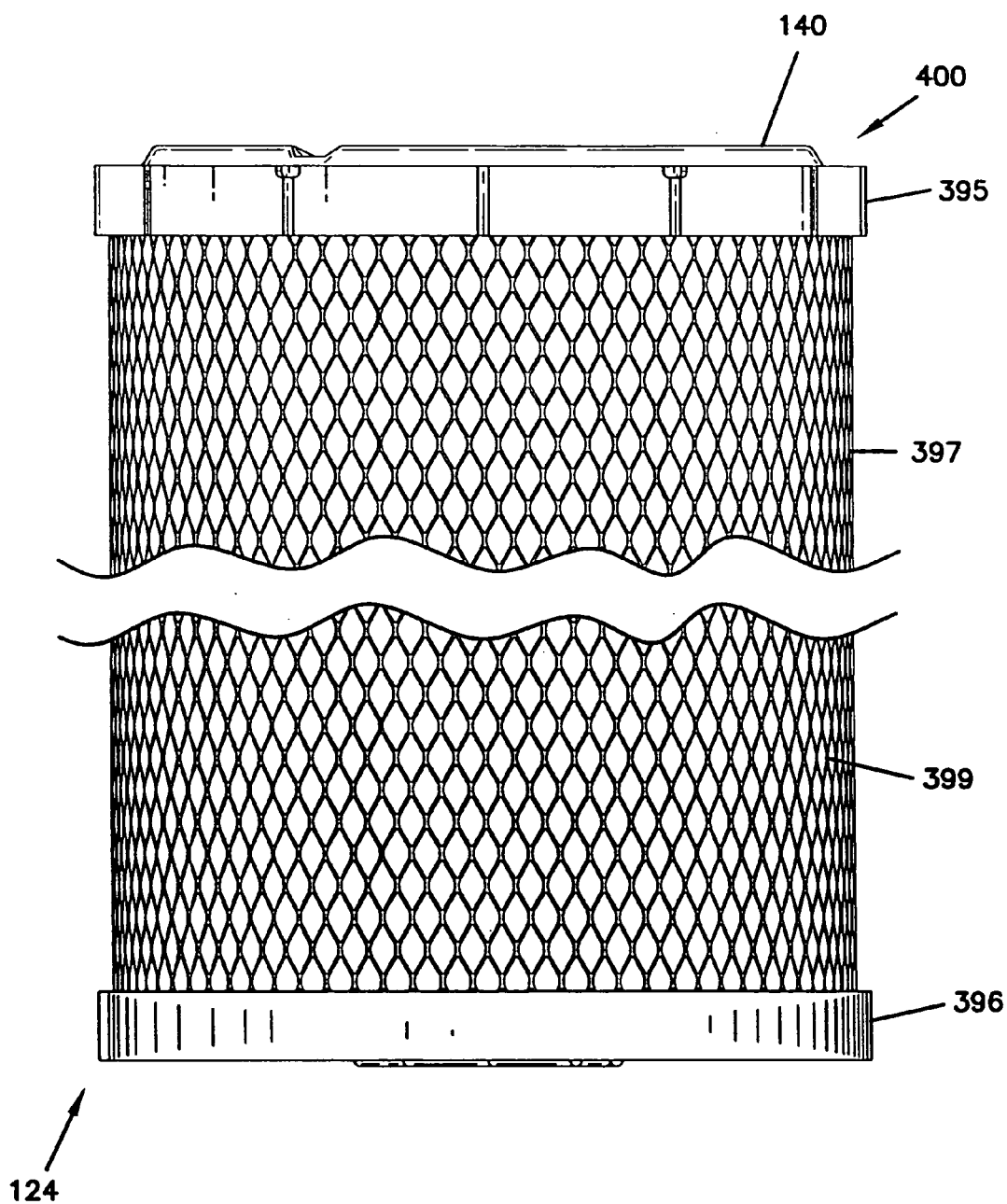
FIG. 17 is a schematic, perspective view of the primary element of the second chamber of the assembly of FIG. 6.

A preferred primary element 124 is depicted in FIG. 17 of U.S. Ser. No. 09/325,697. The primary element 124 comprises first and second opposite end caps 395 and 396 with filter media 397 extending therebetween. The particular element 124 depicted includes inner 398, FIG. 27, and outer liners 399, although in some applications one or both of these liners may be absent. The end cap 395 is open. A typical end cap construction is described in U.S. Pat. No. 5,897,676, incorporated herein by reference. The end cap 395 includes a radial sealing region 400 positioned therein.

In operation, the radial sealing region 400 seals against an outer surface 392, FIG. 27, of the mounting tube 391 preferably using a radial seal construction system such as that described in EP 0329659, the disclosure of which is incorporated herein by reference. Preferably the end cap 396, FIG. 17 of U.S. Ser. No. 09/325,697, is a completely closed end cap, having no apertures therein.

According to U.S. Ser. No. 09/325,697, a variety of materials or combinations of materials can be utilized for the media 397. In general, what is required is an appropriate media to achieve a preferred level of efficiency for the filter element 124.

In general, it is anticipated by U.S. Ser. No. 09/325,697 that for many preferred arrangements, the media 397 will comprise a pleated media such as cellulose. If desired, such media can be improved, for overall efficiency, by providing thereon a deposit or layer of "fine fiber" material, typically a material having an average fiber diameter of 5 microns or less.

One particular commercially used media comprising a fine fiber deposited onto a paper or cellulose material is practiced by Donaldson Company, Inc., the assignee of the present application, in products generally identified under the trademark EON™. These media are manufactured by a trade secret process of Donaldson's. Such media would be useable in arrangements according to the present invention.

One useable media, according to U.S. Ser. No. 09/325,697, is a media having a frazier permeability within the range of 14.0–18.0 ft/min. (7.1–9.1 cm/sec) and a thickness of about 0.009–0.013 inches (0.2–0.3 mm). Generally, the media will be pleated with the selected pleat depth depending on the particular application. In general, the pleat depth selected will be at least 0.5 inches (1.3 cm), preferably about 0.75 to 2 inches (2–5 cm), and most preferably about 1 inch (2.5 cm) to 1.25 inches (3.2 cm). Pleating, and sealing into a cylindrical configuration, can be conducted utilizing standard, conventional pleat and sealing techniques.

Still other media configurations usable for the element 124 are foam media, fiberous media, or combinations of pleated media with one or more of foam media or fiber step media. Various usable combinations include those described in U.S. Pat. Nos. 5,622,537 and 5,672,399, incorporated herein by reference. The particular media chosen for any given application will, in general, be a function of desired efficiency versus contaminant challenge.

A variety of materials may be utilized for the inner and outer liners 398, 399, FIG. 27 of U.S. Ser. No. 09/325,697, and the same material may not be used for both. In some instances, expanded metal, perforated metal, or plastic materials will be preferred. It is noted that for a desirably functioning radial seal, preferably a portion of the inner liner 398 in region 400, is positioned to operate as a support, backing up the pressing of the end cap 395 in radial seal region 400, during sealing. This is shown in EP 0329659.

For the particular assembly 1 depicted, the assembly 1 includes a tube 134, FIG. 6, projecting therefrom. The tube 134 allows for the positioning, within chamber 22, of the primary element 124 which is longer than the distance between rear wall 29 and front wall 3, FIGS. 1–3. As explained previously, the cover 6, for access to the element 124, is positioned on an end of tube 134.

Figure 18:
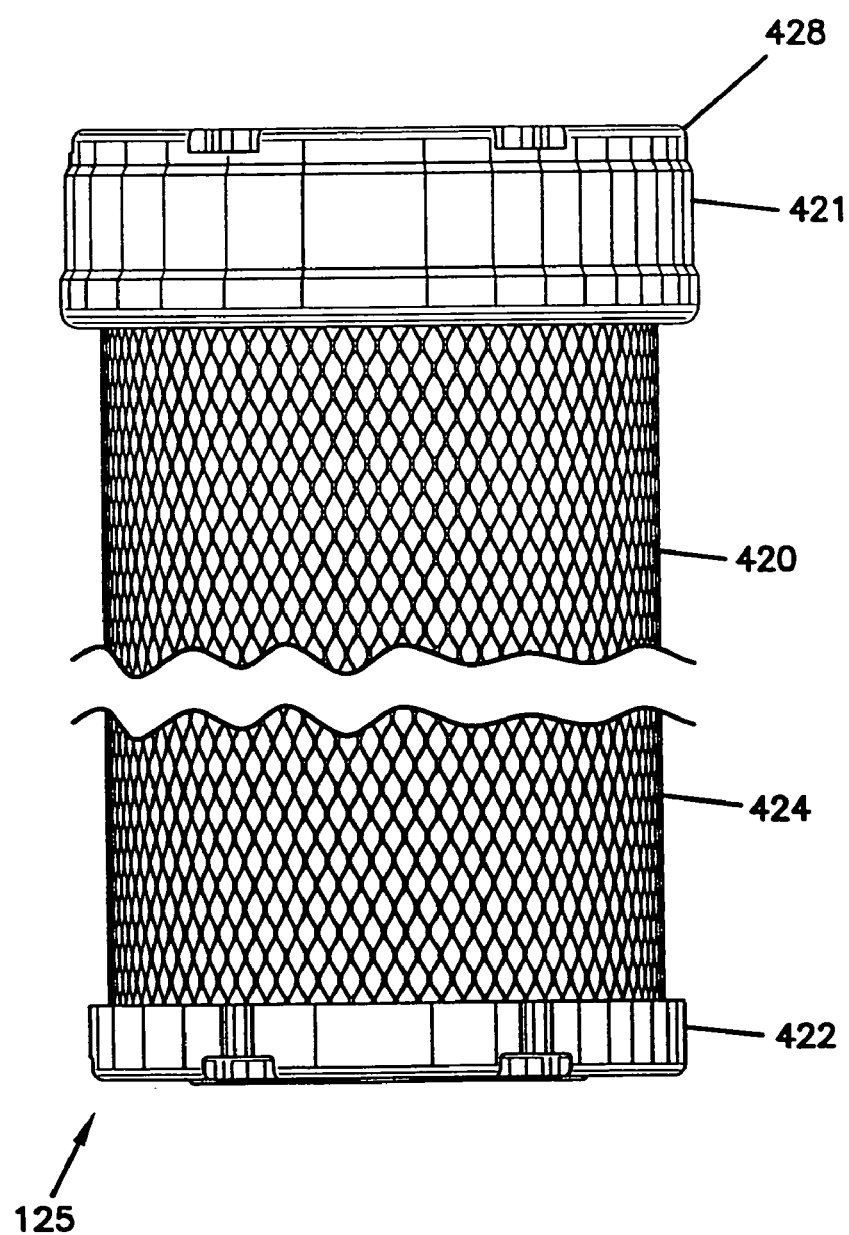
FIG. 18 is a schematic, perspective view of the safety element of the second chamber of the assembly of FIG. 6.

Attention is directed to FIG. 18 of U.S. Ser. No. 09/325, 697. In FIG. 18 the safety element 125 is depicted according to U.S. Ser. No. 09/325,697. The safety element 125 generally comprises media 420 extending between opposite end caps 421 and 422. The safety element 125 includes an inner liner 423, FIG. 27, and an outer liner 424, also extending between end caps 421 and 422.

The end cap 422 is a closed end cap, closing one end of the media 420 and the liners 424 to the passage of air therein. As a result, the media 420 defines an open central area 426, FIG. 27.

The end cap 421 includes a ring 428 of soft, pressible material thereon, constructed and arranged to fit within the tube 134, FIG. 6, to seal against inner surface 393, FIG. 27, of the tube 391 in use. Preferably according to U.S. Ser. No. 09/325,697, the safety element 125 is sized and configured to fit underneath the primary element 124, when mounted, see for example FIG. 27.

Conventional materials and configurations can be utilized with the safety element 125. With respect to the principals of the present invention, there is no specific preference with respect to the materials of the safety element 125, other than general preferences for conveniently manufactured, efficiently constructed materials.

In general, it is anticipated by U.S. Ser. No. 09/325,697 that for many preferred arrangements, the media 420 will comprise a pleated media such as cellulose. Other media configurations usable for the element 125 are foam media, fiberous media, or combinations of pleated media with one or more of foam media, or fiber step media. Various usable combinations include those described in U.S. Pat. Nos. 5,622,537 and 5,672,399, incorporated herein by reference. The particular media chosen for any given application will, in general, be a function of desired efficiency versus contaminant challenge.

According to U.S. Ser. No. 09/325,697, a variety of materials may be used for the inner 423 and outer liners 424, and the same material may not be used for both. In some instances, expanded metal, perforated metal, or plastic materials will be preferred. It is noted that for a desirably functioning seal, preferably a portion of the outer liner 424, FIG. 27, is positioned to operate as a support, backing up the pressing of the end cap 421 during sealing.

H. The Charge Tank of U.S. Ser. No. 09/325,697

Figure 28:
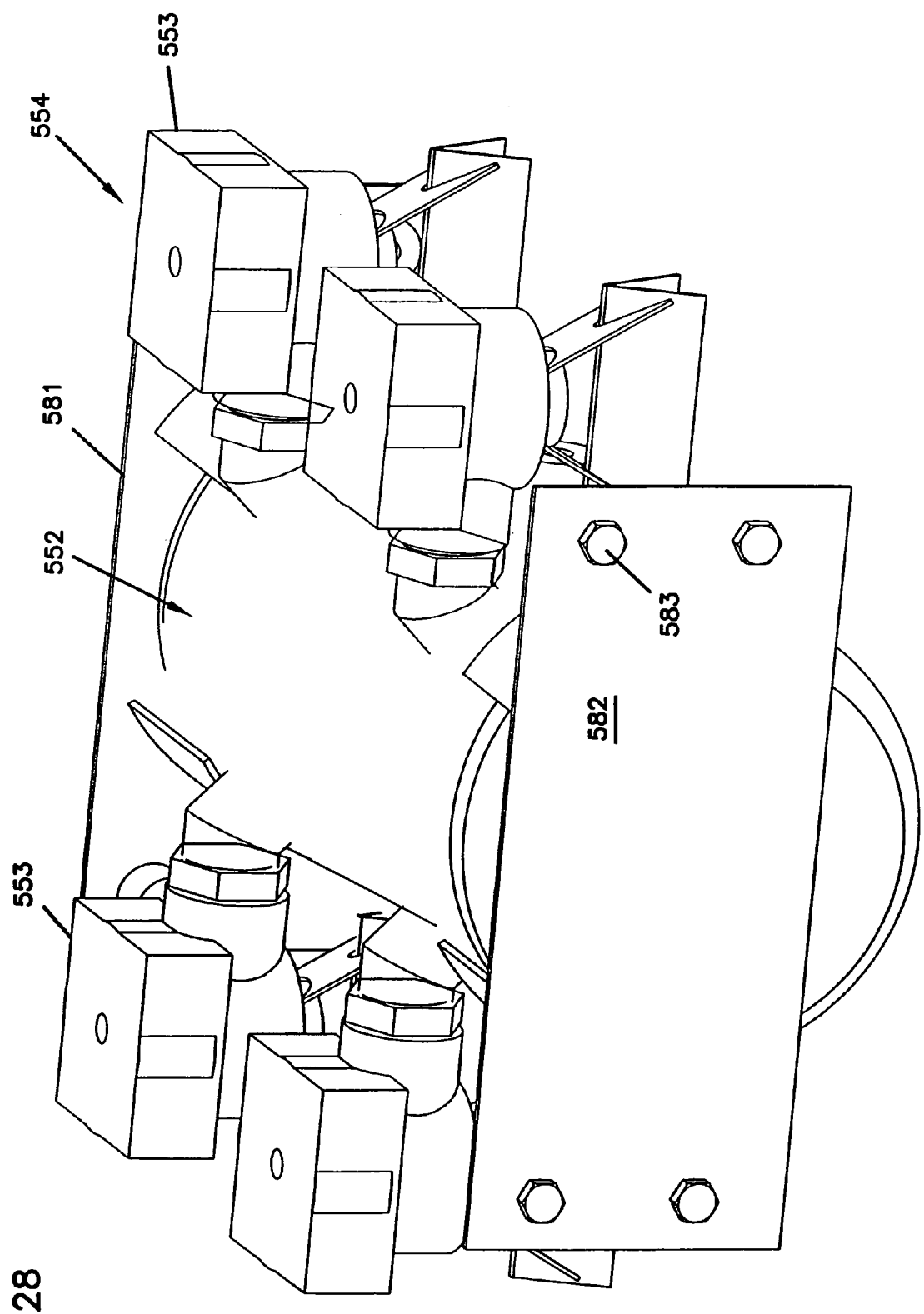
FIG. 28 is a schematic, perspective view of an example embodiment of the charge tank of the assembly of FIG. 10.
Figure 29:
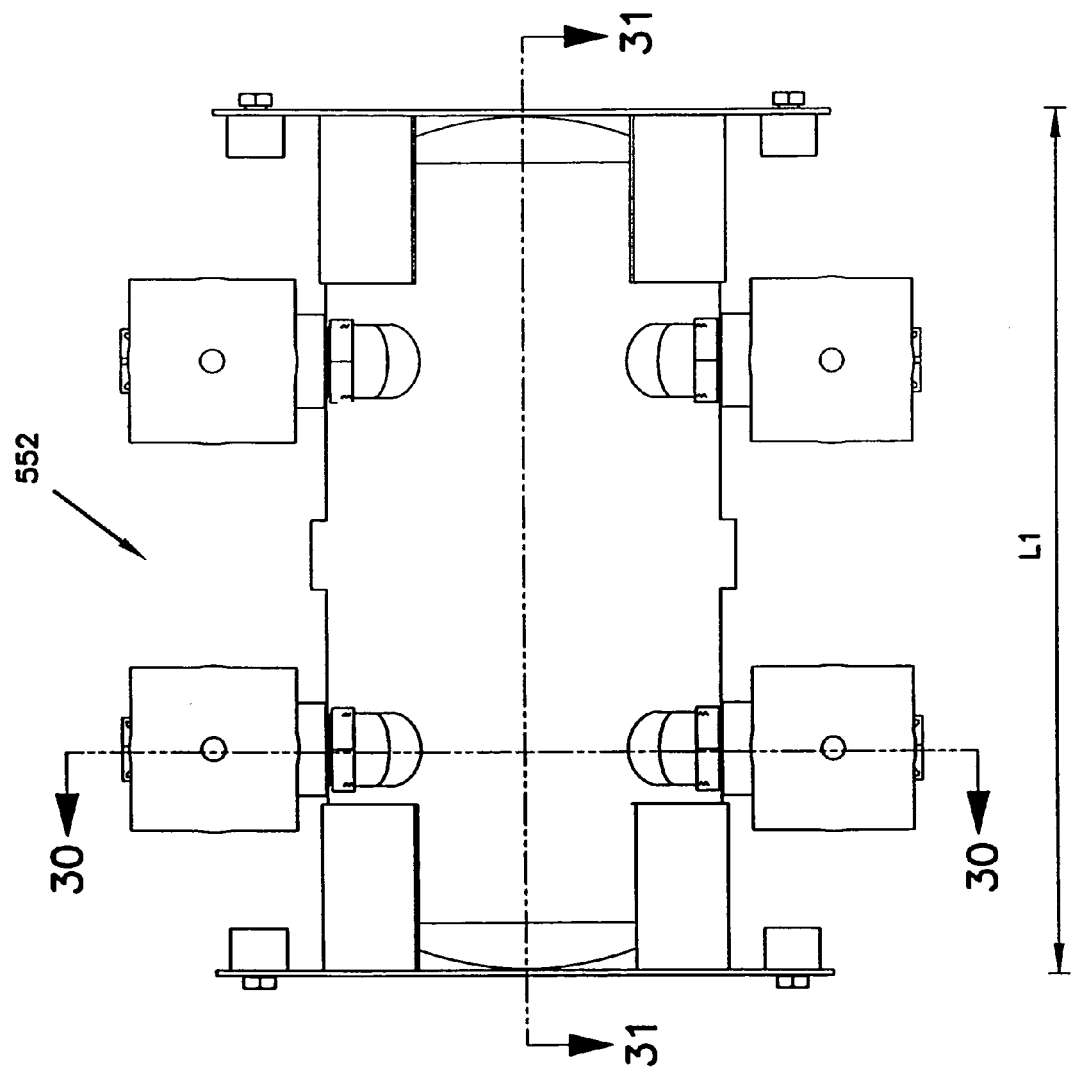
FIG. 29 is a schematic, top plan view of the charge tank of FIG. 28.
Figure 30:
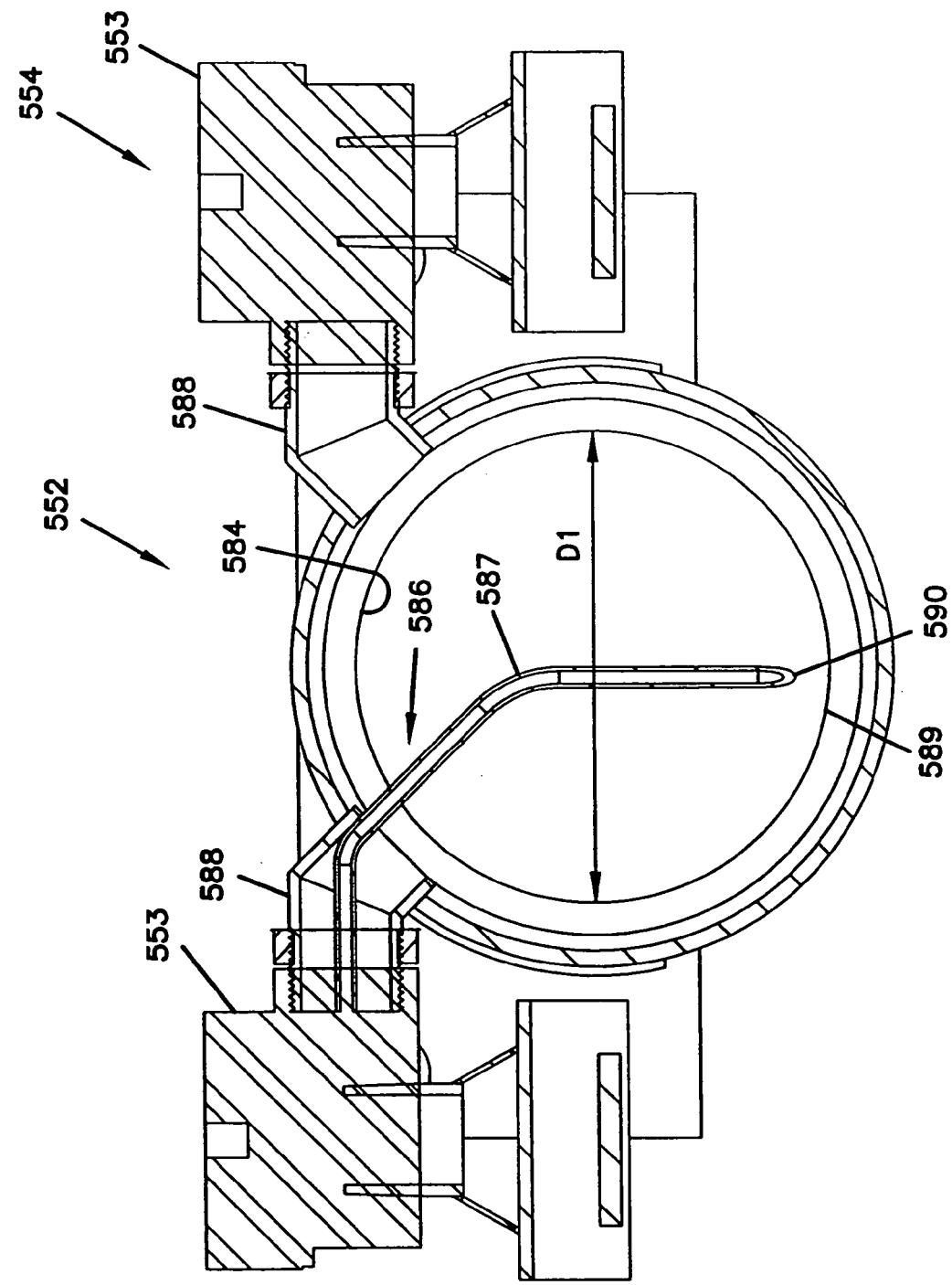
FIG. 30 is a schematic, cross-sectional view of the charge tank of FIG. 29, taken along line 30—30.
Figure 31:
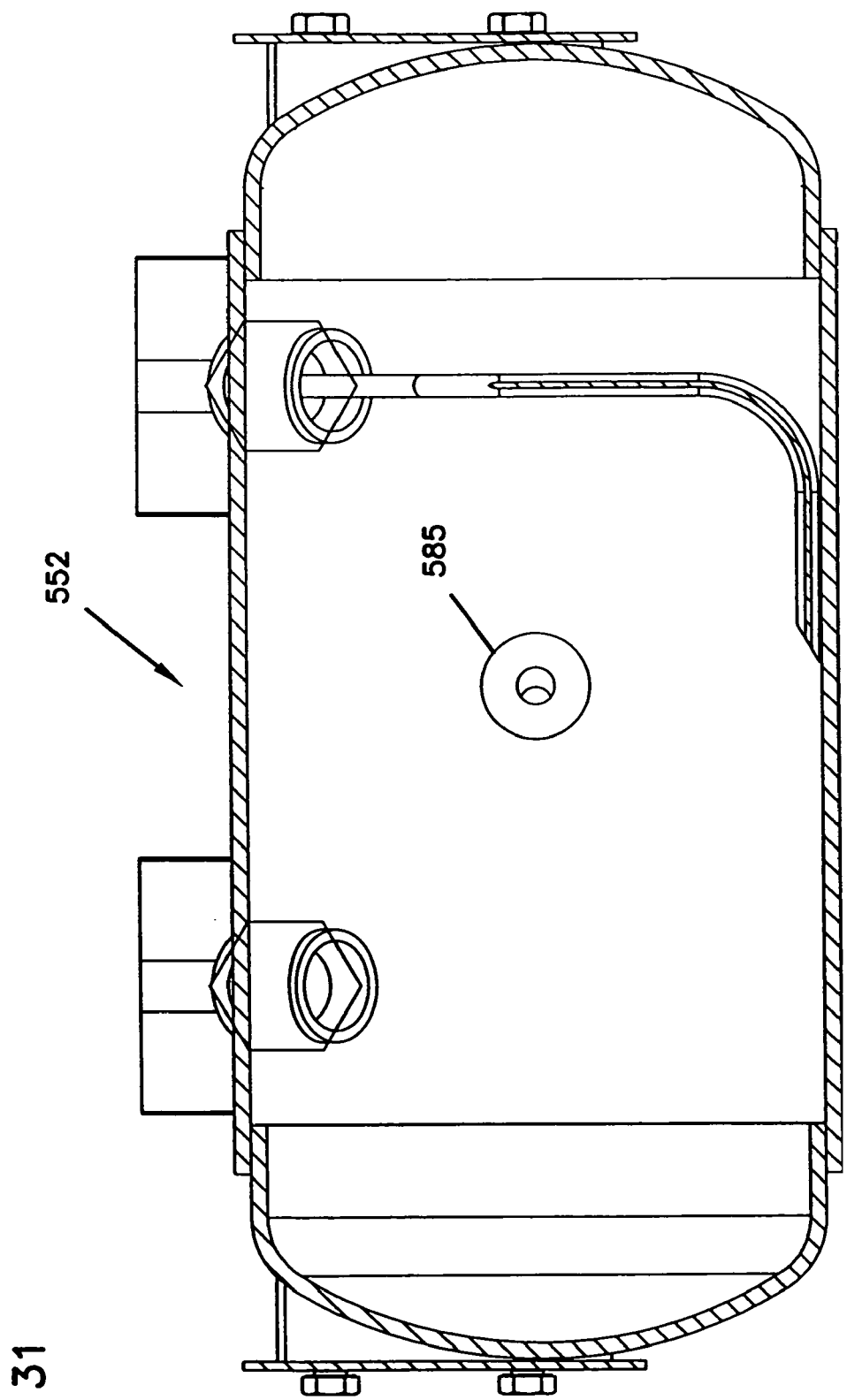
FIG. 31 is a schematic, cross-sectional view of the charge tank of FIG. 29, taken along line 31—31.

Attention is directed to FIGS. 28–31 of U.S. Ser. No. 09/325,697. FIG. 28 is a schematic, perspective view of an example embodiment of a charge tank 552 useable as the tank 152 in the assembly of FIG. 10. FIG. 29 is a schematic, top plan view of the charge tank 552. FIG. 30 is a schematic, cross-sectional view of the charge tank 552 of FIG. 29, taken along line 30—30. FIG. 31 is a schematic, cross-sectional view of the charge tank 552 of FIG. 29, taken along line 31—31.

Referring to FIGS. 1 and 28. Preferably, according to U.S. Ser. No. 09/325,697, the charge tank 552 includes first and second attachment plates 581, 582. Typically, the charge tank 552 extends from the front side 3 of the assembly 1 to the rear side 12, FIG. 3, of the assembly 1. The second attachment plate 582 includes four bolts 583 and corresponding bolt holes (not shown). Likewise, the first attachment plate 581 includes four bolts (not shown) and corresponding bolt holes (not shown). In the embodiment illustrated in FIG. 1, the charge tank 552, FIG. 28, is bolted to the inside of the front side 3 of the assembly by the bolts 583. The second attachment plate 582 is located behind the front side 3 of the assembly 1. The bolts 583 extend through the front side 3 and the second attachment plate 582, securing the second attachment plate 582 to the front side 3 of the assembly 1, and correspondingly securing the charge tank 552 to the assembly 1. Analogously, the first attachment plate 581 is secured to the rear side 12 of the assembly 1 of FIG. 1. Of course, the charge tank 552 may be attached by other means, for example, by welding.

Attention is directed to FIGS. 29–31 of U.S. Ser. No. 09/325,697. In the embodiment illustrated and described in U.S. Ser. No. 09/325,697, the charge tank 552 is generally cylindrical having an inside diameter D1, FIG. 30, and a length L1, FIG. 29. The charge tank 552 defines an interior air pressure chamber 584. The air pressure chamber 584 is constructed and arranged to contain pressurized air. The charge tank 552 includes an inlet 585, FIG. 31. The inlet 585 is constructed and arranged to be connected to the vehicle's air pressure tank (not shown) via, for example, an air pressure tube (not shown). Preferably, the vehicle's air pressure tank is used to pressurize the charge tank 552 with air.

Referring to FIG. 30, in the embodiment illustrated and described in U.S. Ser. No. 09/325,697, the charge tank 552 is connected to a pulse cleaning system 554, analogous to the pulse cleaning system 154 of FIG. 6. The pulse cleaning system 554 includes a plurality of pulse valves 553. The charge tank 552 is connected to the pulse valves via conduits 588. Through the conduits 588, pressurized air communicates between the charge tank 552 and the pulse cleaning system 554 for discharge from the pulse valves 553 for cleaning of the V-packs 94, 95, FIG. 6.

Occasionally, water condensation will collect within the charge tank 552. Preferably, the charge tank 552 includes a water condensation discharge system 586 for removing the water condensation from the charge tank 552. In the embodiment illustrated in FIG. 30, the discharge system 586 includes a tube 587 connected to one of the pulse valves 553. The tube 587 is constructed and arranged to withdraw any accumulated water, from the water condensation, from the bottom 589 of the chamber 584. During firing of the pulse valves 553, pressurized air passes from the charge tank 552 to the pulse valves 553 via the conduits 588. The pressurized air gathers near the top of the chamber 584 while the accumulated water gathers in the bottom 589 of the chamber 584. As the water accumulates, the water forms a seal about a first end 590 of the tube 587. As the pressurized air passes through the conduit 588, a vacuum is created in the discharge tube 587. The vacuum draws the accumulated water out of the bottom 589 of the chamber 584 and discharges the water through the pulse valve 553.

I. The Control Logic and Programming

In this section, some preferred control logic and programming logic for operation of the pulse cleaning system 154, FIG. 6, is provided. From the principles described in U.S. Ser. No. 09/325,697, a variety of control systems can readily be designed. The particular examples provided herein are intended as examples. It will be apparent that the operation of the pulse cleaning system 154 can be accomplished with conventional electronic system techniques.

Referring to FIG. 6, in the particular embodiment illustrated and described in U.S. Ser. No. 09/325,697, the control system selected will in part be defined by the restriction down-stream of the V-packs 94, 95 relative to ambient pressure. The restriction is equal to the pressure differential, or drop, across the V-packs 94, 95 plus the inlet static pressure losses. By the term "pressure differential," it is meant the difference in pressure up-stream of the V-packs 94, 95 versus the pressure down-stream of the V-packs 94, 95, i.e., the pressure in the clean air plenum 99 of the V-packs 94, 95. This restriction provides a relative measure of the efficiency of the operation of the V-packs 94, 95. As the V-packs 94, 95 become occluded with particulate matter, the restriction for the V-packs 94, 95 increases. The air pressures are typically measured using air pressure measuring devices commonly known.

In alternative embodiments, the clean air pressure may be measured anywhere down-stream of the V-packs 94, 95, for example in the clean air plenum 99 of the V-packs 94, 95. The ambient air pressure may be measured any where up-stream of the V-packs 94, 95, for example outside of the housing 20.

In the particular embodiment illustrated, the control system activates a cleaning cycle when the restriction down-stream of the V-packs 94, 95 reaches a particular level. With typical equipment such as heavy haul trucks, it is generally considered important by the original equipment manufacturers that the restriction for the entire air cleaner assembly 1 not exceed approximately 25 inches (64 cm) of water. In general, through empirical observation, it has been determined that the pulse cleaning system 154 should preferably be activated when a restriction is measured of preferably between 16 and 20 inches (41–51 cm) of water, and most preferably about 16 inches (41 cm) of water. A reason for this is that if the pulse cleaning system 154 is prevented from operation until the restriction reaches 25 inches (64 cm) of water, the pulse cleaning system 154 will be less efficient in refurbishing the associated V-packs 94, 95 for relatively long operation. Alternately stated, in general, the pulse cleaning system 154 does not remove all particulate material from the associated V-packs 94, 95. Thus, with repeated cycles, for example 10 cycles, the ability of the pulse jet cleaning system 154 to maintain operation of the V-packs 94, 95 below the overall restriction of about 25 inches (64 cm) of water is reduced. In general, it is believed that when the pulse cleaning system 154 can no longer keep the restriction below about 20 inches (51 cm) of water, change-out of the associated V-packs 94, 95 is desirable.

In general, it will also be preferred to actuate the pulse valves 153 to cause the pulse jet cleaning to occur, when the engine system is not under significant load and the airflow through the assembly 1 is relatively low. Alternately stated, for example, when the equipment is a vehicle, it will be preferred that the pulse jet cleaning system 154 be actuated to clean the V-packs 94, 95 when the vehicle is in neutral and the engine is in idle, or at least when the engine is operating at a relatively low rpm (1500 rpm or less). In general, preferred logic control systems will monitor engine rpm, with respect to operation. Thus, determining whether the engine is in an "idle" condition or some other condition for operation, or prohibiting operation, will typically turn on determination of the engine rpm. A reason for this is when the engine is under significant load demands, the air flow demands are substantially greater. Since the normal engine air flow works in the opposite direction of the pulse cleaning system 154, it will in general be harder to clean, and the cleaning will be less effective, when the engine is under significant load rather than when the engine is at or near idle.

In some instances, however, if a significant amount of time (10 minutes or more) has elapsed and the engine idle (or low rpm) condition has not occurred, it may be desirable for the control system to have an "override" that will cause the pulse cleaning to occur in spite of the fact that the engine idle (or low rpm) condition has not been reached.

Figure 32A:
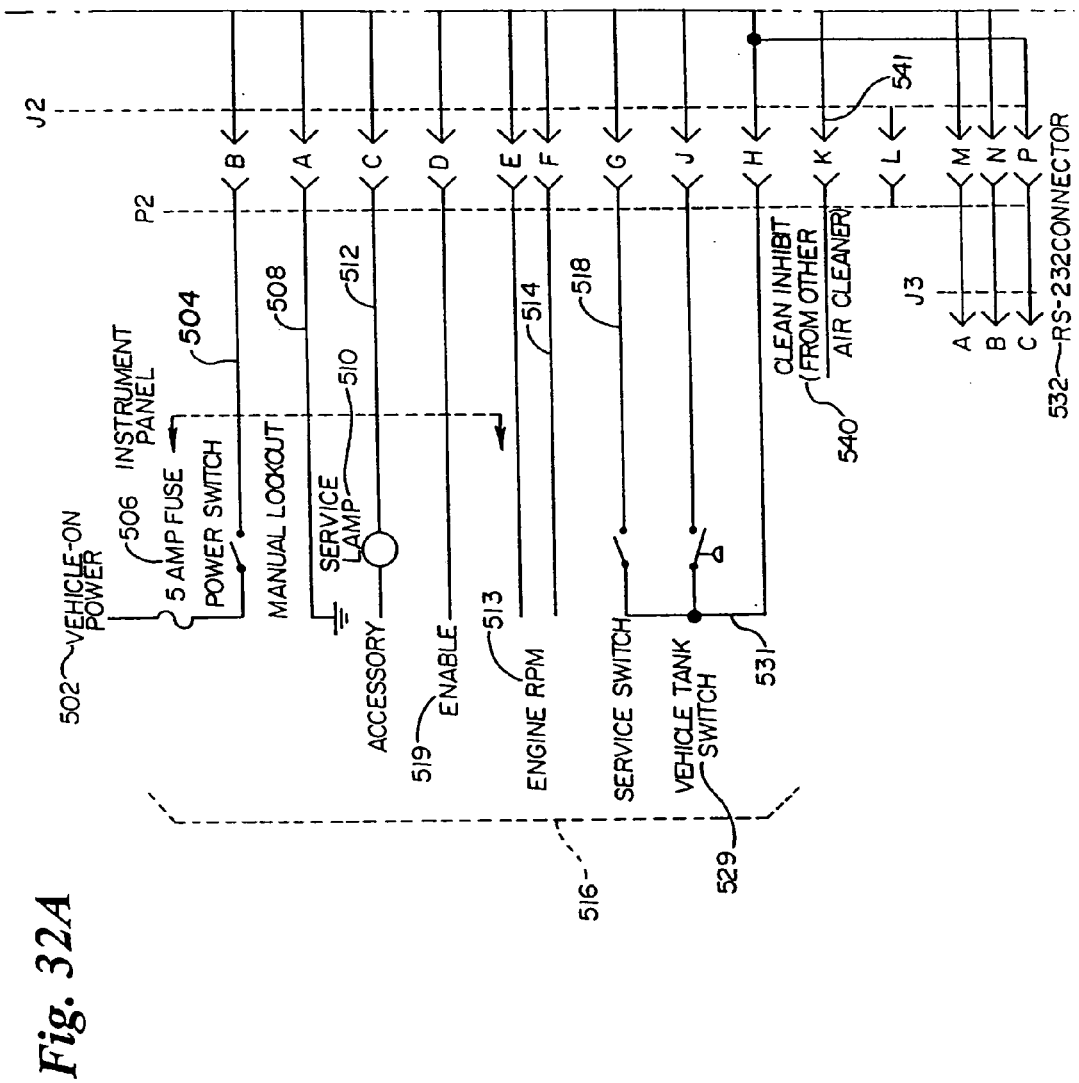
FIG. 32 is an electrical schematic depicting the interface between a control system of the assembly of FIG. 6 and a vehicle.
Figure 32B:
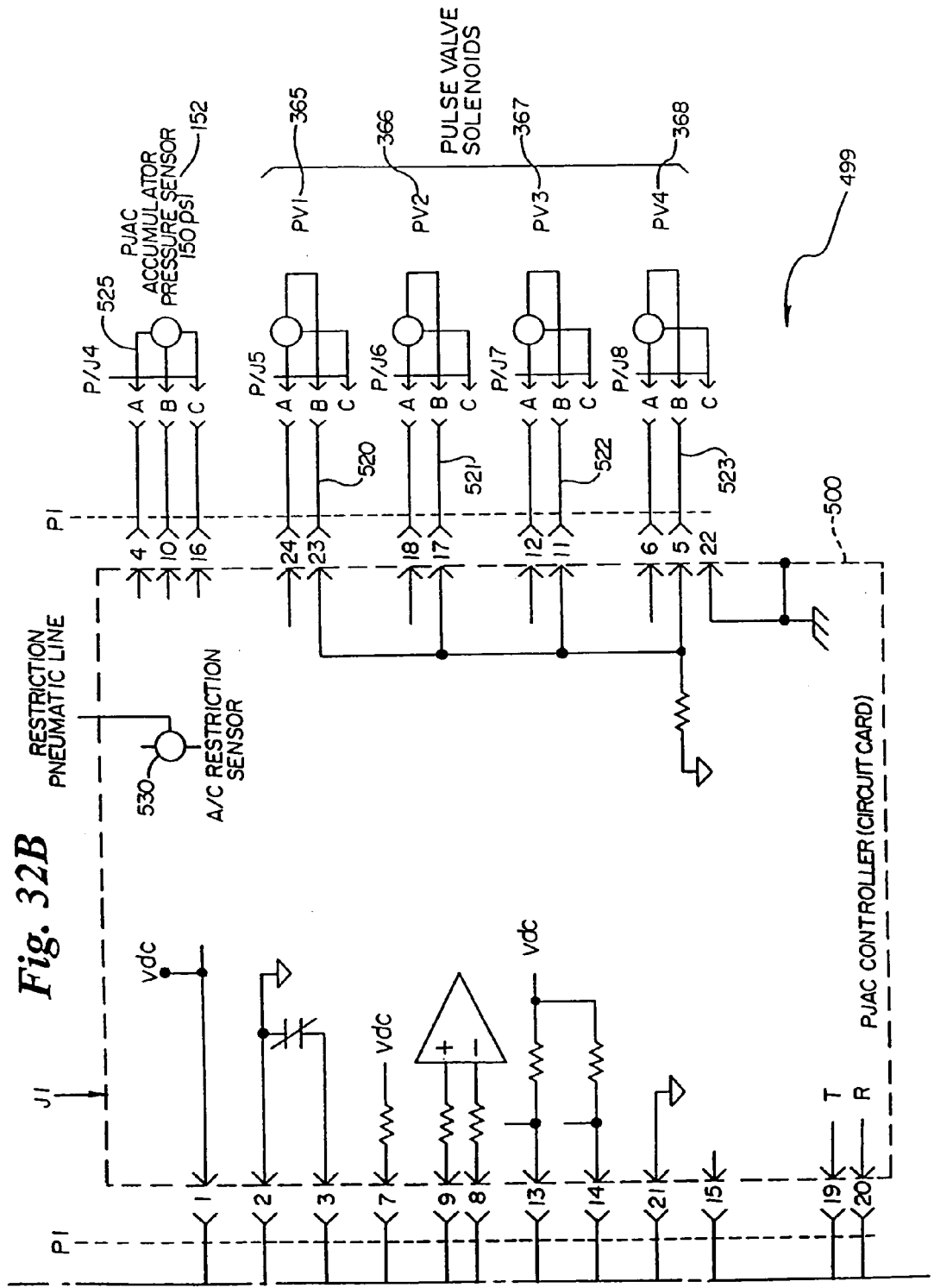
Figure 33A:
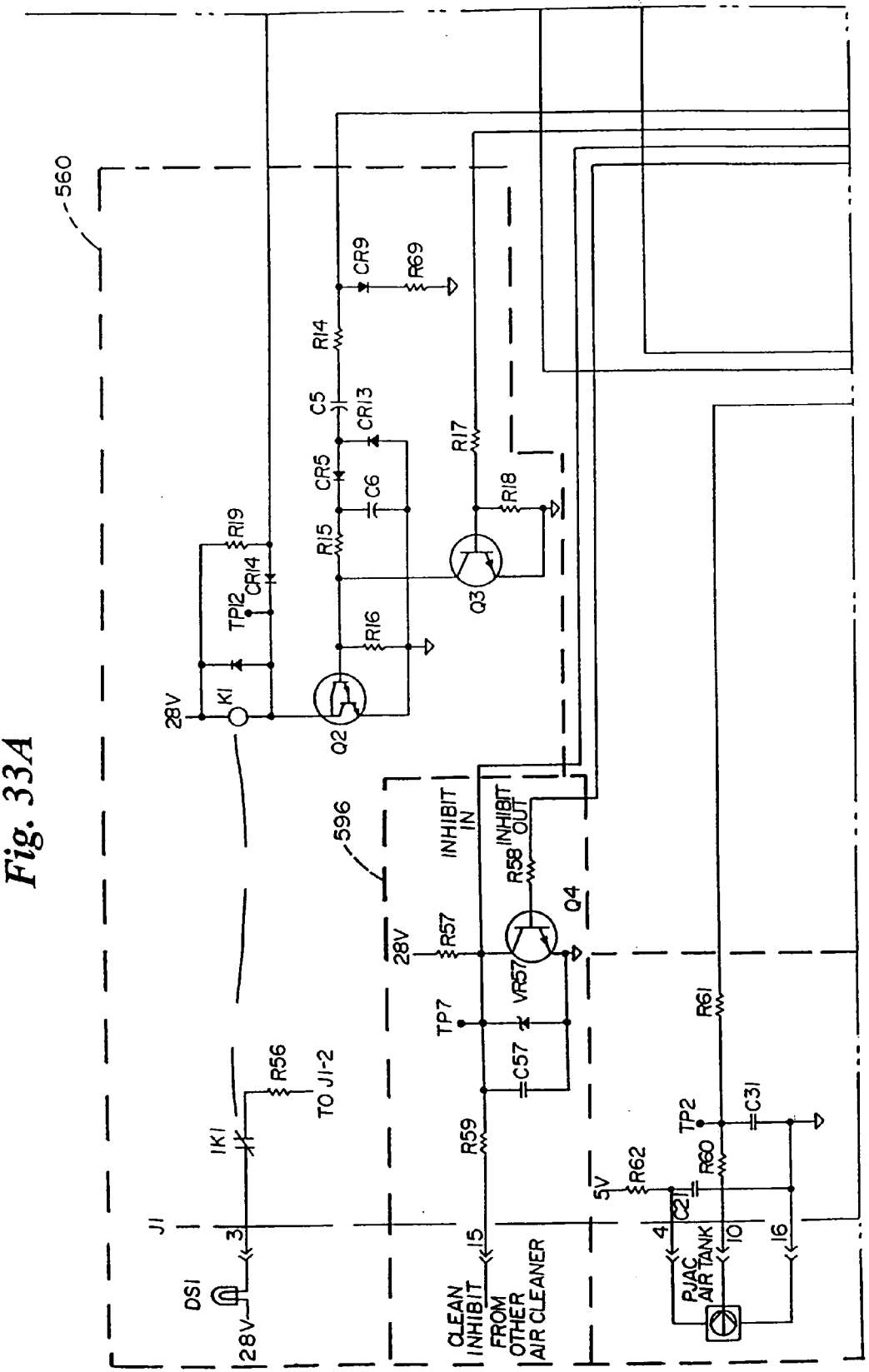
FIG. 33 is an electrical schematic showing more detail of the control system of FIG. 32.
Figure 33B:
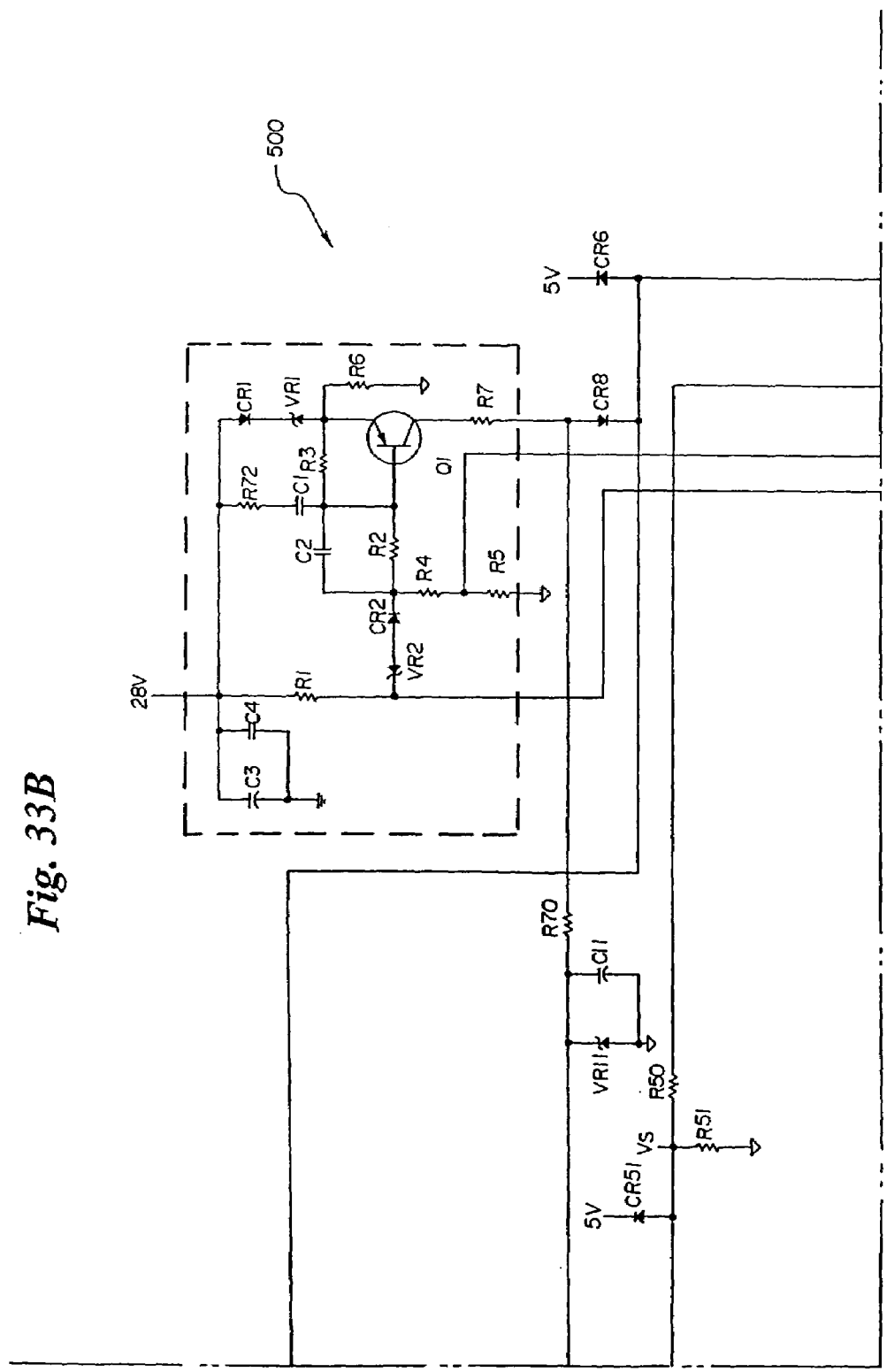
Figure 33C:
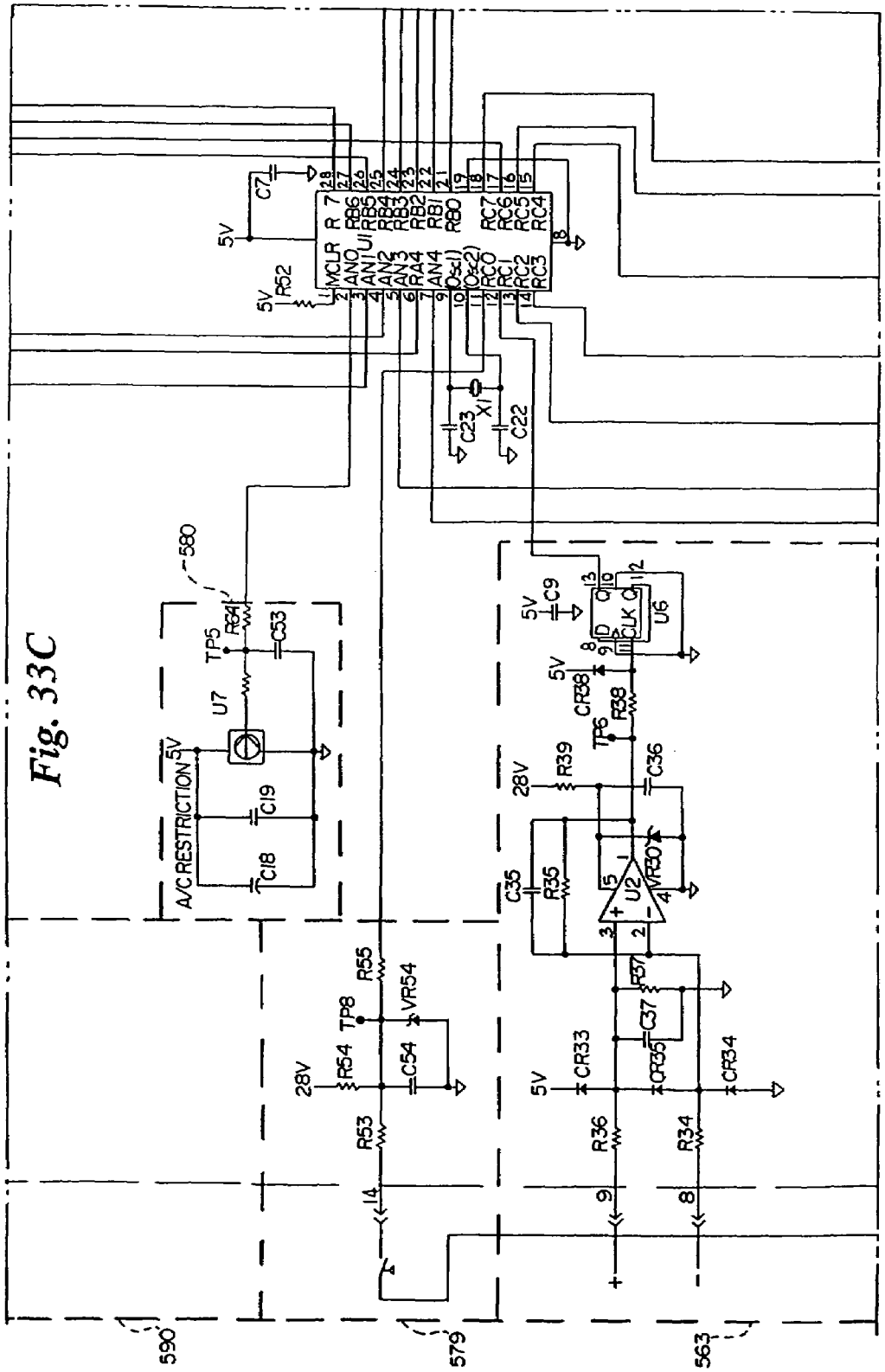
Figure 33D:
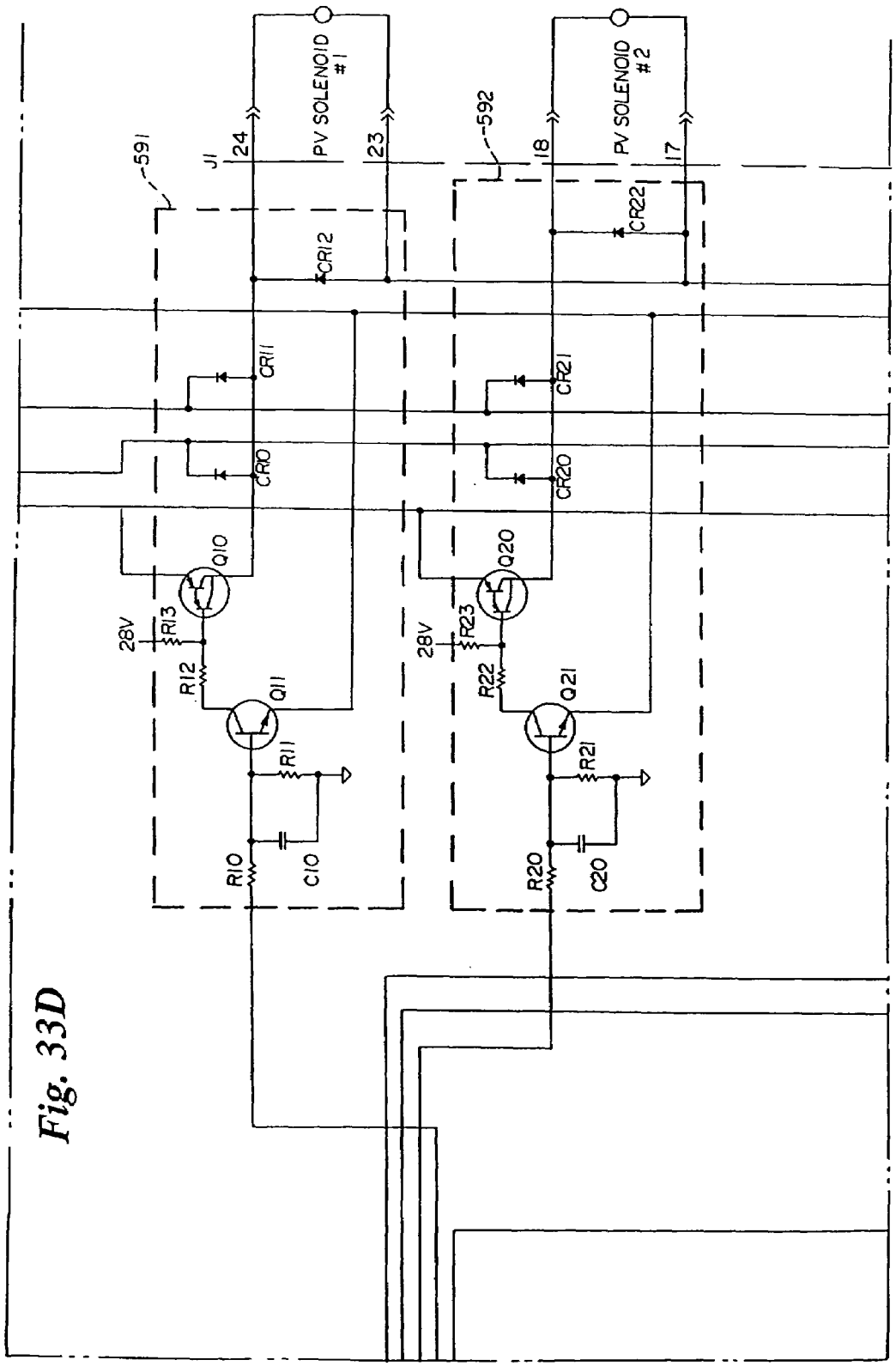
Figure 33E:
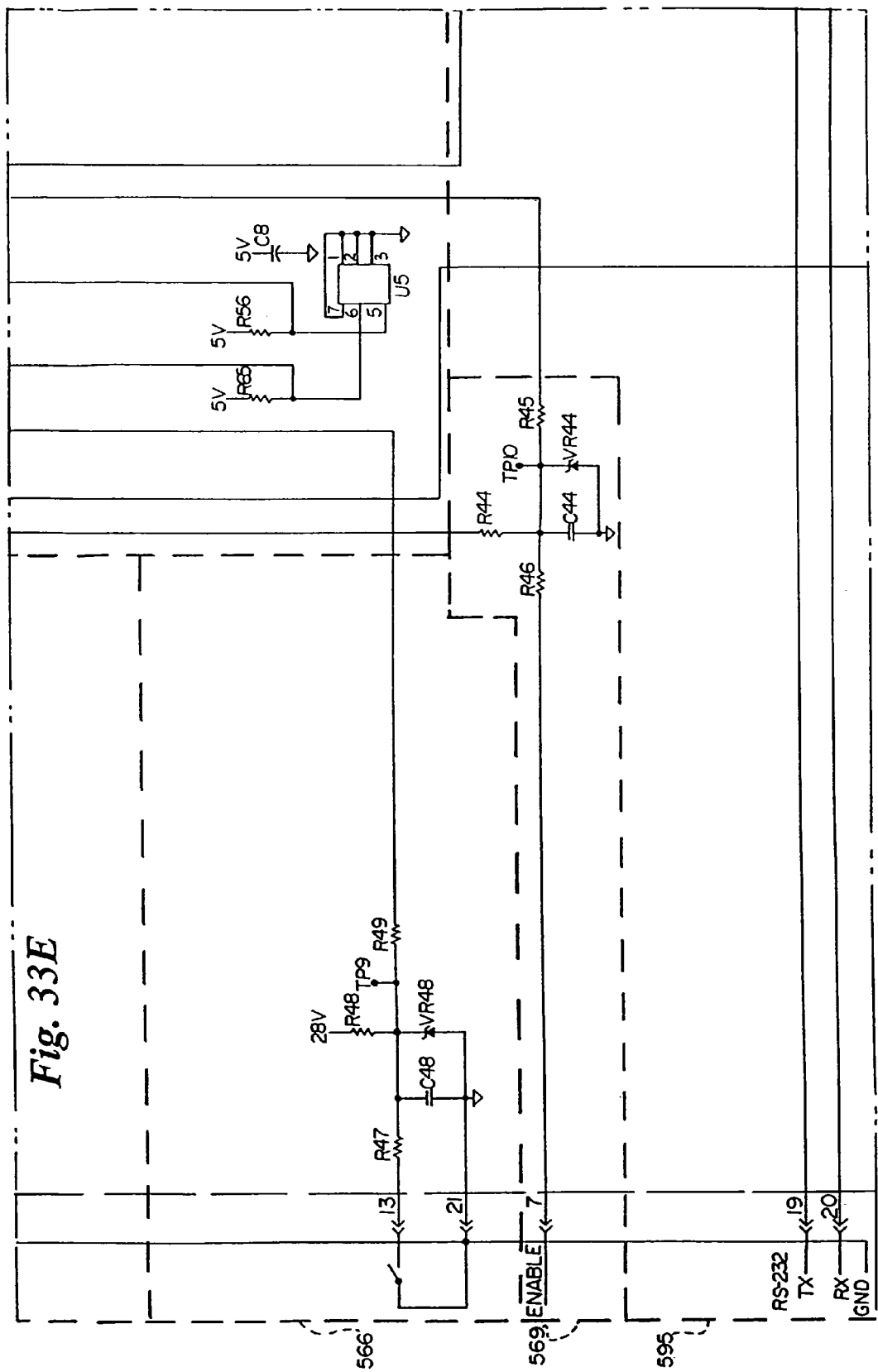
Figure 33F:
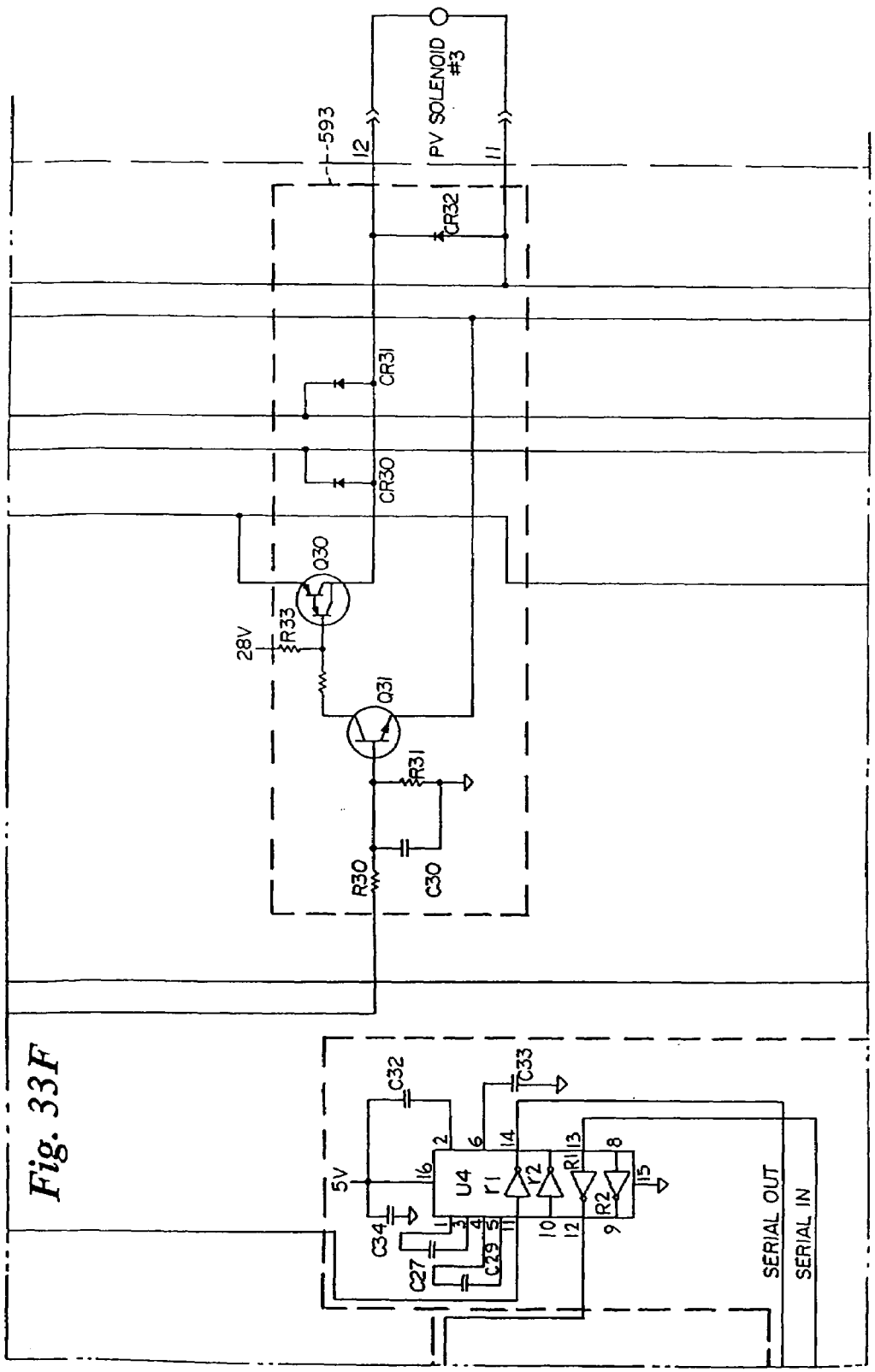
Figure 33G:
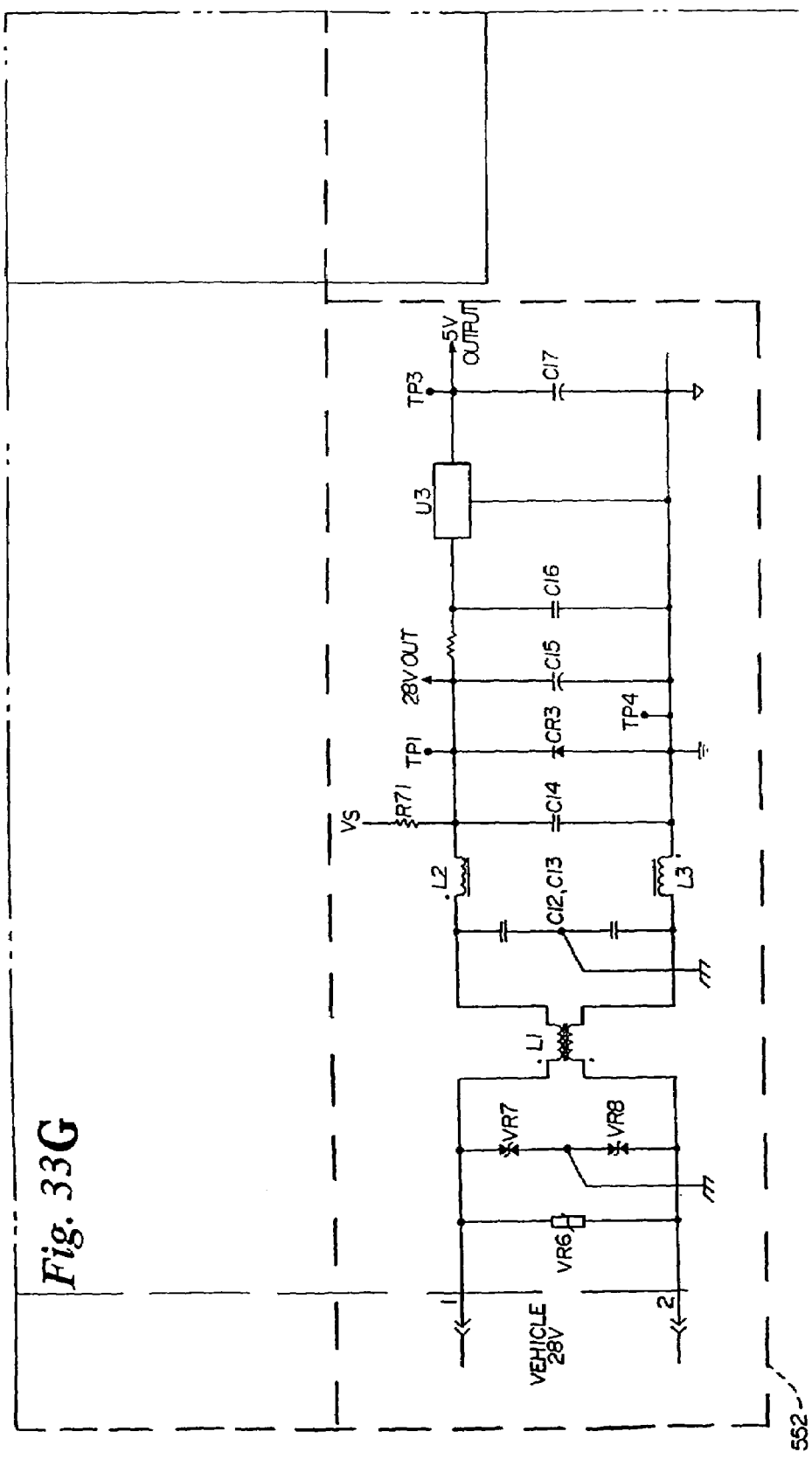
Figure 33H:
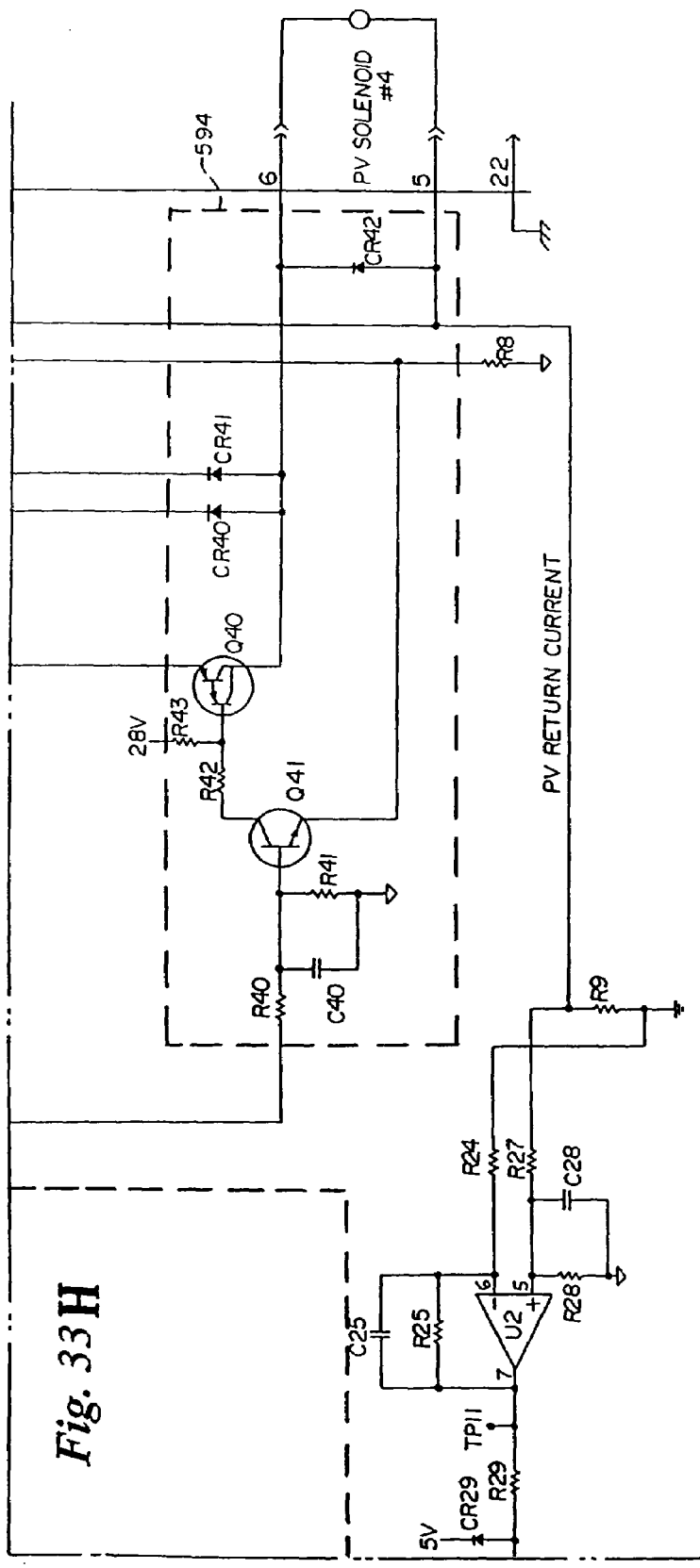

Given the above observations, a preferred logic control system is suggested. Attention is directed to FIG. 32. Preferably, the logic control system 499 would be in accord with the reasoning of the flow chart illustrated in FIG. 34. Still in reference to FIG. 32, in general, the intent of the logic control system 499 is to optimize the cleaning of the V-packs 94, 95 by firing the pulse valves 365–368, FIG. 8, at the lowest engine air flow (by sensing rpm). However, at the end of a cleaning time period, even if the rpm is higher, the system 499 will continue to fire the pulse valves 365–368 regardless to prevent abnormally high restrictions across the V-packs 94, 95. Preferably, the logic control system 499 receives signals from the vehicle regarding the engine speed, vehicle tank pressure switch, the service switch, and the enable switch. The logic control system 499 also receives signals for the accumulator tank pressure and the air cleaner restriction. The logic control system 499 systematically fires the pulse valves 365–368 to clean the V-packs 94, 95, based on these inputs.

FIG. 32 is an electrical schematic generally depicting the interfaces between the control system 499, the vehicle, and the air cleaner 1, FIG. 1. In general, the system 499 is controlled by a controller 500. Preferably, the controller 500 is located within the housing 20, FIG. 20. In some instances, the controller 500 might be positioned outside of the housing 20, for example, in the vehicle itself. In other instances, the control logic of the controller 500 might be in a part of the vehicle's engine management system.

The controller 500 is in electrical communication with an instrument panel 502 of the vehicle. Preferably, the controller 500 receives power through a first electrical connection 504, for example wires. Preferably, the electrical connection is a male Deutsch HD34-18-14PN. Of course, any suitable connector could be used. The first electrical connection 504 passes through a fuse 506, typically 5 amps (18,000 coulombs). The fuse 506 protects the controller 500 from high amperage that may damage the controller 500 or wires. A second electrical connection 508 provides for the controller's 500 return current. Preferably, the controller 500 draws power from the vehicle's 24 volt dc power supply at a rate of 0.1 amperes (360 coulombs) during operation. When a pulse valve fires, the current increases to about 0.5 amperes (1800 coulombs) for about 0.1 seconds. Preferably, there is a voltage spike protection on the electrical inputs to prevent damage to the input circuits of the controller 500. The inputs are voltage clamped at 5 volts (0.02 statvolts) and the current is limited with a 470 ohm (470 ohm) resistor or greater. The logic circuitry operates from a 5 volt (0.02 statvolts) supply that is regulated by a LM2940T-5.0.

In the particular embodiment illustrated and described, the controller 500 is electrically connected to a service lamp 510 via a third electrical connection 512. Preferably, the service lamp 510 is installed on the dash of the vehicle for an operator's inspection. Generally, when the air cleaner assembly 1 is malfunctioning, the service lamp 510 will illuminate, indicating to the operator that something is wrong with the air cleaner assembly 1.

The service lamp 510 indicates to the user that either something in the system is preventing cleaning of the V-pack filters 94, 95, i.e., no power, no engine rpm, or a cleaning system failure, or that the V-pack filters 94, 95 require servicing. Preferably, the user can determine what the fault that caused the service light to come on is by activating the service switch, for about 5 seconds and then releasing. Service information can then be indicated to the user by a series of flashes and pauses. For example, a first flash of 0.1 seconds, a pause of 5 seconds, and a pair of two short flashes (0.1 seconds) might indicate an electrical problem with the first pulse valve. Two short flashes 1.5 seconds apart, a pause, and a pair of two short flashes at the end might indicate an electrical problem with the second pulse valve.

Of course any series of flashes, pauses, or steady lights can be used to indicate a number of faults with the system through the service lamp. Alternatively, a user could connect a computer to the controller 500 through the RS-232 connector. Signals regarding the fault are sent to the computer through this connection.

In some instances, a dual housing or quad housing might be used on the same vehicle. In these instances, the inhibit function, described below, prevents each unit from pulsing while another unit is pulsing. Also, in these instances, each unit could have its own service switch for indicating faults to a single service lamp. Alternatively, a separate service lamp for each unit might be used.

In the particular embodiment illustrated and described, the controller 500 is also electrically connected to an engine rpm sensor 513 via electrical connection 514. The engine rpm sensor 513 allows the controller 500 to monitor the engine rpm. The controller 500 is electrically connected to a service switch 516 via electrical connection 518.

In the particular embodiment illustrated and described, the controller 500 is electrically connected to the pulse valves 365–368 via electrical connections 520, 521, 522, and 523, respectively. This allows the controller 500 to fire the pulsevalves 365–368 as appropriate. The controller 500 is also electrically connected to the charge tank or accumulator 152 via electrical connection 525, a restriction sensor 530, and the vehicle's air pressure tank 529 via electrical connection 531. The controller 500 is connected to a clean inhibit line 540 from another air cleaner controller via electrical connection 541. The clean inhibit line 540 is used when more than one air cleaner assembly 1 is configured on one vehicle. The controller 500 is also connected to an enable signal 519. The enable signal 519 is used to enable the pulsing operation or to disable the pulsing operation from the vehicle.

In the particular embodiment illustrated and described, the controller 500 includes an interface port 532. In one embodiment this interface is an RS-232 interface. This port 532 allows an operator interface, for example to a computer, to modify the logic control of the control system 499 by the operator or to receive output from the controller 500.

Attention is directed to FIG. 33. FIG. 33 is an electrical schematic generally depicting greater detail of an example embodiment of the controller's 500 interface with the rest of the control system 499 illustrated in FIG. 32. Module 560 illustrates the interface with the service light 510, FIG. 32. Module 596 illustrates the interface with the clean inhibit line 540, FIG. 32. Module 590 illustrates the interface with the charge tank 152, FIG. 32. Module 580 illustrates the interface with the restriction sensor 530, FIG. 32. Module 579 illustrates the interface with vehicle pressure tank 529, FIG. 32. Module 563 illustrates the interface with the engine rpm sensor 513, FIG. 32. Module 566 illustrates the interface with the service switch 516, FIG. 32. Module 569 illustrates the interface with the enable signal 519, FIG. 32. Module 595 illustrates the interface with the RS-232 port 532, FIG. 32. Module 552 illustrates the interface with the vehicle instrument panel 502, FIG. 32, for vehicle electrical 24 volt dc power. Modules 591, 592, 593, 594 illustrate the interfaces with the pulse valves 365, 366, 367, 368, respectively.

Figure 34:
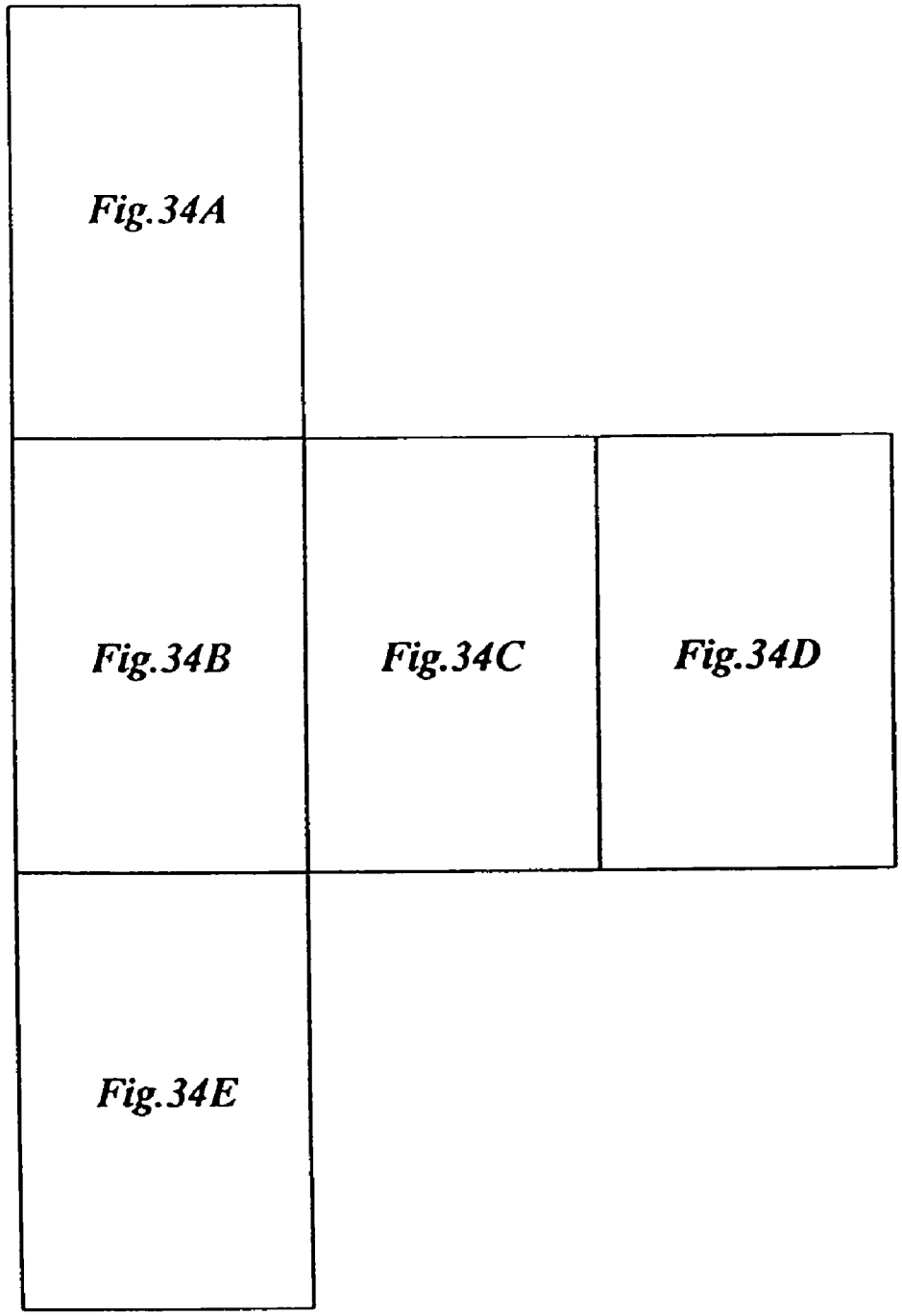
FIG. 34 is a flow chart of the logic of the control system of FIG. 32.
Figure 34A:
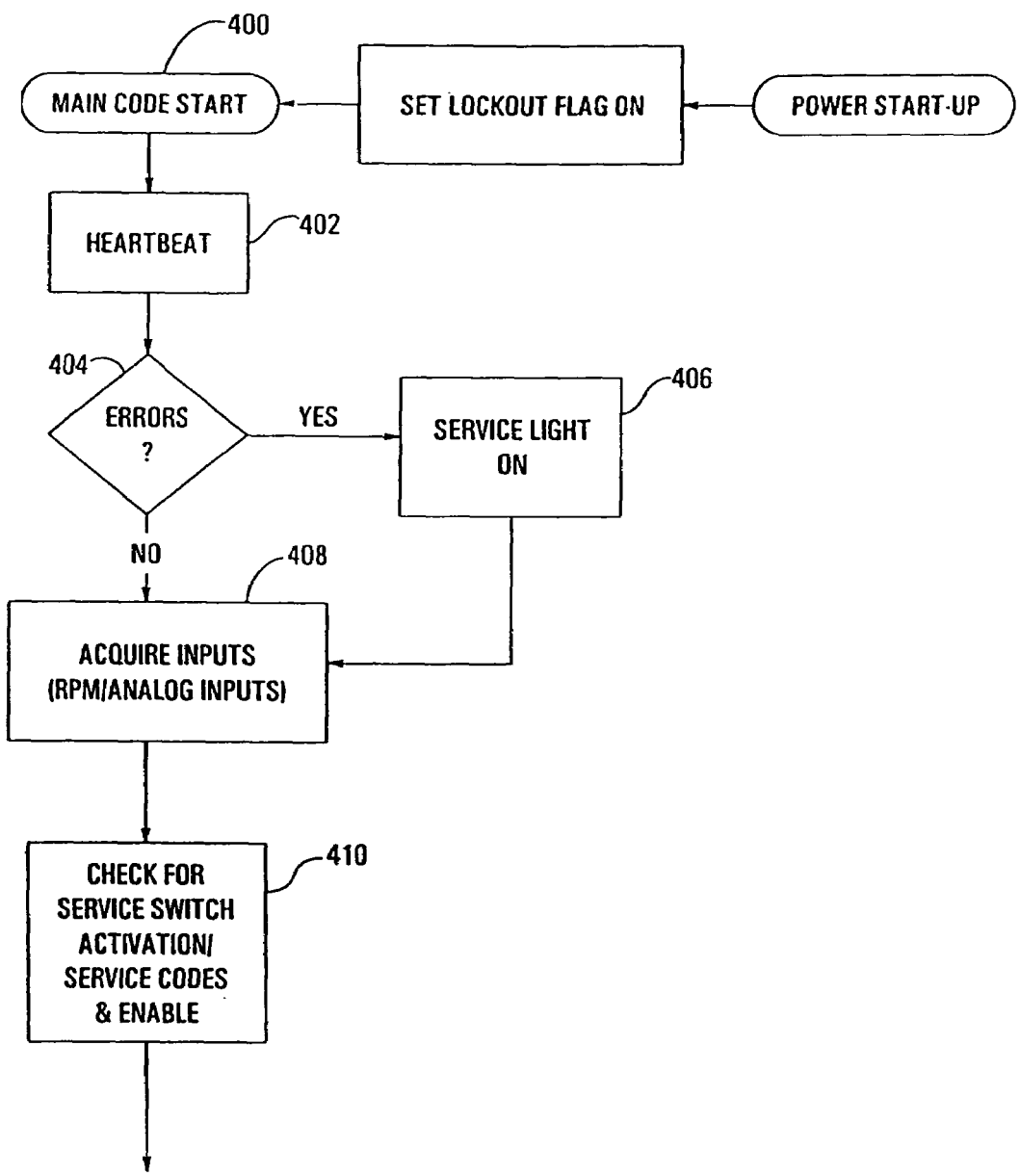
Figure 34B:
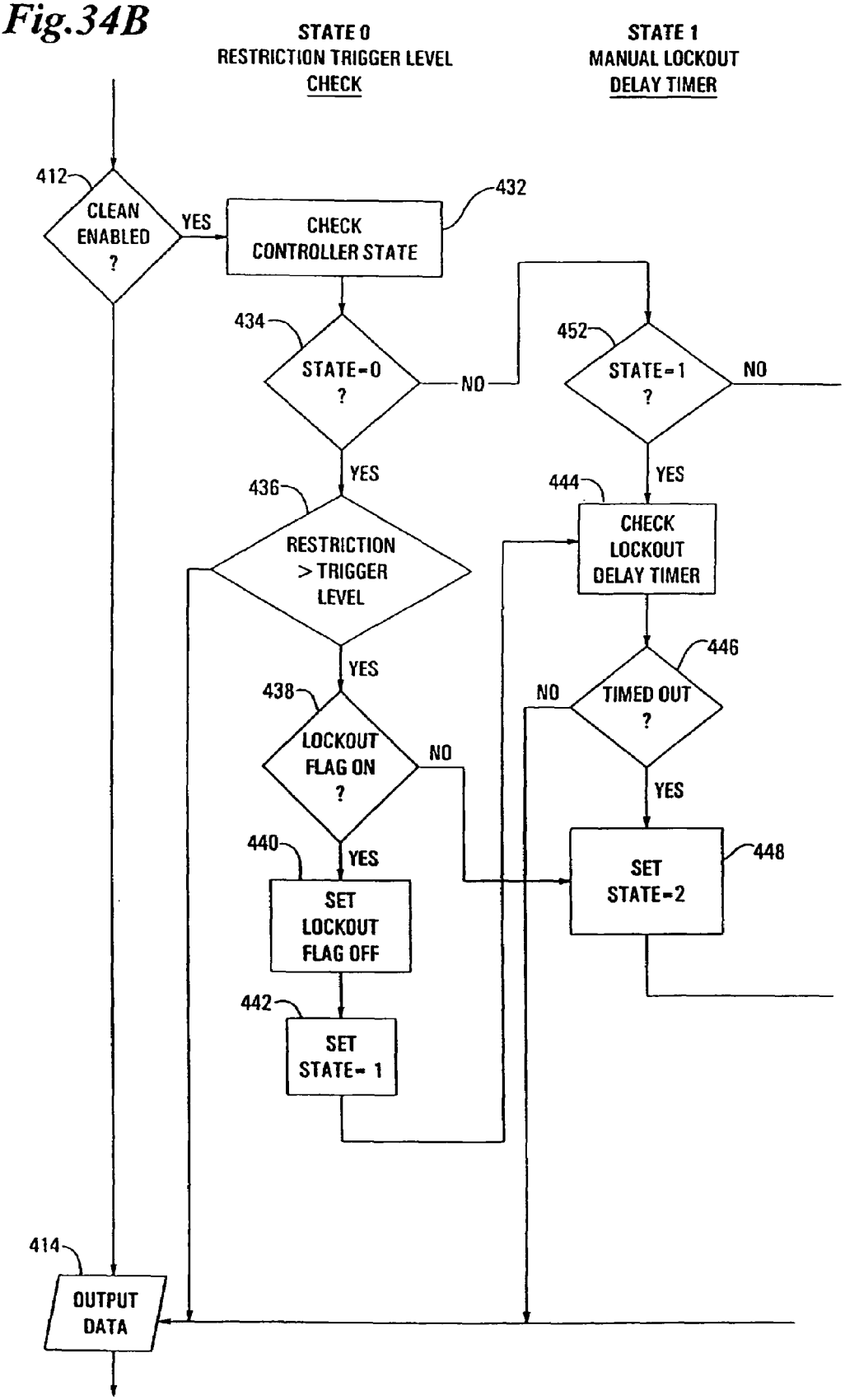
Figure 34C:
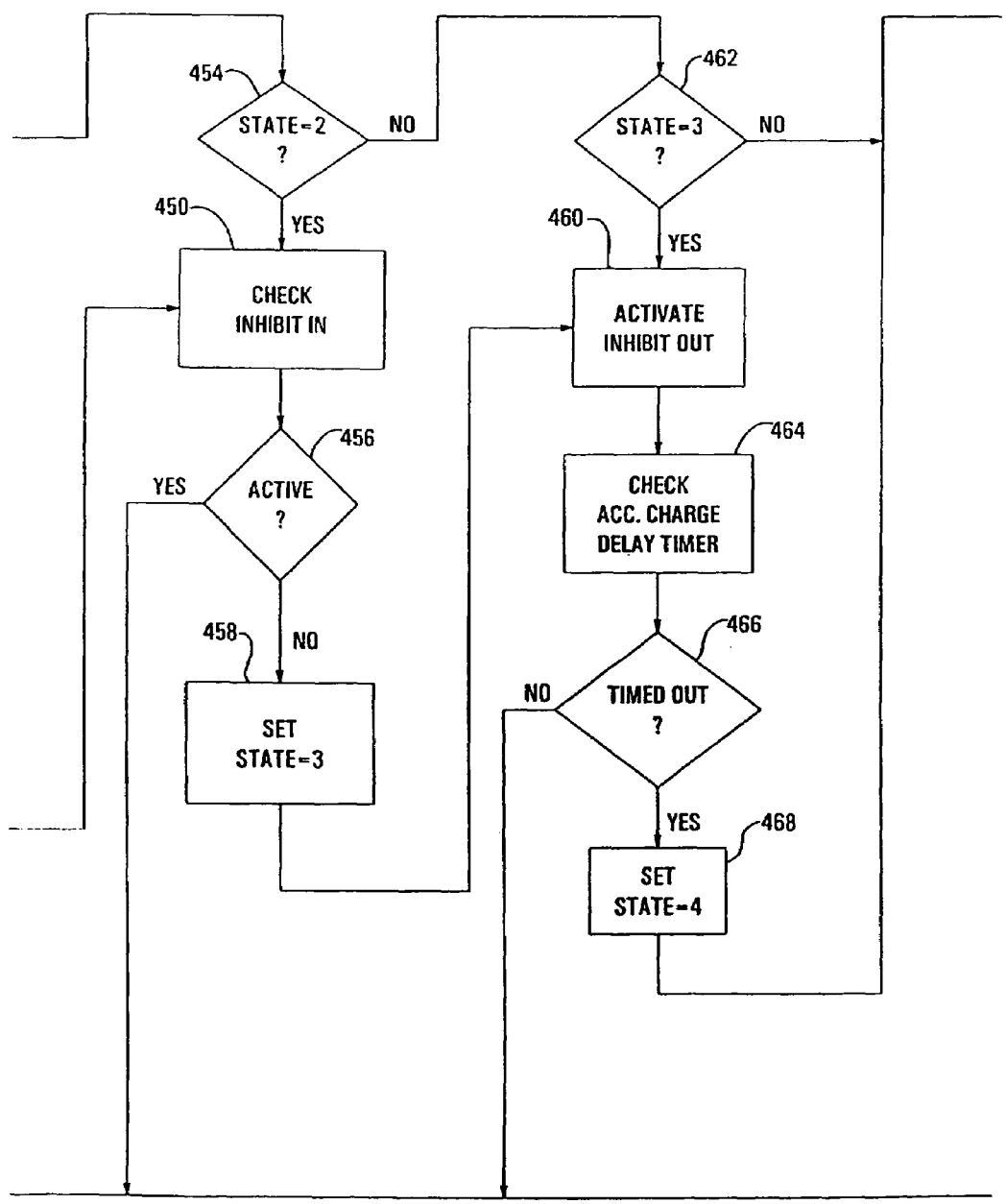
Figure 34D:
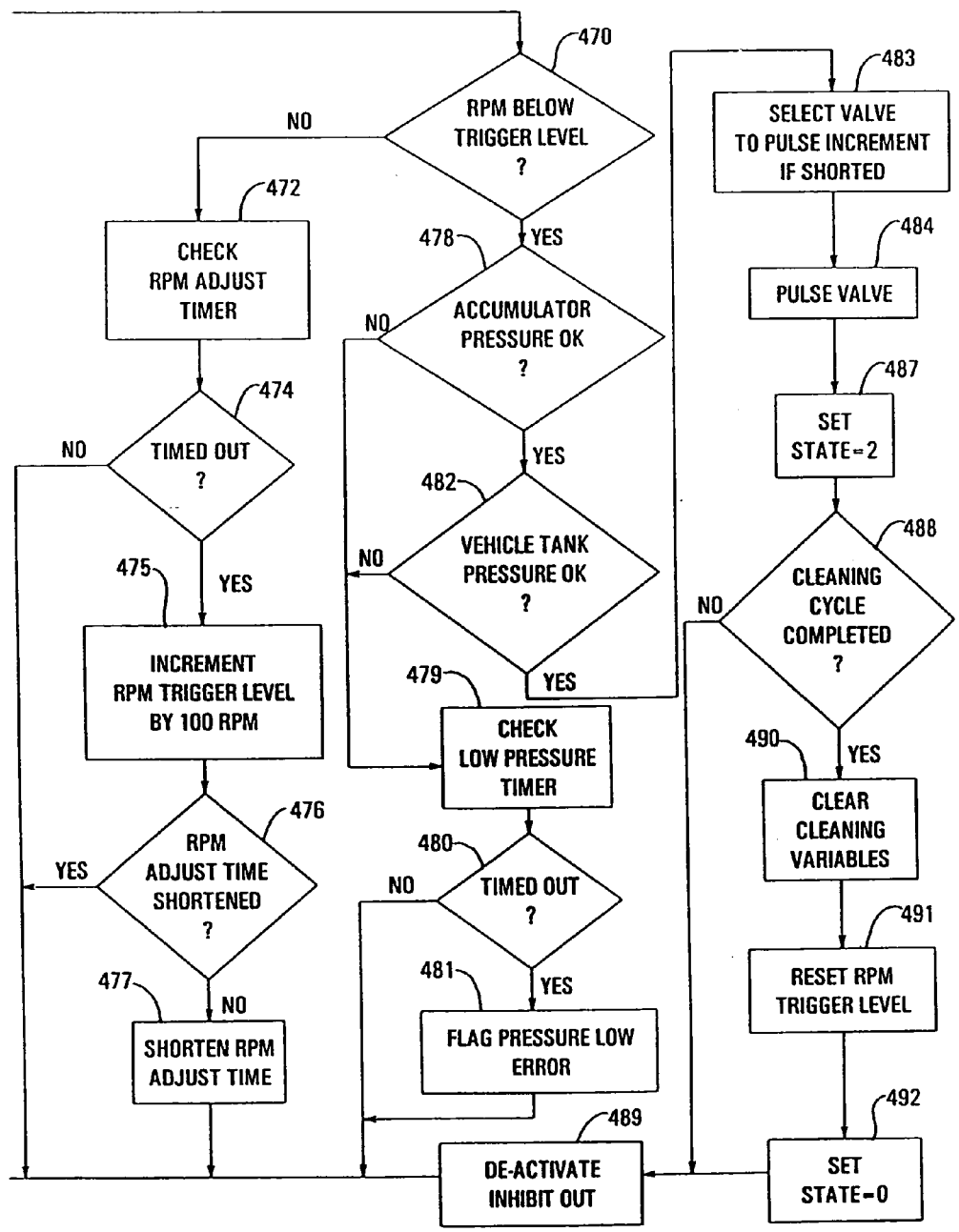
Figure 34E:
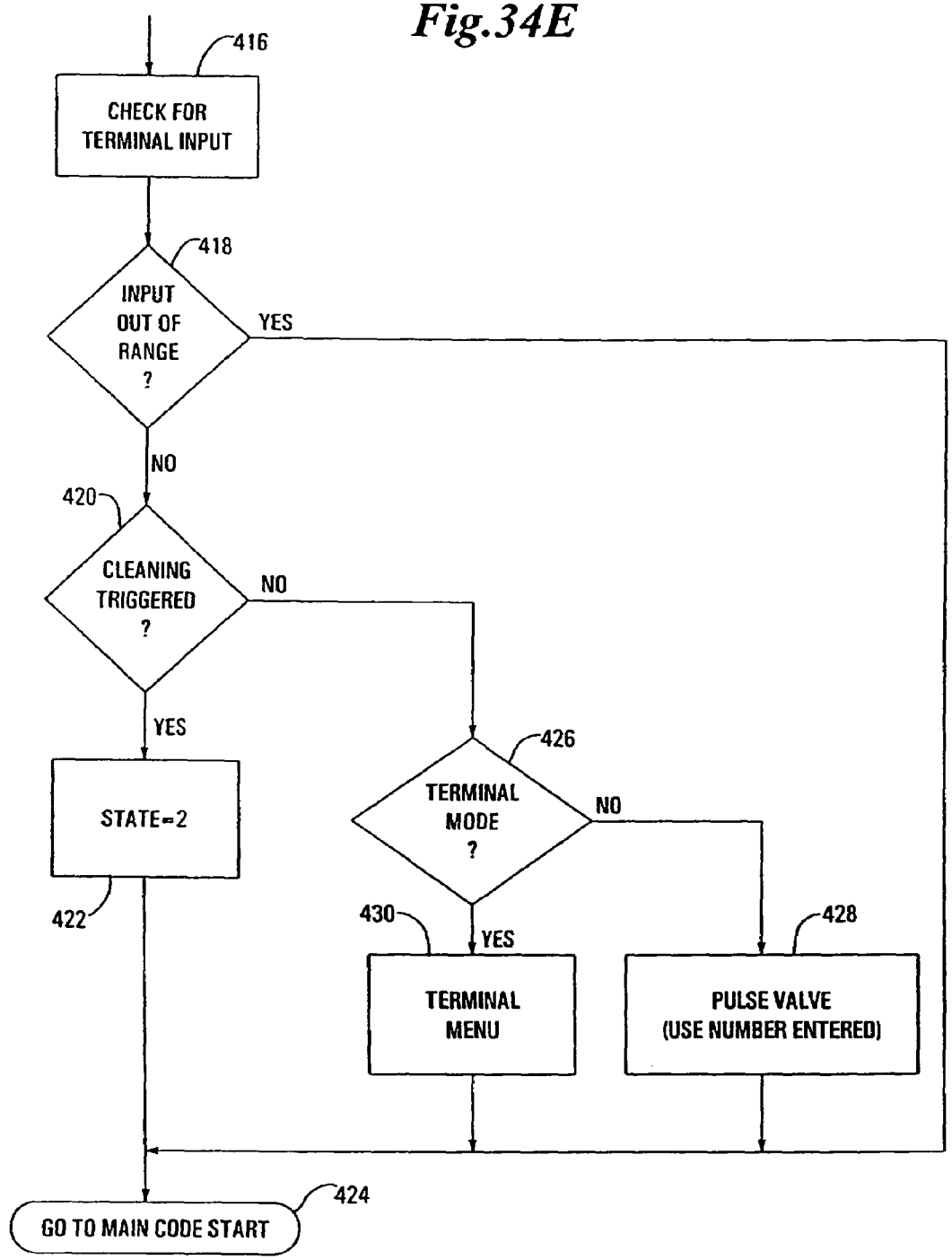

Attention is directed to FIG. 34. FIG. 34 is a flow chart illustrating the preferred logic operation of the control system 499, FIG. 32. Referring now to FIG. 34, the logic control begins at block 400. At block 402, the controller 500 starts-up and sends electrical pulses, or a heart beat, to the module 560, FIG. 32, providing an indication that the controller 500 is working. At block 404, the controller 500 performs a system check for errors. For example, if the heartbeat is not received because of an inoperative controller 500, the service light 510, FIG. 32, is turned on at block 406. If no error is detected, at block 408 the controller 500 acquires inputs from the equipment, such as the rpm of the engine. At block 410, the controller 500 checks the service switch 516 activation, FIG. 32, any service codes received during the last operation, and the enable signal. At block 412, the controller 500 determines if the enable signal 519, FIG. 32, is active.

If the enable signal 519 is inactive, the controller 500 outputs data at block 414 to a RS-232 interface port 532, FIG. 32, which may be connected to another computer. At block 416, the controller 500 checks for any terminal input from an operator interface, such as a computer connected to the RS-232 interface port 532. At block 418, the controller 500 determines if the input received from the RS-232 interface port is out of range. For example, the software loaded on the controller may be menu-driven having six menu choices. If a #7 is received, the input is out of range. If the input is not out of range, the controller 500 determines at block 420 if the cleaning cycle has been triggered. At block 422, the cleaning cycle has been triggered, the controller 500 changes a state flag from 0 to 2 and returns to block 400 via block 424. If the cleaning cycle has not been triggered, the controller 500 at block 426 determines if the logic is a terminal mode, i.e., a computer is connected to the RS-232 port. If not, a pulse valve is fired corresponding to a number input from the RS-232 port at block 428. For example the numbers 1–4 may correspond to pulse valves. If 1 is pressed, the controller 500 fires the first pulse valve at block 428. If the system 429 is in a terminal mode, the controller 500 enters the terminal menu at block 430. The logic then proceeds to block 424.

Returning to block 412, if the enable signal 519, FIG. 32, is active, the controller 500 checks the controller 500 state at block 432. At block 434, the controller 500 determines if the state is equal to 0. If the state is equal to 0, at block 436, the controller 500, or a pressure drop component of the controller 500, determines if the restriction down stream of the V-packs 94, 95, FIG. 6, is greater than a threshold restriction, for example 16 inches (41 cm) of water. If the restriction is not greater, the logic control proceeds to block 414.

If the restriction is greater, the controller 500 determines if the lockout flag is on at block 438. This flag is set on at the application of power to the controller 500 or at vehicle start-up. If the lockout flag is on, block 440, the controller 500 sets the lockout 516 to off. At block 442, the controller 500 changes the state to 1. At block 444, the controller 500 checks a lockout delay timer. For example, this timer may not allow pulsing for two minutes, after a restriction greater than the threshold restriction is detected. At block 446, the controller 500 determines if the delay timer has timed out, or for example, the two minutes is up. This is a safety device to prevent pulsing during servicing. If the delay timer has not timed out, logic control proceeds to block 414. If the delay timer has timed out, the controller 500 sets the state to 2 at block 448. Flow proceeds to block 450 where the controller 500 checks for an inhibit flag.

Referring back to block 438, if the lockout delay is not on, the controller 500 proceeds to block 448. This is the normal logic path. The logic control proceeds as described above. Referring back to block 434, if the state does not equal 0, the controller 500 determines if the state is equal to 1 at block 452. If the state is equal to 1, flow proceeds to block 444 and the logic control proceeds as described above. If the state is not equal to 1, the controller 500 determines if the state is equal to 2 at block 454.

Referring to block 450, logic flow proceeds to block 456 where the controller 500 determines if the inhibit line is active from another controller. If the inhibit line is active, flow proceeds to block 414. If the inhibit line is not active, the controller 500 sets the state to 3 at block 458. At block 460, the controller 500 activates the inhibit out. In some applications multiple air cleaners, such as the air cleaner 1 of FIG. 1, may be utilized on one vehicle. For example, in a two air cleaner, two controller environment, the controller 500 sends an inhibit signal to the other controller to prevent the other controller from firing a pulse valve when the controller 500 is firing a pulse valve. This ensures maximum air pressure for each pulse valve firing. Also, it prevents overloading the vehicle's air supply system.

Referring back to block 454, if the state does not equal 2, the controller 500 determines if the state is equal to 3 at block 462. If the state is equal to 3, flow proceeds to block 460. At block 464, the controller 500 checks a charge tank delay timer. For example, a timer may be set for 10 seconds to allow the charge tank 152, FIG. 32, to refill prior to the next pulse valve firing. At block 466, the controller 500 determines if the accumulator charge delay timer is timed out, i.e., ten seconds has passed. If not, logic flow proceeds to block 414. If the accumulator charge delay timer has timed out, the controller 500 sets the state to 4 at block 468.

At block 470, the controller 500, or an engine load component of the controller 500, determines if the rpm is below a threshold rpm, for example 1200 rpm via the rpm sensor 513, FIG. 32. Referring back to block 462, if the state does not equal 3, flow proceeds to block 470. If the rpm is not below the threshold level, the controller 500 checks an rpm adjust timer at block 472. For example, the rpm adjust timer may be used to increase the rpm threshold trigger level over time. If an amount of time has elapsed, i.e., ten minutes, the controller 500 will adjust the threshold rpm level. At block 474, the controller 500 determines if the rpm adjust timer has timed out. If not, flow proceeds to block 414. If the adjust timer has timed out, the controller 500 increments the rpm threshold level by 100 rpm at block 475, for example, the threshold rpm is now 1300 rpm. At block 476, the controller 500 determines if the rpm adjust time should be shortened. For example, after the initial 10 minutes, an rpm adjust time may be shortened to 5 minutes. If yes, flow proceeds to block 414. If not, the controller 500 shortens the rpm adjust time at block 477 to, for example, 5 minutes. Logic flow proceeds to block 414.

Referring back to block 470, if the rpm is below the threshold level, the controller 500, or an accumulator pressure component, determines if the charge tank 152, FIG. 32, has sufficient pressure at block 478, for example 90 psi. If not, flow proceeds to block 479. At block 479, the controller 500 checks a low pressure timer. For example, the controller 500 may wait 30 minutes for the charge tank to fill-up to 90 psi. At block 480, the controller determines if the low pressure timer has timed out, i.e., 30 minutes has passed. If not, logic flow proceeds to block 414. If the timer has timed-out, the controller 500 turns on the service light 510, FIG. 32, at block 481. Logic flow proceeds to block 414.

Figure 35:
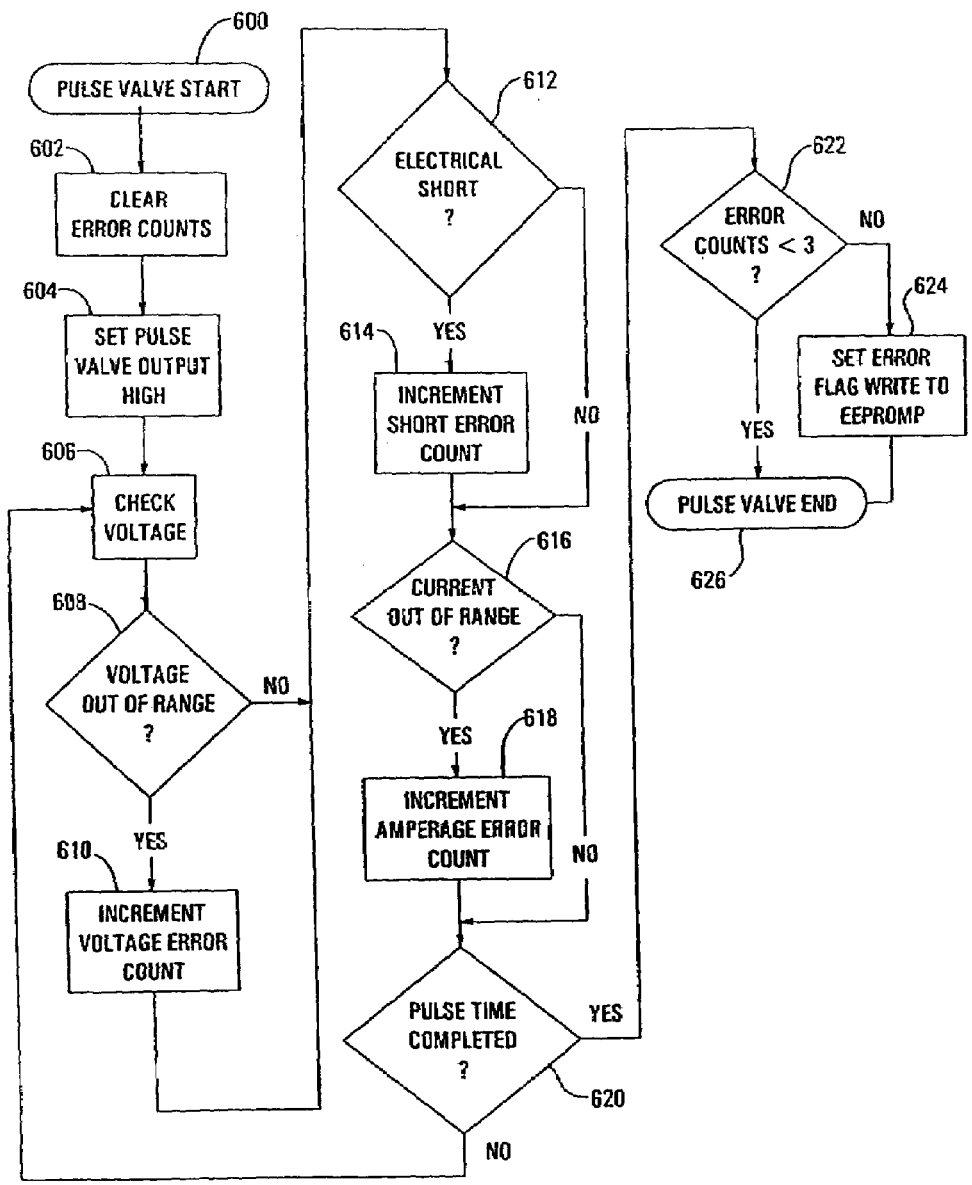
FIG. 35 is a flow chart depicting more detail of the firing of a pulse valve by the control system of FIG. 34.

Referring back to block 478, if the accumulator has sufficient pressure, the controller 500, or a vehicle pressure component of the controller 500, determines at block 482 if the vehicle pressure tank is sufficient pressure, for example 95 psi. If not, flow proceeds to block 479. If the vehicle pressure tank is sufficient, the controller 500, or a pulse firing component of the controller 500, selects the pulse valve to pulse at block 483. At block 484, the controller 500 pulses the valve. Attention is directed to FIG. 35. FIG. 35 is a flow chart illustrating a more detailed, preferred logic of the firing of a pulse valve. At block 600, the firing sequence begins. While firing the pulse valve, at block 602, the controller 500 clears all error counts. At block 604, the controller 500 sets the pulse valve output high. At block 606, the controller 500 checks the voltage. At block 608, the controller 500 determines if the voltage is too low or high. If the voltage is too low or high, the controller increments a voltage error count at block 610. Logic flow proceeds at block 612. Referring back to block 608, if the voltage is correct, at block 612, the controller 500 checks for an electrical short. If there is an electrical short, the controller at block 614 increments a short error count. Logic flow proceeds to block 616. If there is not an electrical short, at block 616, the controller determines if the current is too low or too high. If so, at block 618, the controller 500 increments the amperage error count. Logic flow proceeds to block 620. If the current is correct, at block 620, the controller checks if the pulse time is completed. If not, logic flow proceeds to block 606. Thus, during firing of a pulse valve, the controller 500 continually monitors the checks described above. If the pulse time is completed, at block 622, the controller determines if the error counts are less than 3. If not, at block 624, the controller sets the error flag and writes to the EE PROM. Logic flow proceeds to block 626. If yes, the pulse valve firing is completed at block 626.

Referring back to block 484, FIG. 34, at block 487, the controller 500 sets the state to 2. At block 488, the controller 500 determines if the cleaning cycle has been completed. If the cleaning cycle has not been completed, the controller 500 deactivates the inhibit at block 489. For example, have 40 pulses been fired. If the cleaning cycle has been completed, the controller 500 clears the cleaning variables at block 490. At block 491, the controller 500 resets the rpm threshold level back to the initial threshold level, i.e. 1200. At block 492, the controller 500 sets the state to 0. Logic flow proceeds to block 489.

In general, according to U.S. Ser. No. 09/325,697, the controller 500 monitors the restriction down stream of the V-packs 94, 95. When the restriction down stream of the V-packs 94, 95 is greater than 16 inches (41 cm) of water, the clean cycle is enabled. It is generally preferred that once the clean cycle is enabled, that the cleaning cycle be completed within a predetermined amount of time. This is so that the cleaning cycle is completed before the V-packs 94, 95 reach a level of pressure differential that cannot be cleaned by the pulse system 499, as previously described herein. This predetermined time period is empirically determined based on field tests. In general, the amount of time will be greater than 3 minutes, preferably between 20 minutes and 120 minutes, and most preferably between 30 minutes and 90 minutes.

The controller 500 monitors the engine speed. The controller 500 determines if the engine speed is less than a first speed, or in other words, in a low idle condition for example, 1200 rpms. If the engine speed is less than 1200 rpms, the controller 500 determines if the air pressure in the charge tank is greater than 90 psi. If the air pressure is greater than 100 psi, the controller 500 checks the vehicle tank pressure. If the vehicle tank pressure is greater than 90 psi, a pulse valve is fired. When the cleaning cycle is started, a timer is set, for example at 10 minutes. The controller continues to monitor the rpms during the 10 minutes. If after 10 minutes the cleaning cycle has not been completed, the controller 500 increments the rpm by 100 to 1300 rpm. The timer is reset for 5 minutes. If the cleaning cycle is not completed during the next 5 minutes the controller 500 again increments the rpm to 1400. Thus continues until a complete cleaning cycle, for example 4 valves, ten pulses each, has been completed.

In general, a complete cleaning cycle may be any number of pulse valve firings. The number of pulse valve firings needed to clean the V-packs 94, 95 is empirically determined from field tests and will vary under varying conditions. Preferably, the cleaning cycle will comprise at least 4 pulse valve firings, more preferably between 10 and 80, and most preferably 40 pulse valve firings. As previously discussed, the amount of time that elapses, between the start of the cleaning mode and the completion of the cleaning cycle, varies.

In one particular example, the amount of time that elapses between the start of the cleaning mode and the completion of the cleaning cycle is 60 minutes and the required pulse valve firings is 40. In addition, the threshold rpm is 1200 rpm, and the rpm increment is 100 rpm.

In alternative embodiments, any number of pulse valve firings, engine speeds, elapsed time, number of increments (both engine speed and elapsed time) may be utilized in accordance with the principles described.

The logical operations of the various embodiments described herein can be implemented (1) as a sequence of computer implemented steps or program modules running on a computing system and/or (2) as interconnected logic circuits or circuit modules within the computing system. The implementation is a matter of choice dependent on the performance requirements of the computing system implementing the invention. Accordingly, the logical operations making up the embodiments of the present invention described herein are referred to variously as operations, steps, engines, blocks, or modules.

II. Comments on Disclosure of U.S. patent application Ser. No. 09/325,697

In the disclosure of U.S. patent application Ser. No. 09/325,697 subsection C, the media 200 of the V-Packs 94, 95 is discussed. In particular, a deposit or layer of polymeric fiber material, or "fine fiber," is discussed. The amount of fine fiber deposited is a matter of design choice for a given application. The method used will be a matter of choice based upon such factors as cost, availability of equipment, and related commercial variables. One usable method is disclosed in U.S. Pat. No. 4,650,506, issued to Barris et al.

III. Additional Disclosure Relating to an Interlock Arrangement

Figure 36:
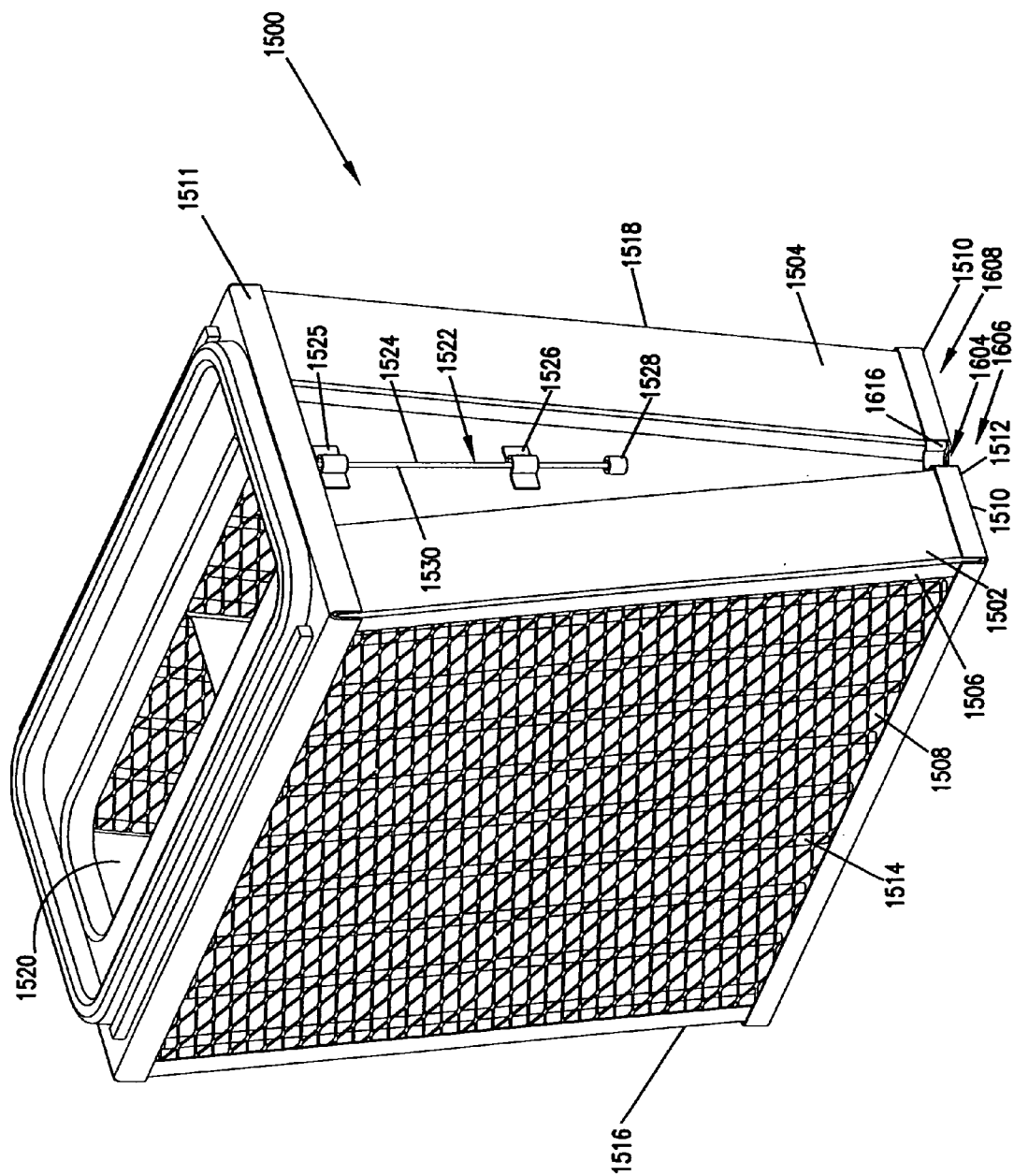
FIG. 36 is a perspective view of a second embodiment of a V-pack filter.
Figure 38:
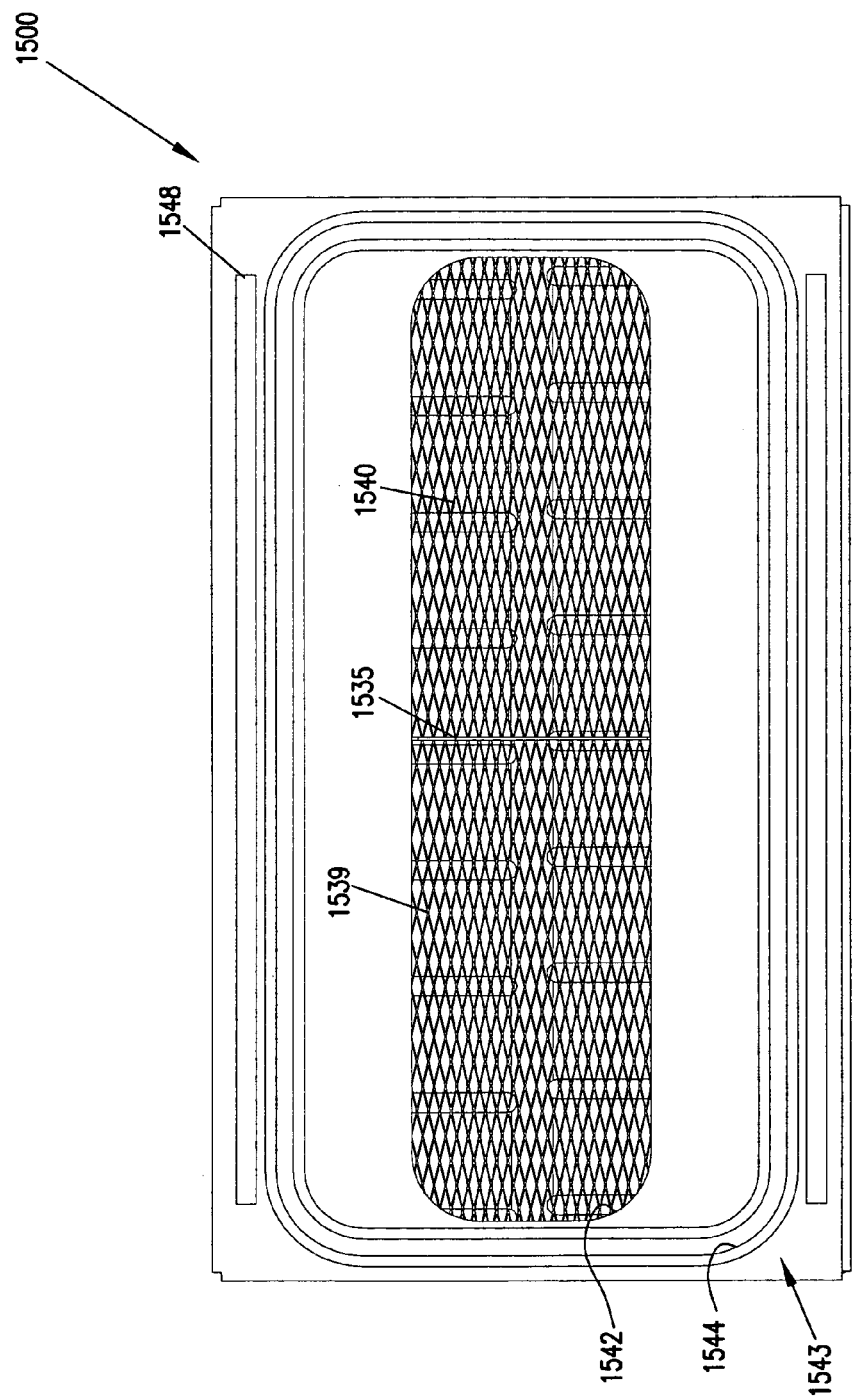
FIG. 38 is a top, plan view of the V-pack filter of FIG. 36.
Figure 39:
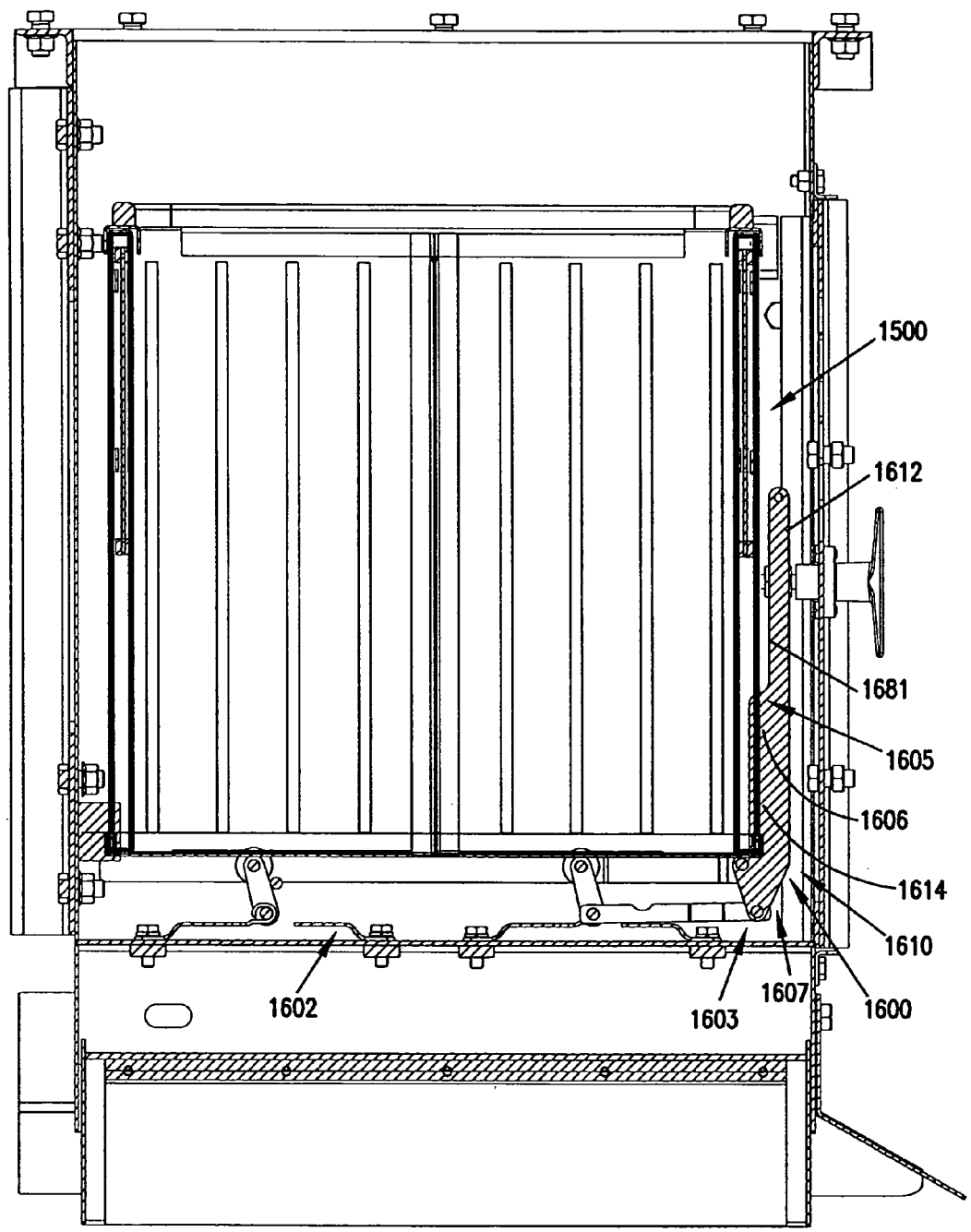
FIG. 39 is cross-sectional view of a second embodiment of a first chamber of a filter assembly.
Figure 40:
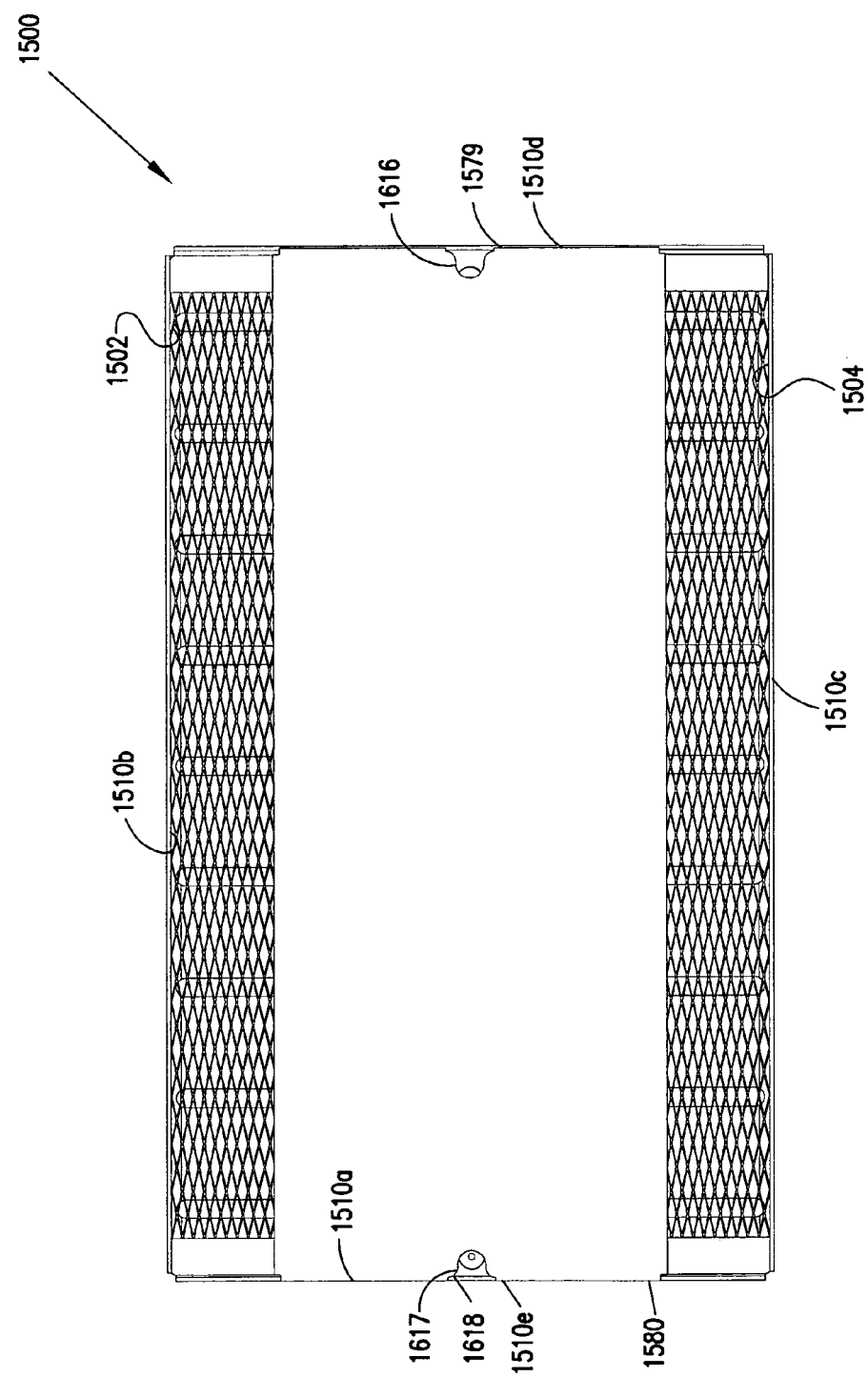
FIG. 40 is bottom, plan view of the V-pack filter of FIG. 36.

Attention is now directed to FIGS. 36–43. These figures were not present in U.S. Ser. No. 09/325,697. In FIG. 36, an example embodiment of a V-pack filter 1500 is depicted. The V-pack filter 1500 comprises first and second panels 1502, 1504, with media 1508 positioned therein, and an outer frame construction 1506. The frame construction 1506 includes first and second frame structures, or end caps, 1510, 1511. The first frame structure 1510 seals a side, or end, orientated as a bottom 1512 of the V-pack filter 1500, forcing air through the first and second panels 1502, 1504. Attention is directed to FIG. 40. FIG. 40 is a bottom, plan view of the V-pack 1500. The first frame structure 1510 includes a bottom portion 1510a. The bottom portion 1510a includes first and second side portions 1510b, 1510c and first and second end portions 1510d, 1510e extending therefrom. In the particular arrangement shown, the first and second side portions 1510b, 1510c and first and second end portions

1510*d*, 1510*e* are approximately perpendicular to the bottom portion 1510*a*, as illustrated in FIGS. 36 and 40.

Referring back to FIG. 36, in the particular embodiment depicted, the media 1508 of the first and second panels 1502, 1504 is pleated and oriented such that when the V-pack filter 1500 is positioned in the vertical orientation of FIG. 6, the pleats 1514 extend vertically. Having vertical pleats is typically preferred because it aids in knocking the dust of the V-pack filter 1500 during a pulse cycle as described in U.S. Ser. No. 09/325,697.

Figure 37:
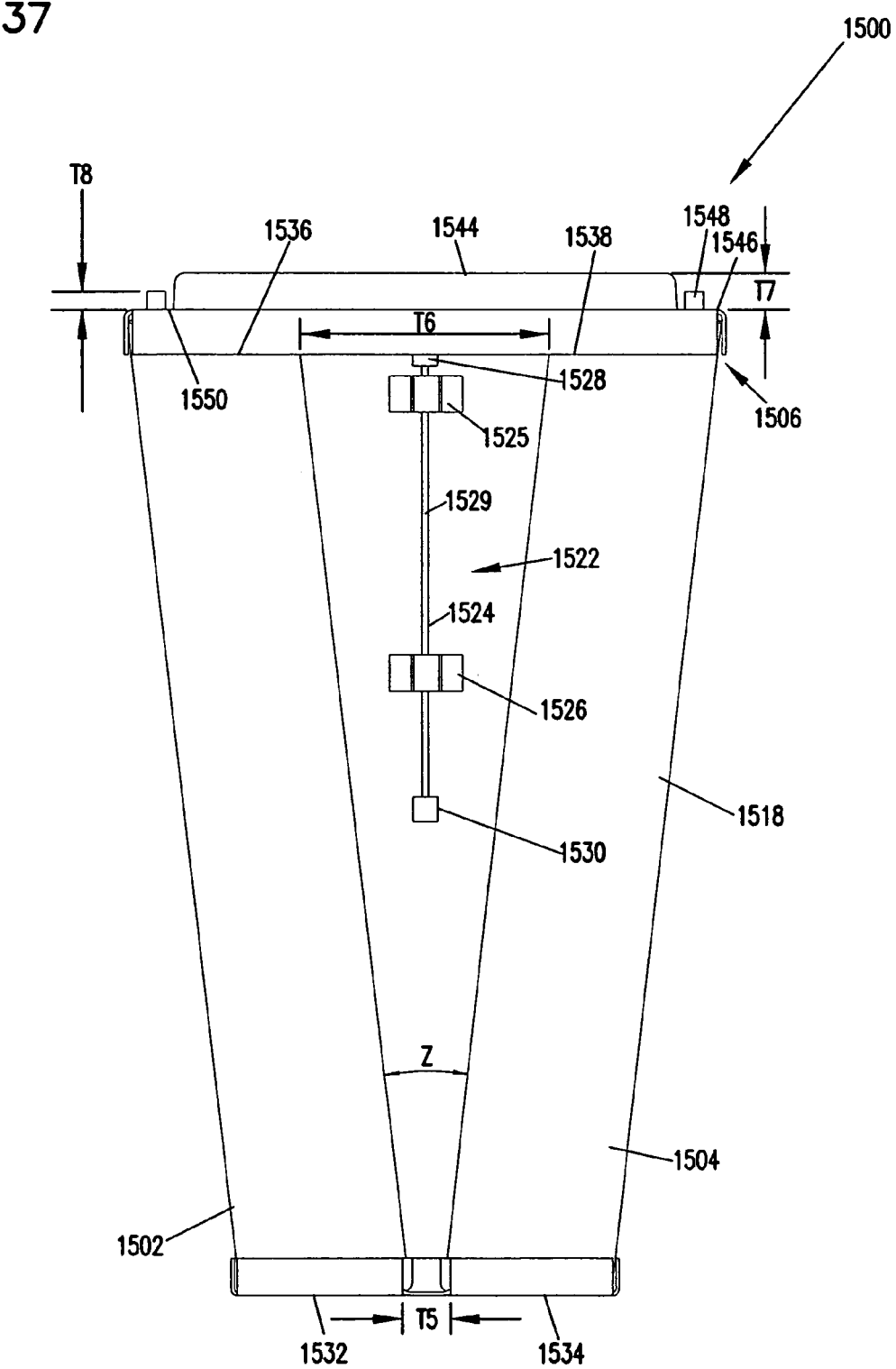
FIG. 37 is a side, elevational view of the V-pack filter of FIG. 36.

The V-pack filter 1500 includes first and second opposite end panels 1516, 1518. The first and second end panels 1516, 1518 close ends of the clean air plenum 1520 when the V-pack 1500 is operably mounted, or positioned. By the term "operably mounted," it is meant that the V-pack filter 1500 is in sealing engagement with a housing, such as the housing 1 shown in FIG. 6. Attention is directed to FIG. 37. FIG. 37 is a side, elevational view of the V-pack 1500. For convenience, one of the end panels 1518 is shown having a handle construction 1522 positioned thereon. The handle construction 1522 is convenient for mounting and dismounting the V-pack filter 1500 and also for carrying the V-pack filter 1500. It should be noted that the other end panel 1516 could also have a handle construction or that neither end panel 1516, 1518 would have a handle construction.

Attention is directed to FIG. 37. FIG. 37 is a side elevational view of the V-pack filter 1500 of FIG. 36. Preferably, the handle construction 1522 is secured in extension between first and second brackets 1525, 1526. The handle construction 1522 comprises an extension of wire 1524 having first and second end stops 1528, 1530 thereon. When a central portion 1529 of the flexible wire 1524 is pulled, the handle construction 1522 will bow outwardly until the end stops 1528, 1530 engage the brackets 1525, 1526, respectively.

The first and second panels 1502, 1504 are oriented in a V-shape, as shown. The first panel section 1502 has first and second ends 1532, 1536. Likewise, the second panel section 1504 has third and fourth ends 1534, 1538. The first end 1532 of the first panel section 1502 and the third end 1534 of the second panel section 1504 are oriented either adjacent one another or closely spaced and having a first distance T5 between them. The second end 1536 of the first panel section 1502 and the fourth end 1538 of the second panel section 1504 are spread apart from one another having a second distance T6 between them. Preferably, the second distance T6 is greater than the first distance T5. That is, preferably the panels 1502, 1504 form a V-shape, most preferably having a filter angle Z between the panels 1502, 1504, of at least about 5°, preferably within the range of 10 to 25°, most preferably about 13 to 17°.

Attention is directed to FIG. 38. FIG. 38 is a top, plan view of the V-pack filter 1500 of FIG. 36. The V-pack filter 1500 preferably includes a central spacer 1535 separating the V-pack filter 1500 into separate regions 1539, 1540. In use, a separate one of nozzles, for example the nozzles 162–165 of FIG. 8, is directed into each region 1539, 1540. The central spacer 1535 directs the air from each nozzle to an associated region 1539, 1540 of the V-pack filter 1500 to provide directed air sufficient to clean the exterior portions of the panels 1502, 1504.

The air flow exit end 1542 of the V-pack filter 1500 includes a sealing arrangement 1543 thereon. Preferably, the sealing arrangement 1543 includes a seal ring or gasket 1544 having a first projection thickness T7, FIG. 37. Referring back to FIG. 37, when the V-pack filter 1500 is operatively positioned within an air cleaner assembly, such as the assembly 1 of FIG. 7, the seal arrangement 1543 is pressed between an end 1546 of the V-pack filter 1500 and a tube sheet, such as the tube sheet 250 of FIG. 7. In general, the seal arrangement 1543 is sized to be sealingly positioned around an aperture, such as the aperture 100 of FIG. 7, in the tube sheet.

Preferably, the V-pack filter 1500 also includes a hard stop arrangement 1548 thereon having a second projection thickness T8 less than the first thickness T7. Preferably the hard stop arrangement 1548 is configured to extend the second thickness T8 of at least about 0.1 inches (2.5 mm), typically about 0.2 inches (5.1 mm) to 0.3 (7.6 mm) inches, above (or outwardly from) a top surface 1550 of the V-pack filter frame construction 1506. Also, preferably the seal arrangement 1543 is selected such that, prior to being pressed, the seal arrangement 1543 extends at least about 0.1 inches (2.5 mm) to 0.3 inches (7.6 mm) beyond the hard stop arrangement 1548. In other words, the thickness T7 of the seal arrangement 1543 is at least about 0.1 inches to 0.3 inches greater than the thickness T8 of the hard stop arrangement 1548. The hard stop arrangement 1548 provides for a hard contact against the tube sheet as the V-pack filter 1500 is moved into operable position. Preferably, the hard stop arrangement 1548 comprises a metal such as steel. Most preferably, the gasket material is polyurethane, having a thickness of at least 0.40 inches in extension outwardly from the surface 1550 of the V-pack filter frame construction 1506.

Referring now to FIG. 39, preferably, an apparatus 1600 includes the V-pack filter 1500 and a retention, or lift, mechanism 1602. Preferably, the retention mechanism 1602 moves the V-pack filter 1500 into its sealing, or operable, position around the aperture in the tube sheet. The retention mechanism 1602 is analogous to the lift mechanism 280 of U.S. Ser. No. 09/325,697. Preferably, the apparatus 1600 also includes a locking system, or interlocking arrangement, 1603. The locking system 1603 is constructed and arranged to help retain the V-pack 1500 in its sealed, or operable, position, when the retention mechanism 1602 is moved to a first raised, or locked, orientation as described in U.S. Ser. No. 09/325,697. The locking system 1603 also helps to center the V-pack filter 1500 around the aperture 100 and to stabilize the V-pack filter 1500 during operation. The locking system 1603 also prevents inappropriate, i.e. parts not having the required performance characteristics, parts from being used in the apparatus 1600.

Preferably, the locking system 1603 includes first and second locking devices 1604, 1605, FIGS. 36 and 39. Preferably, the first and second locking devices 1604, 1605 are constructed and arranged to interact with each other. Preferably, the locking system 1600 includes a first, locked orientation and a second, unlocked orientation. In the first, locked orientation, the first and second locking devices 1604, 1605 interact with each other. By the term "interact," it is meant that the first and second locking devices 1604, 1605 engage each other sufficiently to prevent undesired movement of the V-pack filter 1500. In the second, unlocked orientation, the first and second locking devices 1604, 1605 do not interact.

In one example embodiment, the V-pack filter 1500 defines the first locking device 1604, FIG. 36, while the retention mechanism 1602 includes the second locking device 1605, FIG. 39. Preferably, the first locking device 1604 includes at least a first interlocking member, or structure, 1606 and the second locking device 1605 includes at least a first interlocking member 1607. Preferably, the first locking member 1604 is a female locking member 1608 and the second locking member is a male locking member 1610.

In the example embodiment illustrated in FIG. 36, the first frame structure 1510 defines the female locking member 1608. Preferably, the first end portion of the first frame structure 1510 defines a locking groove, cutout, notch, or receiver indent 1616. In the example embodiment illustrated in FIG. 39, the retention mechanism 1602 includes a control arm 1612. Preferably, the control arm 1612 includes the male locking member 1610. Preferably, the male locking member is a locking rib or projection 1614 extending from the control arm 1612. The locking rib 1614 extends or projects outwardly from the control arm 1612 in the general direction of the V-pack filter 1500 as illustrated in FIG. 39. Preferably, the locking groove 1616 of the V-pack filter 1500 is constructed and arranged to receive the locking rib 1614 of the retention mechanism 1602. The locking rib 1614 fits within, engages, or interacts with the locking groove 1616 of the V-pack filter 1500. By the term "receive," it is meant that the locking rib and groove 1614, 1616 interengage with one another. By the term "interengage," it is meant that the interaction of the locking rib and groove 1614, 1616 is sufficient to prevent undesired movement of the V-pack filter 1500 during operation. In other words, the locking rib and groove 1614, 1616 do not need to be frictionally engaged with one another but need only interact sufficiently to prevent substantial undesired movement of the V-pack filter 1500.

When the V-pack filter 1500 is placed in the housing, such as the housing 1 of FIG. 6, on the retention mechanism 1602, the retention mechanism 1602 is used to move the filter V-pack 1500 into sealing engagement around the aperture and against the tube sheet. When the retention mechanism 1602 is placed in its raised, or locked, orientation, the locking rib 1614 of the retention mechanism 1602 projects into the locking groove 1616 of the V-pack filter 1500. As such, the locking system 1603 centers the V-pack and stabilizes it from undesirable misalignment.

Referring back to FIG. 40, it is noted that the first locking device 1604 preferably also includes a second interlocking member 1617 having a second locking groove 1618, opposite the first locking groove 1616. Each locking groove 1616, 1618 is being positioned at the ends 1579, 1580, respectively of the V-pack filter 1500. The second locking groove 1618 is analogous to the first locking groove 1616. Preferably, the locking grooves 1616, 1618 are centered between the first and second panels 1502, 1504 of the V-pack 1500. Preferably, in the particular embodiment illustrated in FIG. 40, the locking grooves 1616, 1618 are generally U-shaped having two filets. The center of the semi-circle portion of the u-shape of the lock grooves 1616, 1618 is preferably located inboard of the ends 1579, 1580 of the V-pack 1500, at least 0.05 inches, preferably between 0.10 inches and 0.30 inches, and most preferably about 0.18 inches. Alternatively, a variety of shapes and sizes could be utilized for the locking grooves 1616, 1618.

It is noted that the second locking groove 1618 of the first interlocking device 1604 might interact with a third interlocking device (not shown) on the housing.

Referring back to FIG. 39, preferably, the locking rib 1614 projects from a front face 1681 of the control arm 1612 at least 0.05 inches and preferably between 0.10 inches and 0.50 inches. Alternatively, a variety of shapes and sizes could be utilized for the locking rib 1614.

During interlocking of the locking rib 1614 and the locking groove 1616, the locking rib 1614 extends generally into the locking groove 1616 at least 0.05 inches and preferably between 0.10 inches and 0.50 inches.

Figure 41:
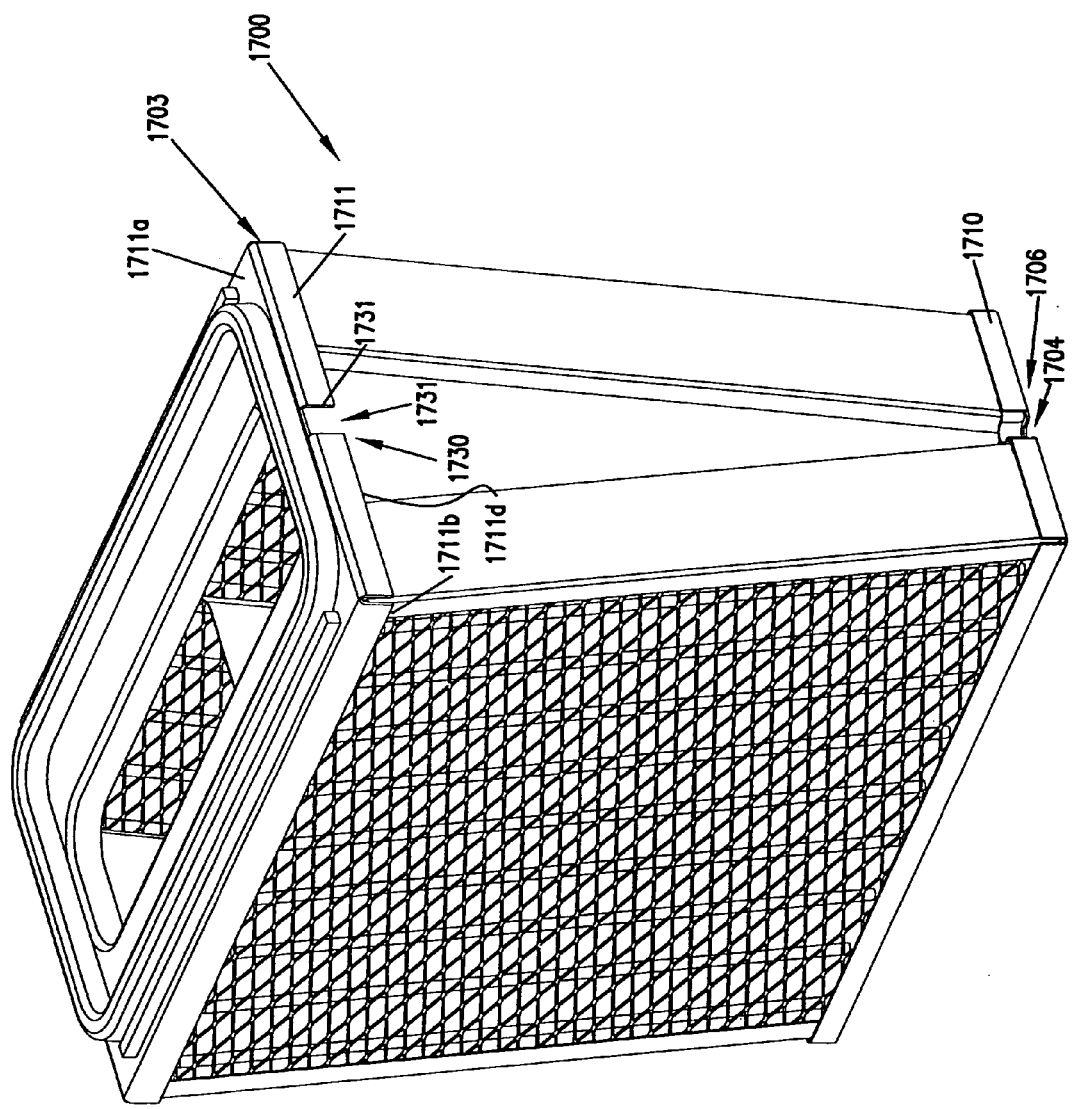
FIG. 41 is a perspective view of a third embodiment of a V-pack filter.

Attention is now directed to FIG. 41. FIG. 41 is a perspective view of another embodiment of a V-pack filter 1700. Analogous to the V-pack filter 1500 of FIG. 36, the V-pack filter 1700 includes a frame construction 1703 and a first locking device 1704. The first locking device 1704 includes a first interlocking member 1706 and an opposite second interlocking member (not shown). In this embodiment, the first locking device 1704 also includes a third interlocking member 1730.

The frame construction 1703 includes first and second frame structures 1710, 1711, analogous to the frame construction 1506 of FIG. 36. The second frame structure 1711 includes a top portion 1711*a*. The top portion 1711*a* includes a first side portion 1711*b*, a second side portion (not shown), a first end portion 1711*d*, and a second end portion (not shown) extending therefrom. The first end portion 1711*d* defines the third interlocking member 1730. In particular, the third interlocking member 1730 is a cutout, or notch 1731 in the first end portion 1711*d*. Preferably in this embodiment, the first locking device would also include a fourth interlocking member (not shown) opposite and analogous to the third interlocking member 1730 in the second end portion (not shown).

Although not shown, in this embodiment, a retention mechanism includes a second interlocking device constructed and arranged to interact with the first interlocking device. In particular the locking rib, such as the locking rib 1614 of the retention mechanism 1602 of FIG. 39, extends to the top of the control arm, such as the control arm 1612 of FIG. 39. This locking rib engages with the first interlocking member 1706 and the third interlocking member 1730.

It is noted that although not shown, the second and fourth interlocking members of the first interlocking device 1704 might interact with a third interlocking device (not shown) on the housing.

Figure 42:
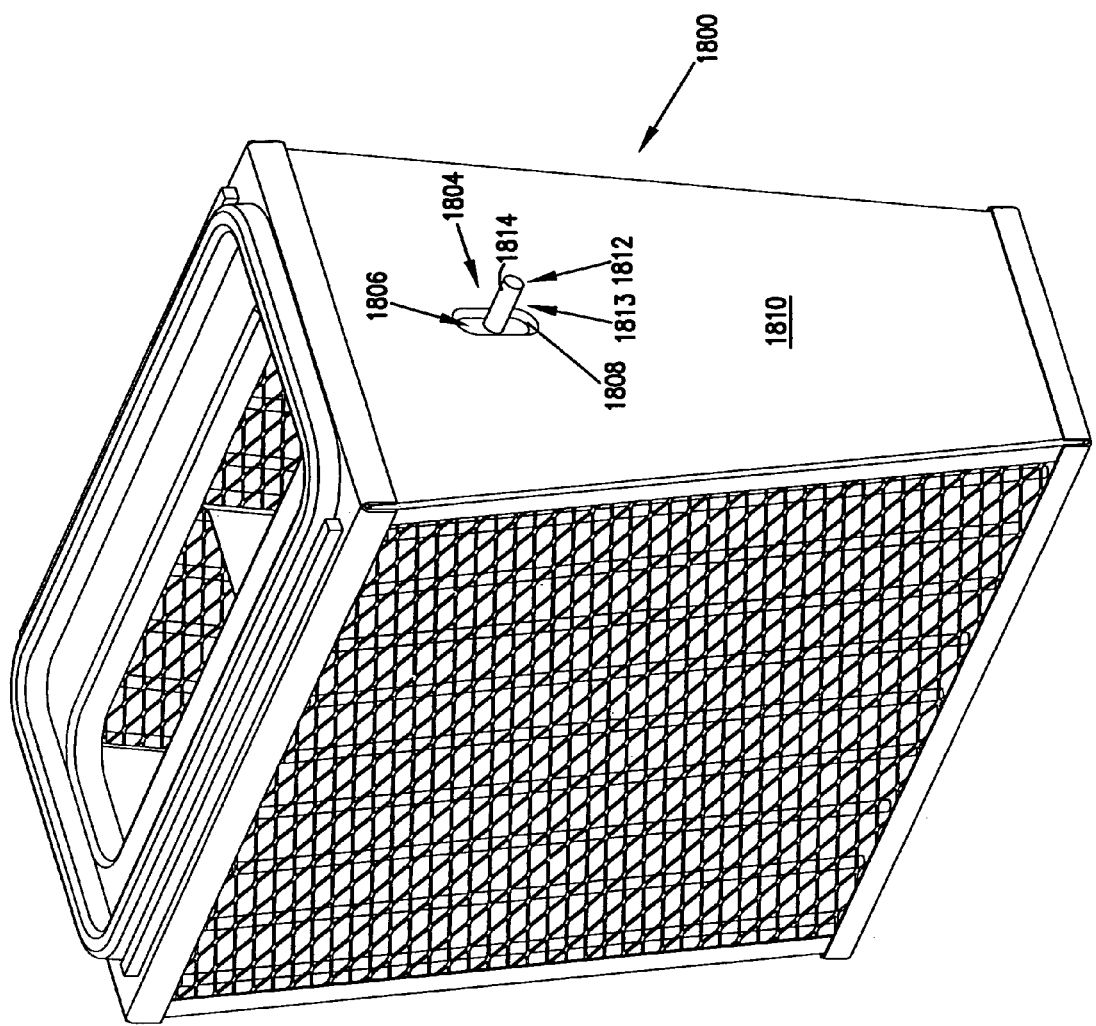
FIG. 42 is a perspective view of a fourth embodiment of a V-pack filter.

Attention is directed to FIG. 42. FIG. 42 is a perspective view of another embodiment of a V-pack filter 1800. Analogous to the V-pack filter 1500 of FIG. 36, the V-pack filter 1800 includes a first locking device 1804. The first locking device 1804 includes a first interlocking member 1806 and an opposite second interlocking member (not shown). In this particular embodiment, the first interlocking member 1806 is a recess, cutout, or indent 1808 in a side panel 1810 of the V-pack filter 1800. Or, in other words, the side panel 1810 defines the indent 1808.

The first locking device 1804 is constructed and arranged to receive a second interlocking device 1812. The second interlocking device includes a first interlocking member 1813. In this particular embodiment, the first interlocking member 1813 is a pin, or projection 1814. The projection 1814 might extend from a control arm of a retention mechanism, such as the retention mechanism 1602 of FIG. 39. The projection 1814 might also extend from a door, such as the access door 5 of FIG. 4. The first and second interlocking devices 1804, 1812 are constructed and arranged to interact with each other.

Figure 43:
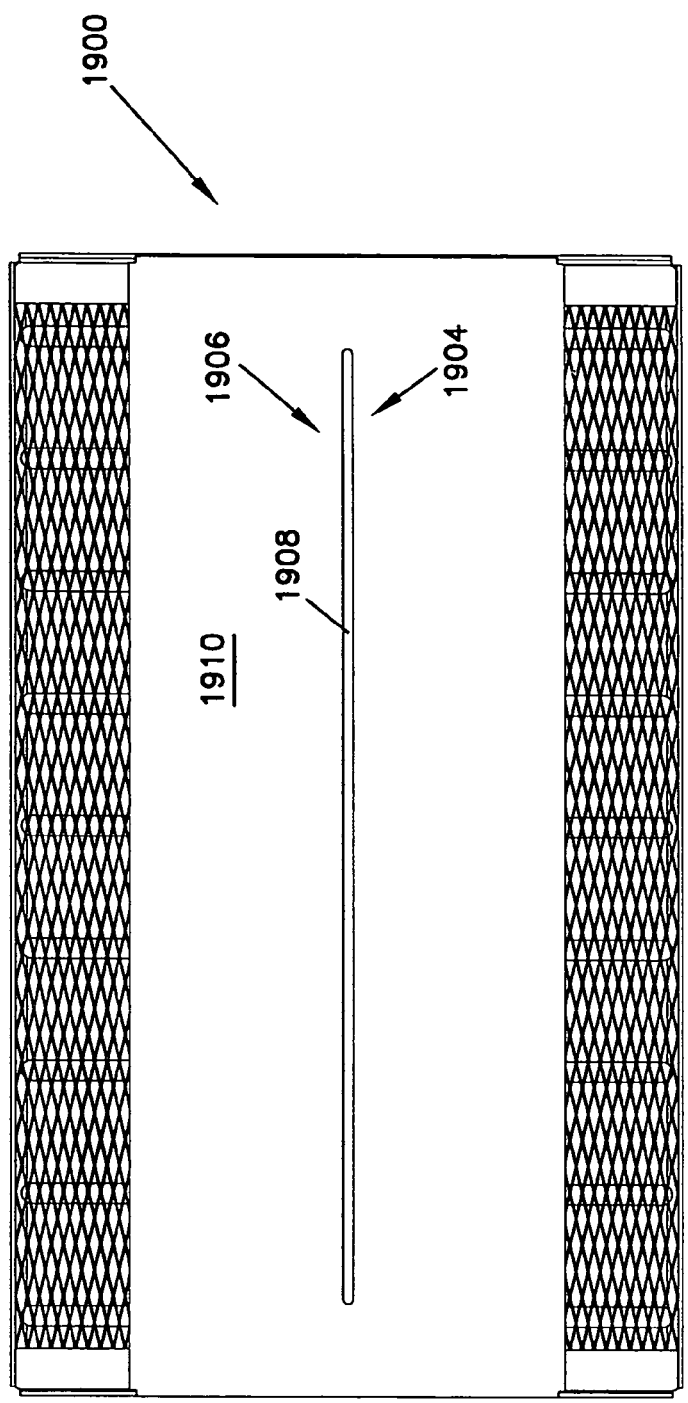
FIG. 43 is a bottom plan view of a fifth embodiment of a V-pack filter.

Attention is directed to FIG. 43. FIG. 43 is a bottom elevational view of another 5 embodiment of a V-pack filter 1900. The V-pack filter 1900 includes a first locking device 1904. The first locking device 1904 includes a first interlocking member 1906. In this particular embodiment, the first interlocking member 1906 is a recess, cutout, or indent 1908 in a bottom frame section 1910 of the V-pack filter 1900. Or, in other words, the bottom frame section 1910 defines the indent 1908.

The first locking device 1904 is constructed and arranged to receive a second interlocking device (not shown). The second interlocking device includes a first interlocking member (not shown). The first interlocking member is a longitudinal projection, or bead, (not shown). The projection extends from the base structure of the retention mechanism, such as the retention mechanism 1602 of FIG. 39. The first and second interlocking device 1904 are constructed and arranged to interact with each other.

What is claimed is:

1. A filter mountable in and removable from an assembly, the filter comprising:
   (a) a closed frame structure and an open frame structure;
   (b) first and second filtration media panels mounted in extension between the closed frame structure and the open frame structure;
      (i) the first and second filtration media panels forming a V-shape with an angle of at least about 5 degrees;
      (ii) the first and second filtration media panels and the open frame structure defining an air flow aperture;
   (c) the closed frame structure defining a first receiver indent oriented between the first filtration media panel and the second filtration media panel, the first receiver indent sized and positioned to receive a first interlocking member of the assembly in which the filter is mounted in use.

2. A filter according to claim 1 wherein:
   (a) the V-shape angle of at least about 5 degrees is in the range of 10 to 25 degrees.

3. A filter according to claim 1 wherein:
   (a) the closed frame structure has first and second end portions, and the first end portion defines the first receiver indent.

4. A filter according to claim 3:
   (a) further comprising a second receiver indent; and
   (b) wherein the second end portion of the closed frame structure defines the second receiver indent.

5. A filter according to claim 4, further comprising:
   (a) a seal arrangement circumscribing the air flow aperture and projecting outwardly from the open frame structure; and
   (b) a stop arrangement projecting outwardly from the open frame structure.

6. A filter according to claim 5 wherein:
   (a) the seal arrangement has a first thickness, and
   (b) the stop arrangement has a second thickness that is less than the first thickness.

7. A filter according to claim 1 further comprising:
   (a) a handle.

8. A filter according to claim 7 wherein:
   (a) the handle is oriented between the first filtration media panel and the second filtration media panel.

9. A filter mountable in and removable from an assembly, the filter comprising:
   (a) a closed frame structure and an open frame structure;
   (b) first and second filtration media panels mounted in extension between the closed frame structure and the open frame structure;
      (i) the first and second filtration media panels forming a V-shape with an angle of at least about 5 degrees;
      (ii) the first and second filtration media panels and the open frame structure defining an air flow aperture;
   (c) a seal arrangement circumscribing the air flow aperture and projecting outwardly from the open frame structure; and
   (d) a stop arrangement projecting outwardly from the open frame structure.

10. A filter according to claim 9 wherein:
    (a) the V-shape angle of at least about 5 degrees is in the range of 10 to 25 degrees.

11. A filter according to claim 9 wherein:
    (a) the seal arrangement has a first thickness, and
    (b) the stop arrangement has a second thickness that is less than the first thickness.

12. A filter according to claim 9 wherein:
    (a) the closed frame structure defines a first receiver indent sized and positioned to receive a first interlocking member of the assembly in which the filter is mounted in use.

13. A filter according to claim 12 wherein:
    (a) the closed frame structure has first and second end portions, and the first end portion defines the first receiver indent.

14. A filter according to claim 13:
    (a) further comprising a second receiver indent; and
    (b) wherein the second end portion of the closed frame structure defines the second receiver indent.

15. A filter assembly comprising:
    (a) a housing;
    (b) a retention mechanism within the housing, the retention mechanism having a locking member; and
    (c) a filter element positioned in the housing operably engaged with the retention mechanism, the filter element comprising:
       (i) a closed frame structure and an open frame structure;
       (ii) first and second filtration media panels mounted in extension between the closed frame structure and the open frame structure;
          (A) the first and second filtration media panels forming a V-shape with an angle of at least about 5 degrees;
          (B) the first and second filtration media panels and the open frame structure defining an air flow aperture;
       (iv) the closed frame structure defining a first receiver indent oriented between the first filtration media panel and the second filtration media panel; and
    (d) the locking member engaged with the first receiver indent.

16. A filter assembly according to claim 15, wherein:
    (a) the locking member is pivotally attached to the retention mechanism and movable from a first orientation to a second orientation.

17. A filter assembly according to claim 16, wherein:
    (a) when the locking member is in the first orientation, the filter element is pressed against a portion of the housing, in a locked position; and
    (b) when the locking member is in the second orientation, the filter element is released from the locked position.

18. A filter assembly according to claim 15, wherein:
    (a) the filter element comprises a second receiver indent defined by the closed frame structure.

19. A filter assembly according to claim 15, wherein:
    (a) the filter element further comprises:
       (i) a seal arrangement circumscribing the air flow aperture and projecting outwardly from the open frame structure; and
       (ii) a stop arrangement projecting outwardly from the open frame structure.

* * * * *